(12) United States Patent
Cho et al.

(10) Patent No.: US 11,982,611 B2
(45) Date of Patent: May 14, 2024

(54) SYSTEMS, APPARATUSES, AND METHODS FOR CELL SORTING AND FLOW CYTOMETRY

(71) Applicant: NANOCELLECT BIOMEDICAL, INC., San Diego, CA (US)

(72) Inventors: Sunghwan Cho, San Diego, CA (US); Jose Manuel Morachis, San Diego, CA (US); Ivan Gagne, San Diego, CA (US); Rick Segil, San Diego, CA (US); William Arthur Alaynick, San Diego, CA (US); Zhe Mei, San Diego, CA (US); Sean Phillips, San Diego, CA (US); Chien-Chun Yang, San Diego, CA (US); Dongseob Yun, San Diego, CA (US); Michael Jerome Benchimol, San Diego, CA (US); Manna Doud, San Diego, CA (US); Nicholas Sullivan, San Diego, CA (US); Constance Ardila, San Diego, CA (US)

(73) Assignee: NANOCELLECT BIOMEDICAL, INC., San Diego, CA (US)

( * ) Notice: Subject to any disclaimer, the term of this patent is extended or adjusted under 35 U.S.C. 154(b) by 1024 days.

(21) Appl. No.: 16/495,738

(22) PCT Filed: Mar. 20, 2018

(86) PCT No.: PCT/US2018/023324
§ 371 (c)(1),
(2) Date: Sep. 19, 2019

(87) PCT Pub. No.: WO2018/175411
PCT Pub. Date: Sep. 27, 2018

(65) Prior Publication Data
US 2020/0200670 A1   Jun. 25, 2020

Related U.S. Application Data

(60) Provisional application No. 62/473,759, filed on Mar. 20, 2017.

(51) Int. Cl.
*B01L 3/00* (2006.01)
*B07C 5/342* (2006.01)
(Continued)

(52) U.S. Cl.
CPC .... *G01N 15/1425* (2013.01); *B01L 3/502715* (2013.01); *B01L 3/502746* (2013.01);
(Continued)

(58) Field of Classification Search
CPC ......... B01L 3/502715; B01L 3/502753; B01L 3/502761; B01L 3/502769;
(Continued)

(56) References Cited

U.S. PATENT DOCUMENTS 3,289,687 A   12/1966 Dunaway et al.
3,370,538 A   2/1968 Hines
(Continued)

FOREIGN PATENT DOCUMENTS

EP     1065378 B1    4/2002
WO     WO-9702357 A1 1/1997
(Continued)

OTHER PUBLICATIONS

Ghosh, et al. Miniaturized integration of a fluorescence microscope. Nat Methods 8(10): 871-878 (2011).
(Continued)

*Primary Examiner* — Joseph C Rodriguez
(74) *Attorney, Agent, or Firm* — Wilson Sonsini Goodrich & Rosati

(57) ABSTRACT

A method includes providing a cartridge and the cartridge includes a slot for receiving a microfluidic chip having a set
(Continued)

of first channels. The cartridge also includes a set of second channels and each channel of the set of second channels is coupleable to a different channel of the set of first channels during use with the microfluidic chip. The cartridge also includes an indent configured for engagement and alignment of the cartridge during use. The method also includes inserting the cartridge into a device, such that the cartridge engages a first biasing member of the device configured for alignment of the cartridge in a first direction. The first biasing member is configured to bias movement of the cartridge into locking position with a notch of the device.

10 Claims, 58 Drawing Sheets

(51) Int. Cl.
*G01N 15/14* (2006.01)
*G01N 15/10* (2006.01)
*G01N 15/149* (2024.01)

(52) U.S. Cl.
CPC ........ *B01L 3/502761* (2013.01); *B07C 5/342* (2013.01); *G01N 15/1484* (2013.01); *B01L 2200/0652* (2013.01); *B01L 2300/0819* (2013.01); *B01L 2400/082* (2013.01); *G01N 2015/1006* (2013.01); *G01N 15/149* (2024.01)

(58) Field of Classification Search
CPC ......... B01L 2300/021; B01L 3/502746; G01N 15/1425; G01N 15/1484
See application file for complete search history.

(56) References Cited

U.S. PATENT DOCUMENTS

| | | |
|---|---|---|
| 3,449,938 A | 6/1969 | Giddings et al. |
| 3,508,654 A | 4/1970 | Glaettli et al. |
| 3,508,655 A | 4/1970 | Kamentsky et al. |
| 3,560,754 A | 2/1971 | Kamentsky |
| 3,791,517 A | 2/1974 | Friedman |
| 3,827,555 A | 8/1974 | Kamentsky et al. |
| 3,906,415 A | 9/1975 | Baker |
| 3,984,307 A | 10/1976 | Kamentsky et al. |
| 3,984,621 A | 10/1976 | Propst |
| 4,175,662 A | 11/1979 | Zold |
| 4,279,345 A | 7/1981 | Allred |
| 4,318,483 A | 3/1982 | Lombardo et al. |
| 4,361,400 A | 11/1982 | Gray et al. |
| 4,426,451 A | 1/1984 | Columbus |
| 4,526,276 A | 7/1985 | Shoor et al. |
| 4,572,664 A | 2/1986 | Hanson |
| 4,581,624 A | 4/1986 | O'Connor |
| 4,636,149 A | 1/1987 | Brown |
| 4,676,274 A | 6/1987 | Brown |
| 4,723,129 A | 2/1988 | Endo et al. |
| 4,756,427 A | 7/1988 | Gohde et al. |
| 4,793,705 A | 12/1988 | Shera |
| 4,908,112 A | 3/1990 | Pace |
| 4,936,465 A | 6/1990 | Zold |
| 4,954,715 A | 9/1990 | Zold |
| 4,963,498 A | 10/1990 | Hillman et al. |
| 4,983,038 A | 1/1991 | Ohki et al. |
| 5,030,002 A | 7/1991 | North et al. |
| 5,040,890 A | 8/1991 | North et al. |
| 5,065,978 A | 11/1991 | Albarda et al. |
| 5,092,972 A | 3/1992 | Ghowsi |
| 5,101,978 A | 4/1992 | Marcus |
| 5,193,688 A | 3/1993 | Giddings |
| 5,238,223 A | 8/1993 | Mettner et al. |
| 5,265,327 A | 11/1993 | Faris et al. |
| 5,275,787 A | 1/1994 | Yuguchi et al. |
| 5,395,588 A | 3/1995 | North, Jr. et al. |
| 5,483,469 A | 1/1996 | Van den Engh et al. |
| 5,486,335 A | 1/1996 | Wilding et al. |
| 5,489,506 A | 2/1996 | Crane |
| 5,541,072 A | 7/1996 | Wang et al. |
| 5,608,519 A | 3/1997 | Gourley et al. |
| 5,699,462 A | 12/1997 | Fouquet et al. |
| 5,777,649 A | 7/1998 | Otsuka et al. |
| 5,789,045 A | 8/1998 | Wapner et al. |
| 5,836,750 A | 11/1998 | Cabuz |
| 5,837,200 A | 11/1998 | Diessel et al. |
| 5,851,488 A | 12/1998 | Saul et al. |
| 5,922,591 A | 7/1999 | Anderson et al. |
| 5,976,336 A | 11/1999 | Dubrow et al. |
| 5,988,522 A | 11/1999 | Glezer et al. |
| 5,992,820 A | 11/1999 | Fare et al. |
| 5,998,212 A | 12/1999 | Corio et al. |
| 6,042,709 A | 3/2000 | Parce et al. |
| 6,046,056 A | 4/2000 | Parce et al. |
| 6,062,681 A | 5/2000 | Field et al. |
| 6,120,666 A | 9/2000 | Jacobson et al. |
| 6,145,247 A | 11/2000 | McKinnis |
| 6,152,181 A | 11/2000 | Wapner et al. |
| 6,184,029 B1 | 2/2001 | Wilding et al. |
| 6,221,654 B1 | 4/2001 | Quake et al. |
| 6,251,343 B1 * | 6/2001 | Dubrow ............... B01L 3/5085 422/68.1 |
| 6,273,553 B1 | 8/2001 | Kim et al. |
| 6,337,740 B1 | 1/2002 | Parce |
| 6,360,775 B1 | 3/2002 | Barth et al. |
| 6,429,025 B1 | 8/2002 | Parce et al. |
| 6,482,652 B2 | 11/2002 | Furlong et al. |
| 6,488,897 B2 | 12/2002 | Dubrow et al. |
| 6,506,609 B1 | 1/2003 | Wada et al. |
| 6,507,391 B2 | 1/2003 | Riley et al. |
| 6,524,860 B1 | 2/2003 | Seidel et al. |
| 6,532,061 B2 | 3/2003 | Ortyn et al. |
| 6,561,224 B1 | 5/2003 | Cho |
| 6,592,821 B1 | 7/2003 | Wada et al. |
| 6,597,438 B1 | 7/2003 | Cabuz et al. |
| 6,663,832 B2 | 12/2003 | Lebl et al. |
| 6,744,038 B2 | 6/2004 | Wang et al. |
| 6,747,285 B2 | 6/2004 | Schueller et al. |
| 6,802,342 B2 | 10/2004 | Fernandes et al. |
| 6,830,936 B2 | 12/2004 | Anderson et al. |
| 6,877,528 B2 | 4/2005 | Gilbert et al. |
| 6,883,957 B2 | 4/2005 | Gilbert et al. |
| 6,976,590 B2 | 12/2005 | Deshpande et al. |
| 7,069,943 B2 | 7/2006 | Gilbert et al. |
| 7,104,405 B2 | 9/2006 | Bohm et al. |
| 7,157,274 B2 | 1/2007 | Bohm et al. |
| 7,220,594 B2 | 5/2007 | Foster et al. |
| 7,242,474 B2 | 7/2007 | Cox et al. |
| 7,258,774 B2 | 8/2007 | Chou et al. |
| 7,298,478 B2 | 11/2007 | Gilbert et al. |
| 7,303,727 B1 | 12/2007 | Dubrow et al. |
| 7,311,476 B2 | 12/2007 | Gilbert et al. |
| 7,355,696 B2 | 4/2008 | Mueth et al. |
| 7,355,699 B2 | 4/2008 | Gilbert et al. |
| 7,358,476 B2 | 4/2008 | Kiesel et al. |
| 7,389,879 B2 | 6/2008 | Tyvoll et al. |
| 7,402,131 B2 | 7/2008 | Mueth et al. |
| 7,419,784 B2 | 9/2008 | Dubrow et al. |
| 7,452,725 B2 | 11/2008 | Leary et al. |
| 7,476,363 B2 | 1/2009 | Unger et al. |
| 7,479,625 B2 | 1/2009 | Kiesel et al. |
| 7,611,309 B2 | 11/2009 | Gilbert et al. |
| 7,641,856 B2 | 1/2010 | Padmanabhan et al. |
| 7,723,116 B2 | 5/2010 | Evans et al. |
| 7,802,686 B2 | 9/2010 | Takagi et al. |
| 7,997,831 B2 | 8/2011 | Gilbert et al. |
| 8,123,044 B2 | 2/2012 | Johnson et al. |
| 8,198,092 B2 | 6/2012 | Durack et al. |
| 8,268,177 B2 | 9/2012 | Ying et al. |
| 8,529,161 B2 | 9/2013 | Gilbert et al. |
| 8,567,608 B2 | 10/2013 | Deshpande et al. |
| 8,623,295 B2 | 1/2014 | Gilbert et al. |
| 8,658,418 B2 | 2/2014 | Daridon |
| 8,679,422 B2 | 3/2014 | Gilbert et al. |
| 8,863,962 B2 | 10/2014 | Johnson et al. |

(56) References Cited

U.S. PATENT DOCUMENTS

| | | | |
|---|---|---|---|
| 8,961,904 B2* | 2/2015 | Xia | F04B 43/043 |
| | | | 422/68.1 |
| 9,011,797 B2 | 4/2015 | Gilbert et al. | |
| 9,134,221 B2 | 9/2015 | Lo et al. | |
| 9,260,693 B2 | 2/2016 | Johnson et al. | |
| 9,335,247 B2 | 5/2016 | Sharpe et al. | |
| 9,339,850 B2 | 5/2016 | Deshpande et al. | |
| 9,365,822 B2 | 6/2016 | Seidel et al. | |
| 9,446,912 B2 | 9/2016 | Gilbert et al. | |
| 9,757,726 B2 | 9/2017 | Sharpe et al. | |
| 9,927,345 B2 | 3/2018 | Buchanan et al. | |
| 9,958,465 B2* | 5/2018 | Ang | G01N 21/645 |
| 9,975,122 B2* | 5/2018 | Masquelier | B01L 9/527 |
| 10,029,263 B2 | 7/2018 | Bohm et al. | |
| 10,029,283 B2 | 7/2018 | Deshpande et al. | |
| 10,065,188 B2 | 9/2018 | Johnson et al. | |
| 10,371,622 B2 | 8/2019 | Sharpe et al. | |
| 11,273,439 B2* | 3/2022 | Handique | C12N 13/00 |
| 2002/0005354 A1 | 1/2002 | Spence et al. | |
| 2002/0037499 A1 | 3/2002 | Quake et al. | |
| 2002/0127736 A1 | 9/2002 | Chou et al. | |
| 2002/0166585 A1 | 11/2002 | O'Connor et al. | |
| 2003/0027225 A1 | 2/2003 | Wada et al. | |
| 2003/0196714 A1 | 10/2003 | Gilbert et al. | |
| 2004/0011650 A1 | 1/2004 | Zenhausern et al. | |
| 2004/0037739 A1* | 2/2004 | McNeely | B01L 3/5085 |
| | | | 422/417 |
| 2004/0086427 A1* | 5/2004 | Childers | B01L 3/502715 |
| | | | 436/180 |
| 2004/0086872 A1 | 5/2004 | Childers et al. | |
| 2005/0258715 A1 | 11/2005 | Schlabach | |
| 2006/0263264 A1 | 11/2006 | Bohm et al. | |
| 2012/0180580 A1* | 7/2012 | Immink | B01L 3/5029 |
| | | | 73/864.91 |
| 2012/0277902 A1 | 11/2012 | Sharpe et al. | |
| 2013/0334407 A1 | 12/2013 | Perrault, Jr. et al. | |
| 2014/0085898 A1 | 3/2014 | Perrault, Jr. | |
| 2014/0170697 A1 | 6/2014 | Sharpe et al. | |
| 2014/0176704 A1 | 6/2014 | Perrault, Jr. | |
| 2014/0220702 A1* | 8/2014 | Johnson | B01L 3/502715 |
| | | | 422/512 |
| 2014/0318645 A1 | 10/2014 | Koksal et al. | |
| 2014/0339445 A1 | 11/2014 | Sharpe et al. | |
| 2014/0356941 A1* | 12/2014 | Bransky | B01L 3/502715 |
| | | | 435/306.1 |
| 2015/0328637 A1 | 11/2015 | Perrault, Jr. et al. | |
| 2015/0330385 A1 | 11/2015 | Lofstrom et al. | |
| 2015/0331429 A1 | 11/2015 | Lofstrom et al. | |
| 2015/0346097 A1* | 12/2015 | Battrell | G01N 21/6428 |
| | | | 702/19 |
| 2015/0375227 A1 | 12/2015 | Quake et al. | |
| 2016/0121325 A1* | 5/2016 | Masquelier | B01L 3/50273 |
| | | | 422/561 |
| 2016/0129445 A1* | 5/2016 | Corey | B01L 3/502761 |
| | | | 435/286.1 |
| 2016/0158746 A1* | 6/2016 | Taylor | B01L 3/545 |
| | | | 435/6.12 |
| 2016/0158758 A1* | 6/2016 | Johnson | C12N 5/0081 |
| | | | 435/286.1 |
| 2017/0122851 A1* | 5/2017 | Thatcher | C12Q 1/6806 |
| 2018/0214874 A1 | 8/2018 | Koksal et al. | |

FOREIGN PATENT DOCUMENTS

| | | | | |
|---|---|---|---|---|
| WO | WO-9943432 A1 | 9/1999 | | |
| WO | WO-9961888 A2 | 12/1999 | | |
| WO | WO-0050172 A1 | 8/2000 | | |
| WO | WO-0070080 A1 | 11/2000 | | |
| WO | WO-0126813 A2 | 4/2001 | | |
| WO | WO-0229106 A2 | 4/2002 | | |
| WO | WO-2007130647 A2 | 11/2007 | | |
| WO | WO-2013181453 A2 | 12/2013 | | |
| WO | WO-2014062719 A2 | 4/2014 | | |
| WO | WO-2014127250 A1 * | 8/2014 | | B01L 3/5025 |
| WO | WO-2015088299 A1 * | 6/2015 | | B01J 19/0093 |
| WO | WO-2016124908 A1 | 8/2016 | | |
| WO | WO-2016210077 A1 | 12/2016 | | |

OTHER PUBLICATIONS

NanoCellect Closes $1.75M Series A Financing Round to Begin Production of the WOLF Cell Sorter. (2016).

PCT/US2018/023324 International Preliminary Report on Patentability dated Sep. 24, 2019.

PCT/US2018/023324 International Search Report and Written Opinion dated Jul. 5, 2018.

* cited by examiner

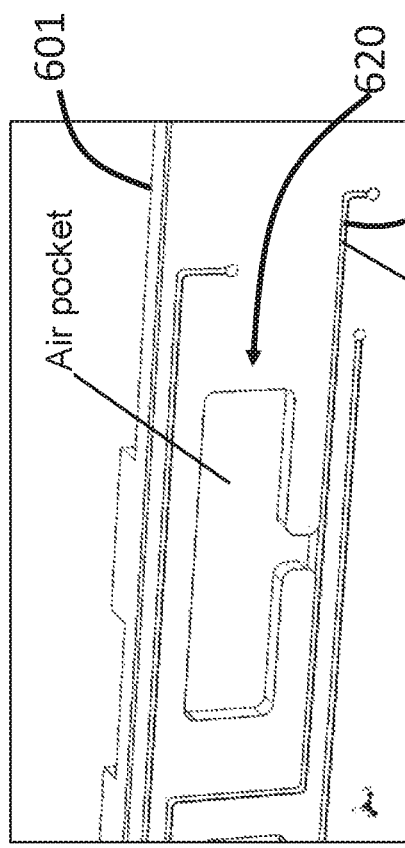
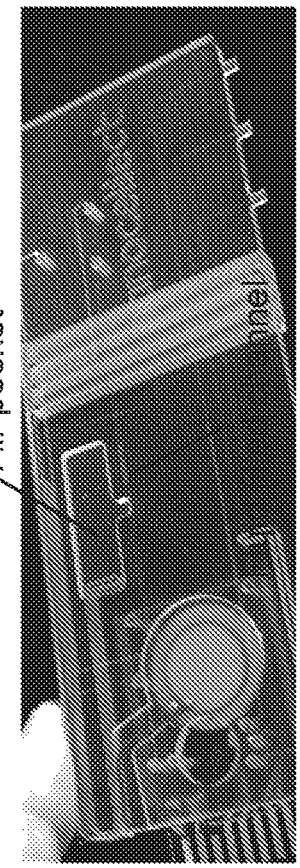
FIG. 6A
FIG. 6B

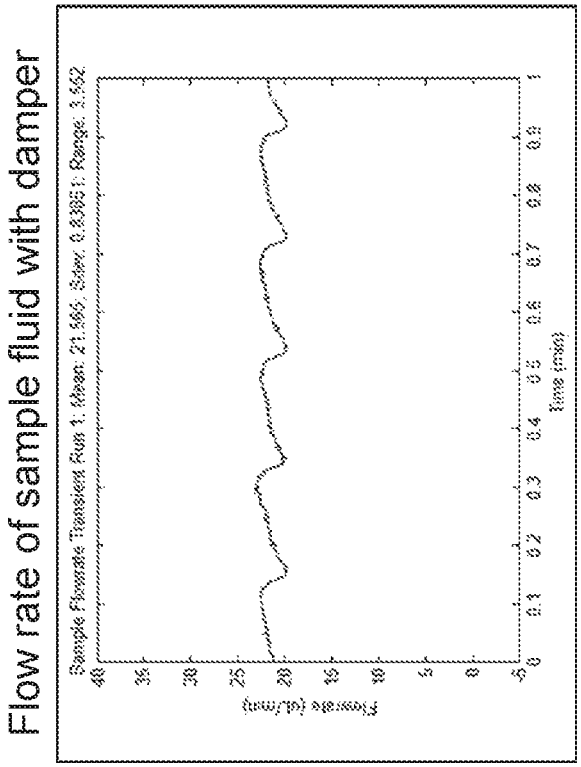
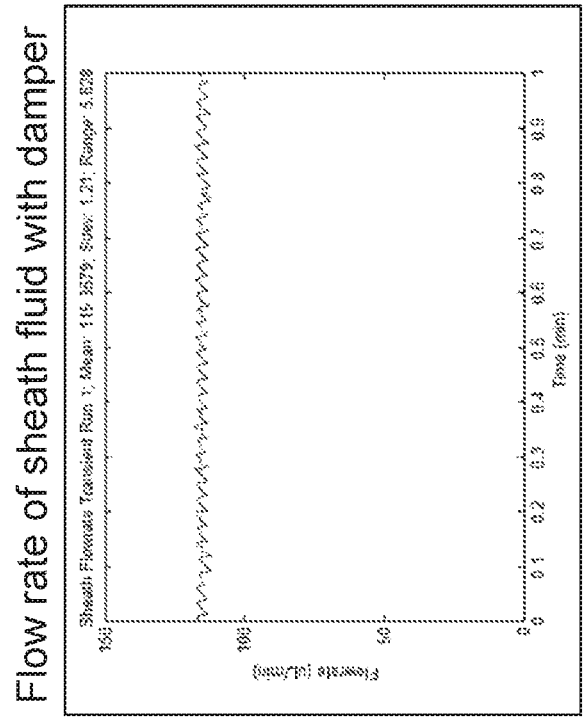
FIG. 10A
FIG. 10B

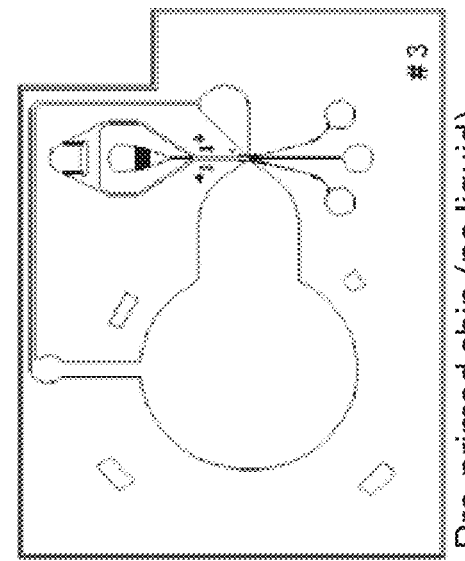
FIG. 18C
Pre-primed chip (no liquid)
Degassed Buffer and/or degassing vacuum in-line
Priming →
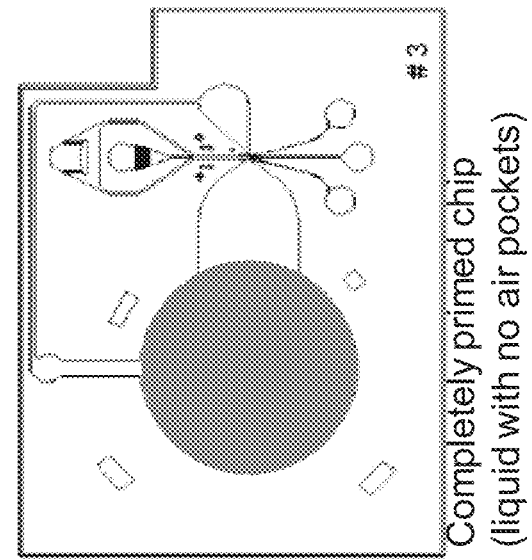
FIG. 18D
Completely primed chip (liquid with no air pockets)

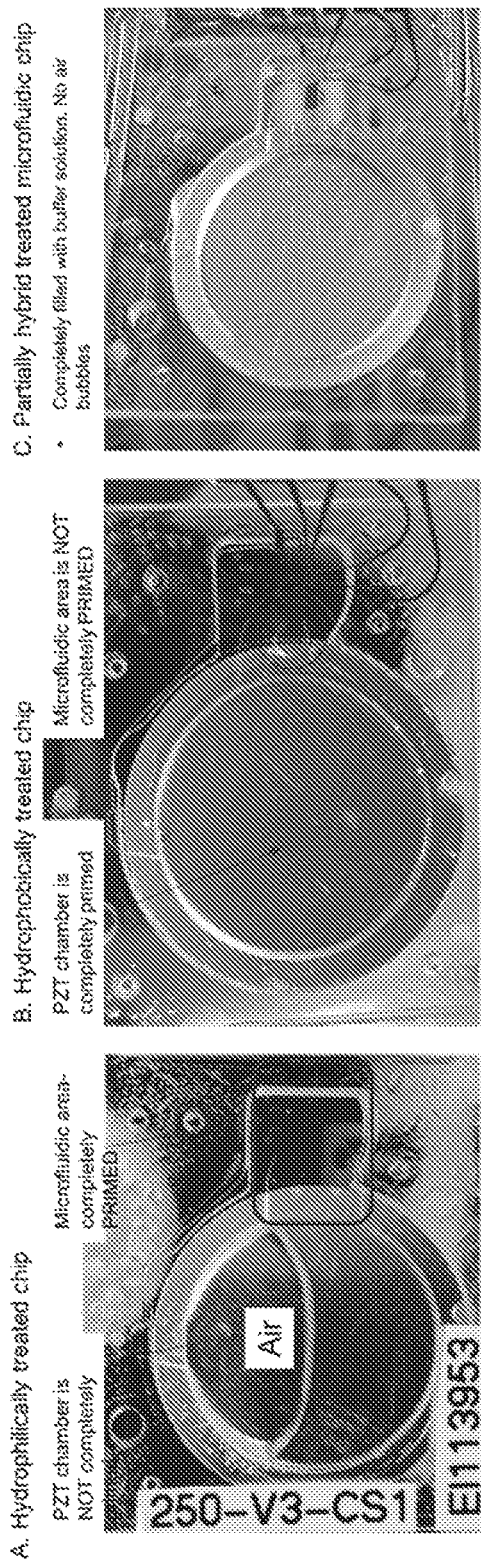
FIG. 21A  FIG. 21B  FIG. 21C

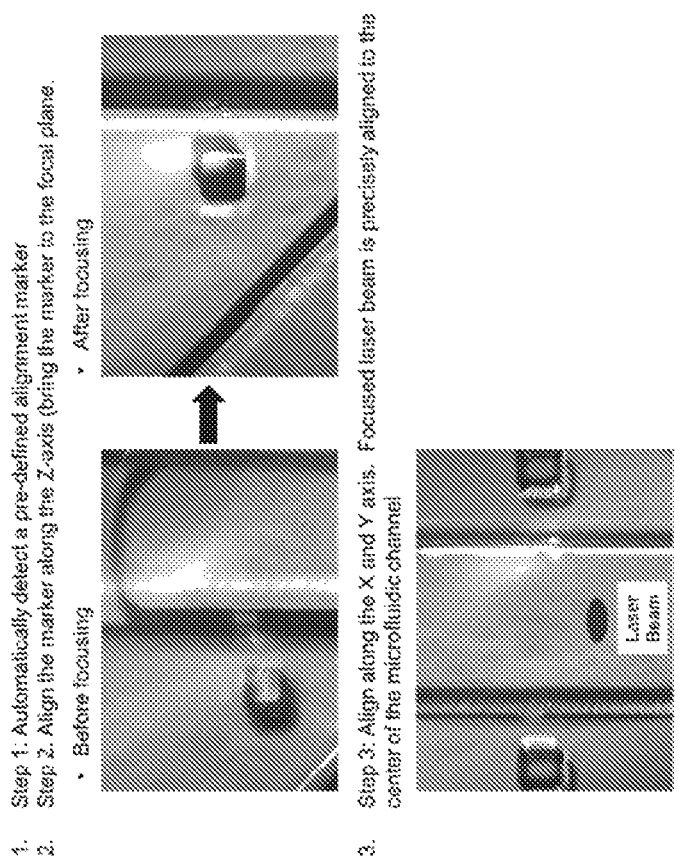
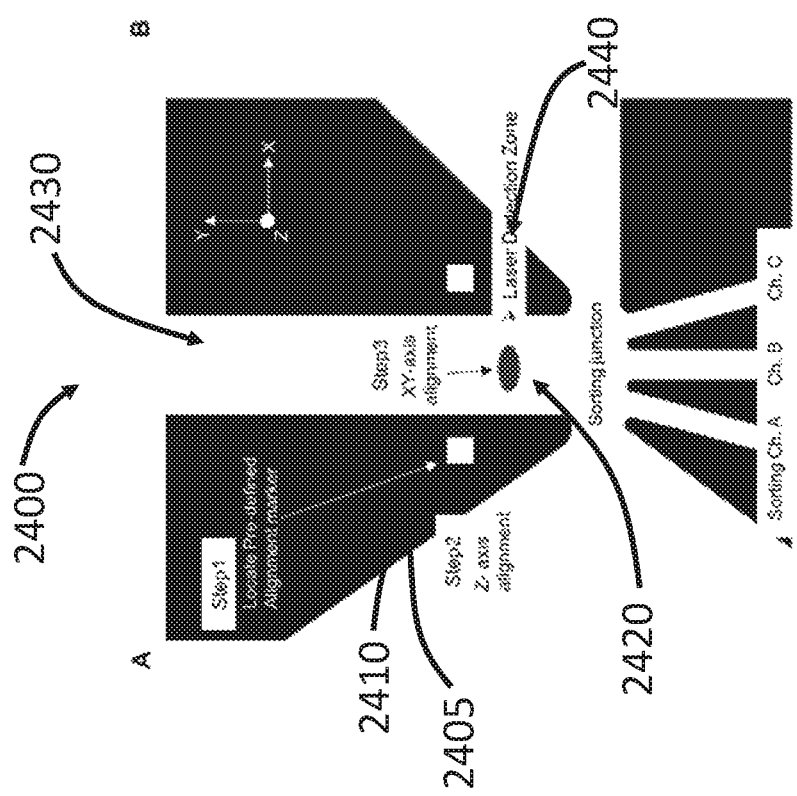
FIG. 24A  FIG. 24B  FIG. 24C  FIG. 24D

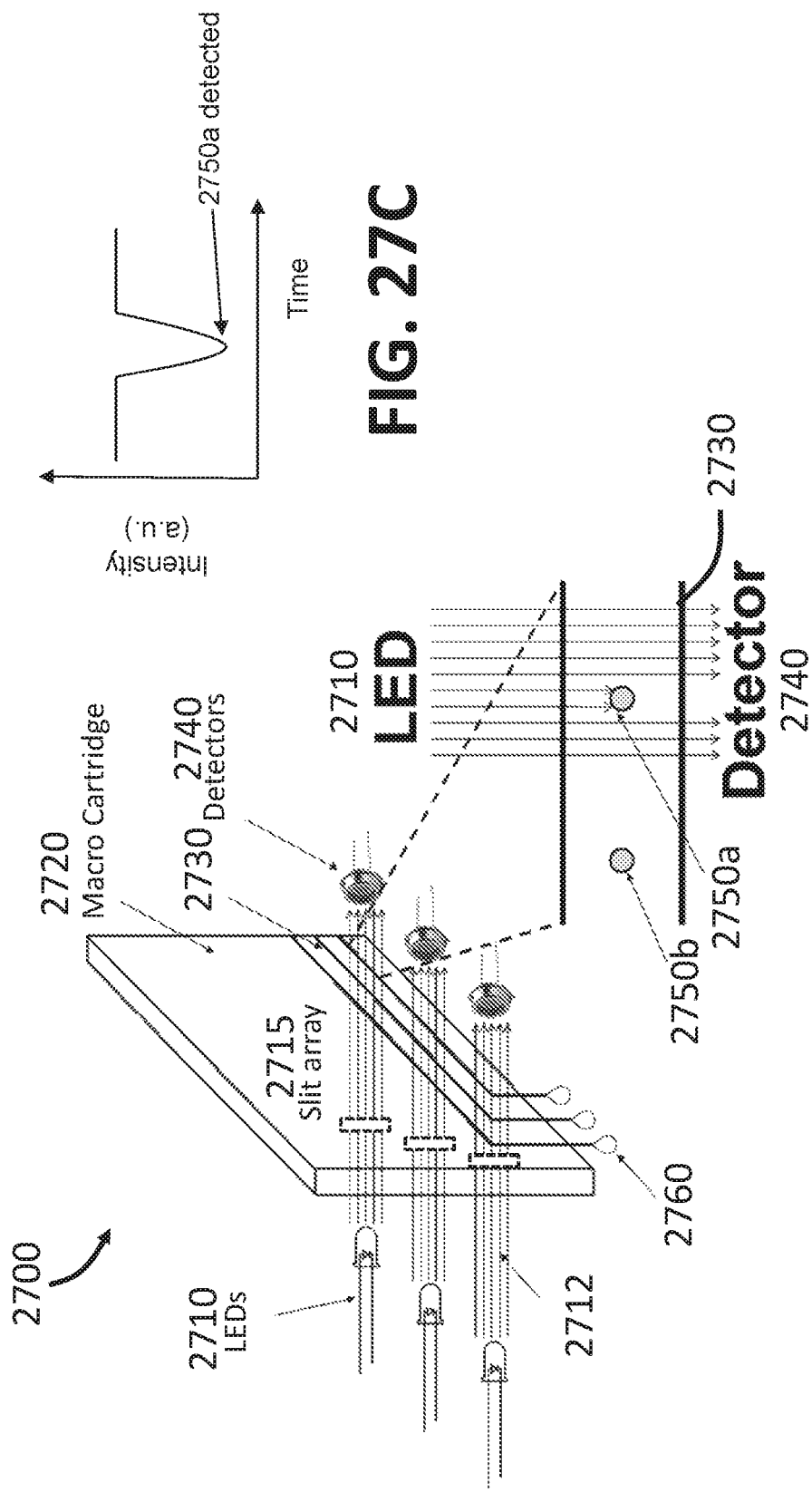

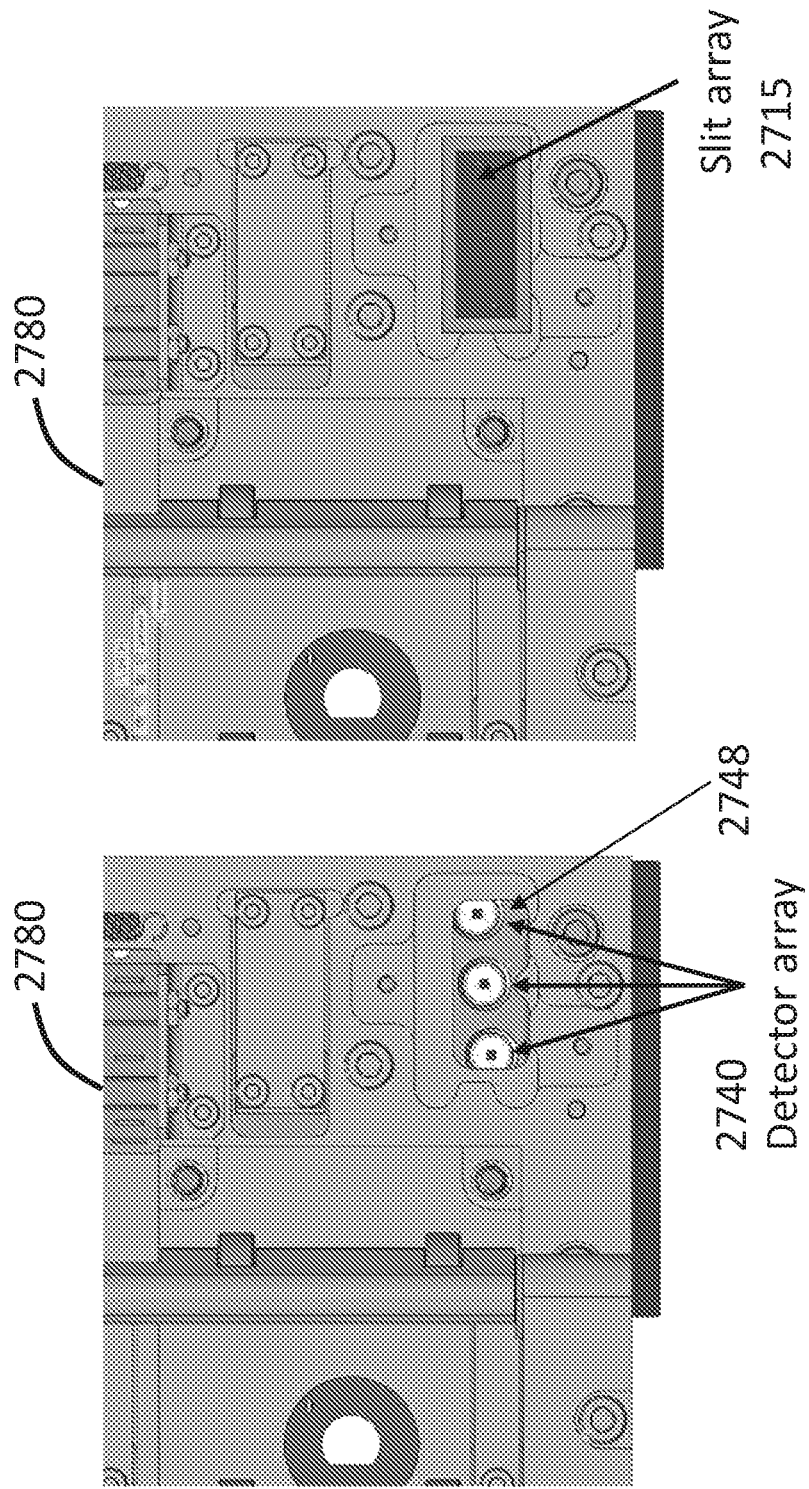

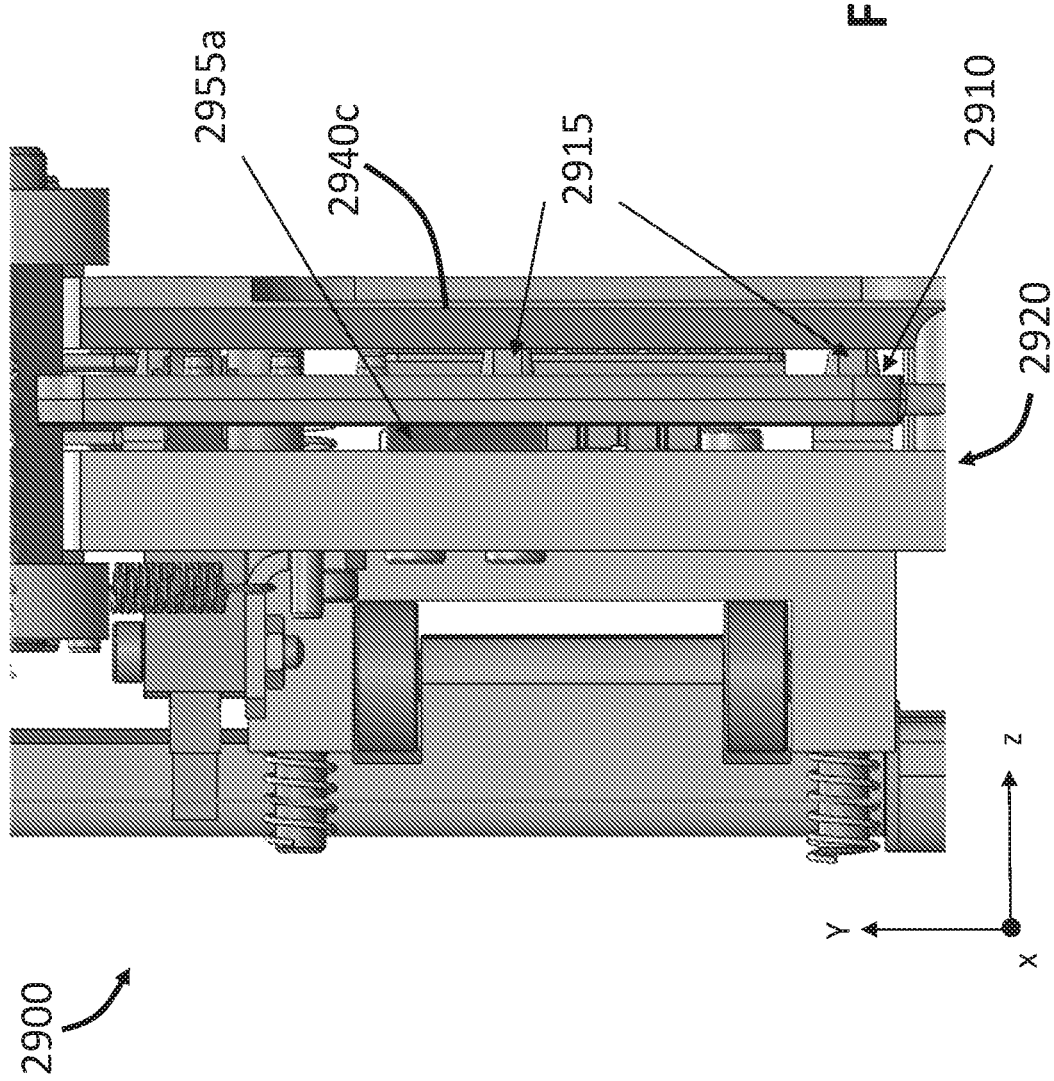

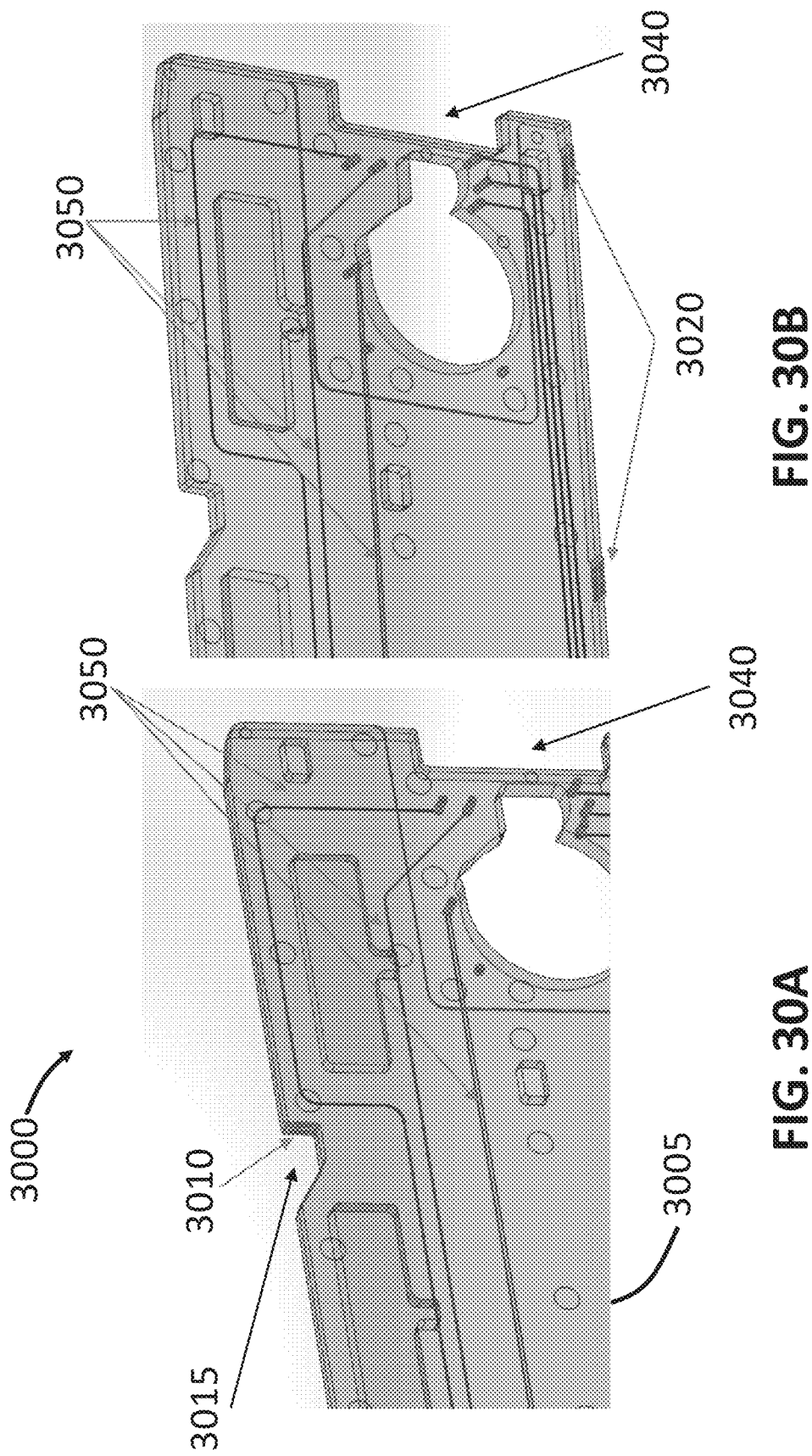

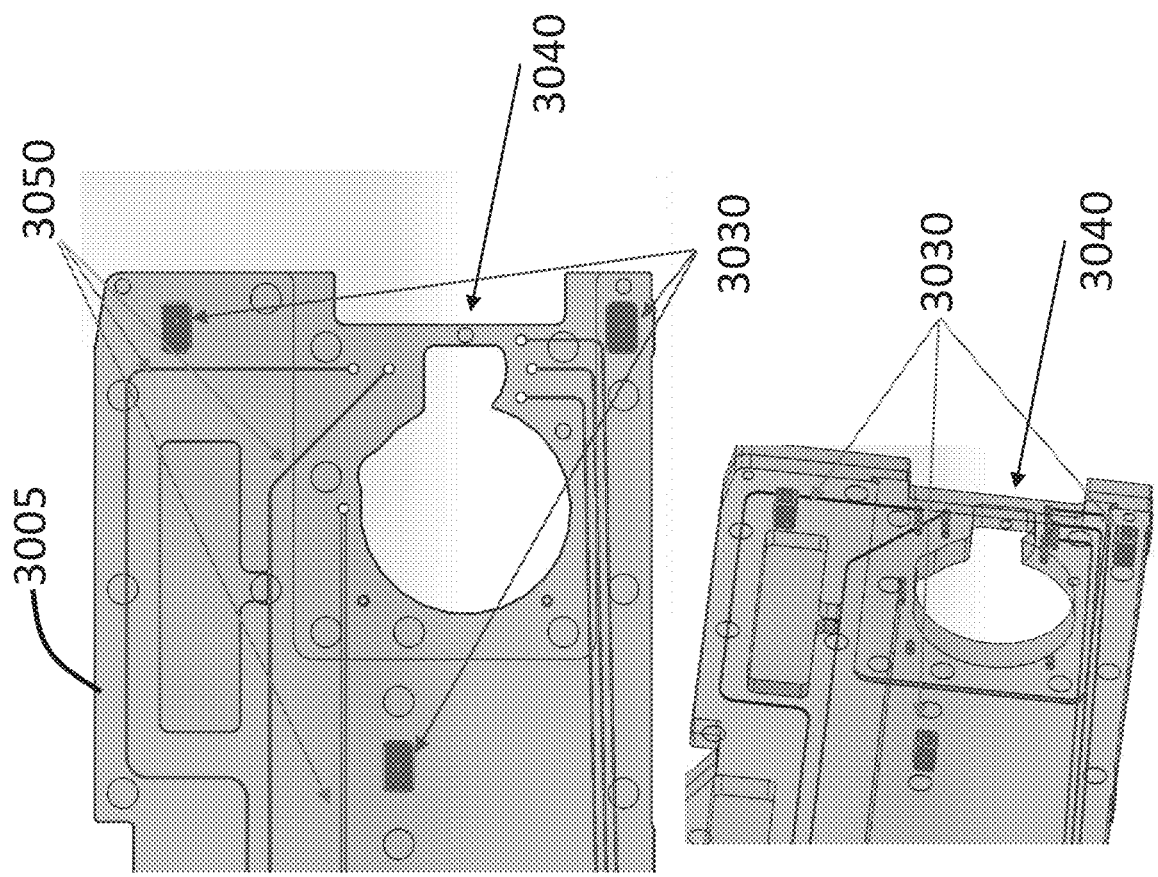

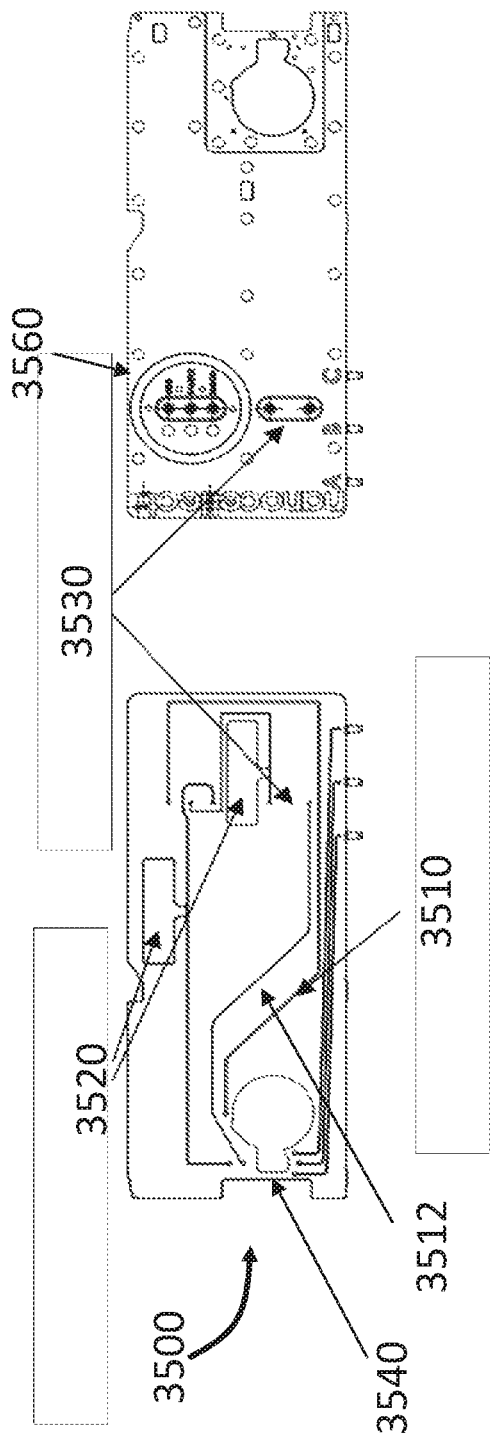

SYSTEMS, APPARATUSES, AND METHODS FOR CELL SORTING AND FLOW CYTOMETRY

GOVERNMENT SUPPORT

This invention was made with government support under Grant No. R44GM112442 awarded by the National Institutes of Health. The government has certain rights in the invention.

CROSS-REFERENCES TO RELATED APPLICATIONS

This application is a U.S. National Stage entry of International Application No. PCT/US2018/023324, filed Mar. 20, 2018, which claims the benefit of priority to U.S. provisional application Ser. No. 62/473,759, filed Mar. 20, 2017 entitled "SYSTEMS, APPARATUSES, AND METHODS FOR CELL SORTING AND FLOW CYTOMETRY," the entire disclosure of each of which is incorporated herby reference in their entirety.

BACKGROUND

Flow cytometer (FC) devices and systems can be used to characterize and analyze particles in fluid (e.g., physical and biochemical properties of cells) and biochemical molecules or molecular clusters based on their optical responses as they are interrogated by external light sources in a serial manner. Optical signals from such particles can be collected by an optical detector, such as a photomultiplier tube (PMT) and can he analyzed or processed to extract information carried by the optical properties of the particles. Optical signals from the particles can be generated via one or more interactions between the input light and the particles such as forward scattering (FSC) side scattering (SSC) and fluorescence.

Cell sorting can be achieved by various techniques. One example is applying vibrations to jet flow from the nozzle to cause breakage of the jet flow into droplets, and subsequently using electrically charged plates to deflect cell-containing droplets into collection tubes, while droplets of no interest can flow straight down to a waste tube without deflection.

FC devices and systems can be implemented based on microfluidic technologies for research assays and diagnostics as well as for clinical applications. Microfluidic technologies range from simple microfluidic channels to complex microfluidic devices that can mix fluids, pump fluids, perform digital logic, individually cultural cells, and determine optimal reaction conditions, among others. Small-scale fluidic devices have low Reynold's numbers and can be used to achieve controlled laminar flow systems. Microfluidics further offer advantages of small size for miniaturization and parallelization of devices. Additionally, various fabrication processes for microfluidic devices are suitable for mass production which can reduce the cost of such devices. Advances in microfluidic devices can lead to low-cost on-chip devices that can be useful tools to researchers, clinical laboratories, and point-of-care clinicians in remote and/or resource-poor settings.

The field of particle sorting, and cell sorting in particular, has enjoyed a steady growth over the past three decades. Devices such as flow cytometers and cell sorters, and particularly those based on fluorescence activated cell sorting (FACS), have become the gold standard and workhorse for biomedical research and applications. However, there are still several issues with existing particle/cell sorting systems.

First, there is a tradeoff between low cost of operation and advanced self-analysis in existing systems. For example, existing FACS devices typically have a large footprint, high cost, and can be technically difficult to manufacture and operate. As a result, access to FACS is limited to shared core facilities at well-funded institutions.

Second, FACS and flow cytometry instruments usually utilize pumps to flow biological samples or particles suspended in a solution through the instrument. A second stream of sheath fluid (typically phosphate-buffered saline) is commonly used for hydrodynamic focusing of the sample stream. Because cell sorting can be sensitive to timing, and cell transit time is dependent on flow rate, it is desirable for the flow rates of these fluidic systems to be stable to achieve satisfactory sorting performance.

Traditional FACS instruments rely on expensive and sophisticated high-pressure driven pump systems to force the sample and sheath fluids through a cuvette or nozzle. These pressure-driven pumps are usually very sensitive, bulky, expensive, and do not provide the ability to calculate the concentration of cells being analyzed. Another problem with traditional pressure-driven pumps in FACS systems is that the fluidic components can be too expensive to replace for every experiment and extensive cleaning is usually needed. This results in contamination risks and/or wasted time cleaning and flushing the instruments in between runs.

Similar problems make it difficult to use other pump systems in FACS instruments. For example, a sophisticated pressure-driven pump system with flow rate feedback may not be used in an example FACS system because the samples would make contact with and contaminate the flow rate sensors, which are usually expensive and not disposable. Syringe pumps can be one alternative, as all of the components in syringe pumps can be readily disposed of. However, a problem with syringe pumps is that usage is typically complex and user-intensive, since the user may need to fasten a Luer connection onto a syringe, fasten the syringe to the pump, adjust the pump plunger, and/or the like.

SUMMARY

In some embodiments, a method includes providing a cartridge and the cartridge includes a slot for receiving a microfluidic chip having a set of first channels. The cartridge also includes a set of second channels and each channel of the set of second channels is coupleable to a different channel of the set of first channels during use with the microfluidic chip. The cartridge also includes an indent configured for engagement and alignment of the cartridge during use. The method also includes inserting the cartridge into a device, such that the cartridge engages a first biasing member of the device configured for alignment of the cartridge in a first direction. The first biasing member is configured to bias movement of the cartridge into locking position with a notch of the device.

In some embodiments, an apparatus includes a slot for receiving a microfluidic chip having a set of first channels and a set of second channels. Each channel of the set of second channels is coupleable to a different channel of the set of first channels during use with the microfluidic chip. The apparatus also includes an indent configured for engagement and alignment of the apparatus during use, such that the apparatus, upon insertion into a device, engages a first biasing member of the device configured for alignment of the apparatus in a first direction and to bias movement of the apparatus into locking position with a notch of the device.

In some embodiments, a system includes a cartridge and a device configured to receive the cartridge. The cartridge includes a slot for receiving a microfluidic chip having a set of first channels and a set of second channels. Each channel of the set of second channels is coupleable to a different channel of the set of first channels during use with the microfluidic chip. The cartridge also includes an indent configured for engagement and alignment of the cartridge during use. The device includes a first biasing member configured for alignment of the cartridge in a first direction and a second biasing member configured for alignment of the cartridge in a second direction. The second direction is orthogonal to the first direction. The device also includes a third biasing configured for alignment of the cartridge in a third direction and the second direction is orthogonal to the first direction and to the second direction. The device also includes a latch for holding the cartridge in place.

In some embodiments, a method includes acquiring first optical information associated with optical interrogation of particles in a first channel. The first optical information selected from the group consisting of forward scatter information, side scatter information, and fluorescence information. The method also includes acquiring second optical information associated with the optical interrogation of the particles and the second optical information is selected from the group consisting of forward scatter information, side scatter information, and fluorescence information. The second optical information is different than the first optical information. The method also includes generating an image of particle distribution based on the first optical information and the second optical information and receiving a selection of a first gating region within the image. The method further includes generating, based on the first gating region, a second gating region encapsulating the first gating region and dividing the second gating region into an array of subregions. The method also includes assigning each subregion that lies wholly or partially within the first region a first value, assigning each subregion that lies wholly outside the first region a second value to generate an array of first values and second values, and acquiring the first optical information and the second optical information associated with optical interrogation of a subsequent particle in the channel. The method further includes mapping subsequent particle onto the image based on its first optical information and its second optical information and sorting the subsequent particle from the first channel to a selected second channel of a set of second channels based on whether the mapped location of the subsequent particle on the image is within a subregion having the first value or the second value.

In some embodiments, a method includes orienting a chip vertically to align the longitudinal axis of a microfluidic channel of the chip with gravitational forces and flowing fluid in the microfluidic channel. The chip further includes a piezoelectric actuator having a chamber in fluid communication with the channel such that the fluid displaces gas present the chamber via a purging port in fluid communication with the chamber. The purging port is positioned to permit substantially complete, gravity-enabled purging of the gas from the chamber.

In some embodiments, an apparatus includes a substrate and a structure formed in the substrate. The structure includes an input channel connected at an actuation area to a set of output channels. The particles in the fluid flow through the input channel to the actuation area, and each particle travels from the actuation area to one of the set of output channels. Each of the input channel and the set of output channels has a hydrophilic coating applied thereto. The apparatus also includes a piezoelectric actuator coupled to the substrate. The piezoelectric actuator is in fluid communication with the actuation area and configured to, in response to a voltage signal, cause a flow displacement to direct a particle along a trajectory to one of the set of output channels which is different than the output channel to which the particle would travel without the flow displacement. The piezoelectric actuator has a hydrophobic coating applied thereto.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6A illustrates a cell sorting cartridge including a gas damper for peristaltic pumps, according to embodiments.

FIG. 6B illustrates a cell sorting cartridge including a gas damper for peristaltic pumps, according to embodiments.

FIGS. 10A and 10B are plots of flow rate versus time with external gas dampers for sample fluid and sheath fluid, respectively, according to embodiments.

FIGS. 18C-18D illustrate priming the cell sorter chip of FIG. 17 with a degassed buffer, according to embodiments.

FIGS. 21A-21C are images of the cell sorter chip with a hydrophilic coating (FIG. 21A), a hydrophobic coating (FIG. 21B), and a hybrid coating (FIG. 21C), respectively, after priming.

FIGS. 24A-24D illustrate a method of optical alignment of disposable assay cartridges, according to some embodiments.

FIG. 26A illustrates an approach for sorting of particles from two channels into two wells of a well plate. FIG. 26B illustrates timing of piezoelectric actuator triggering for one way sort and two way sort approaches to dispensing.

FIGS. 27A-27J illustrate approaches for optical verification of particles.

FIGS. 29A-29D illustrate cartridge alignment, according to embodiments.

FIGS. 30A-30D illustrate a cartridge including alignment features, according to embodiments.

FIGS. 35A and 35B illustrate a cartridge including a pulse damper and input fluid ports configured for sorting oil droplets, according to embodiments.

DETAILED DESCRIPTION

Embodiments disclosed herein relate generally to systems, apparatuses, and methods for flow cytometry and fluorescent activated cell sorting and, in some embodiments, to systems, apparatuses, and methods that encompass microfluidics-based flow cytometry and fluorescent activated cell sorting (FACS), optionally in combination with one or more subassemblies disclosed therein.

Traditional cell sorters like the FACS Aria (BD) use pressure pumps with complicated fluidic lines not meant to be disposable for every experiment. Users of traditional cell sorters usually perform rigorous washing steps in between experiments to avoid cross contamination. Microfluidic based cell sorters like the Tyto Cell Sorter (Miltenyi Biotec) or the On-chip Sort (On-chip Biotechnologies) use pressure or syringe pumps to have a consistent flow rate for sorting; however, these pumps are more expensive.

In some embodiments, use of a peristaltic pump for pumping fluid into disposable microfluidic flow cells and fluidics as disclosed herein can simplify cleaning and reduce the possibility of cross-contamination. Peristaltic pumps are affordable and can allow for ease of replacement of any fluidic line(s) that interact with the sample fluid. Further, peristaltic pumps can be relatively more compact than existing pressure pumps, making them suitable for relatively inexpensive instruments that are within the budgets of most labs.

Figure 1:
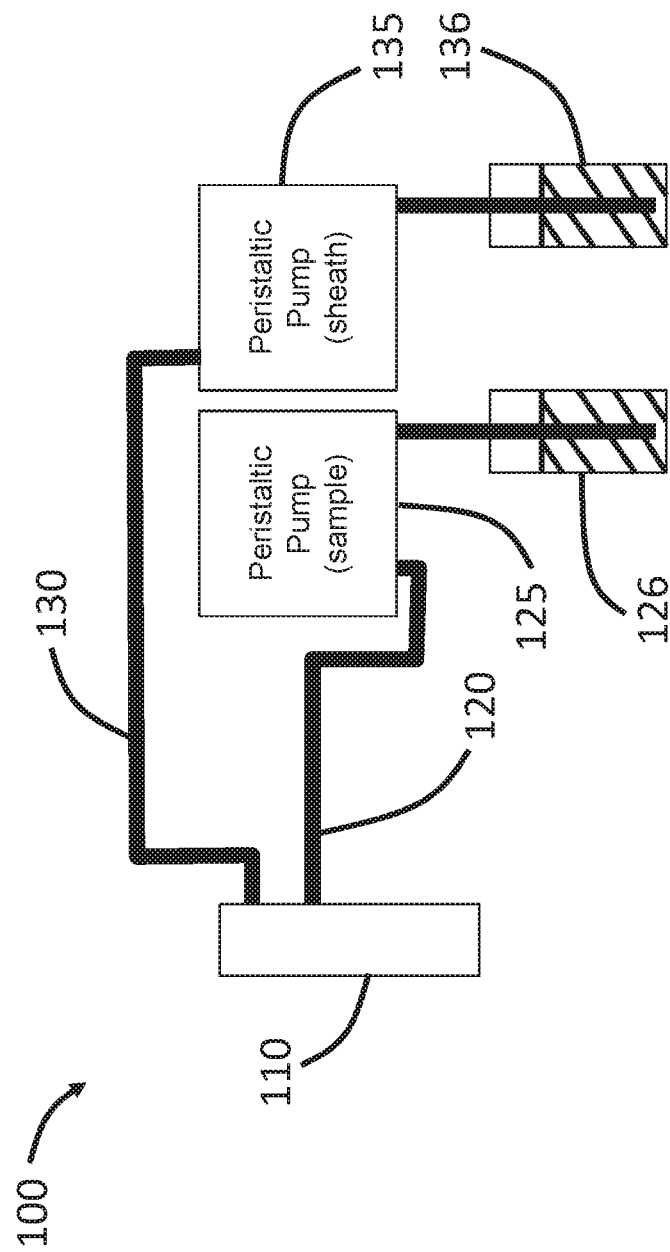
FIG. 1 illustrates a schematic of a cell sorting system using peristaltic pumps to pump sample fluid and sheath fluid.

FIG. 1 illustrates a cell sorting system 100, according to embodiments. The system 100 includes a sorting chamber 110 (also sometimes referred to as sorting chip or cartridge) in fluid communication with a sample fluid channel 120 and a sheath fluid channel 130. The system 100 also includes a peristaltic pump 125 configured to pump sample fluid from a sample fluid source 126 to the sorting chamber 110 via the sample fluid channel 120. The system also includes a peristaltic pump 135 configured to pump sheath fluid from a sheath fluid source 136 to the sorting chamber 110 via the sheath fluid channel 130.

Peristaltic pumps can sometimes produce large flow pulsations (also sometimes referred to as variations of flow rates) that may affect analysis and sorting performance in flow cytometers and FACS systems. Bench-top flow cytometers (but not sorters) such as the BD Accuri™ C6 from BD Biosciences or the Xitogen flow cytometer use peristaltic pumps together with various combinations of dampers and pump controls. This can provide an advantage in cost savings, easier interface, and less maintenance. Example flow cytometers with peristaltic pumps are disclosed in PCT Application No. WO 2013/181453 A2, the entire disclosure of which is herein incorporated by reference in its entirety.

Some embodiments disclosed herein are directed to peristaltic pumps with disposable fluidic components for use in cell sorting and/or microfluidic based fluorescence activated cell sorting FACS). Some embodiments disclosed herein are directed to fluidic systems that use peristaltic pumps to drive sheath fluid and/or sample fluid. In such systems, sample and shear fluids are delivered into the microfluidic cell sorting cartridge at consistent flow rates to achieve high particle sorting and/or analysis performance. The consistent flow rates are achieved using fluid dampers, which can be either coupled to fluid channels that deliver the sheath and sample fluid (also referred to as external dampers) or integrated into the sorting cartridge (also referred to as integrated dampers or on-cartridge dampers). In some embodiments, the fluid dampers can be filled with gas, such as air, noble gases, or any other gas that is appropriate. In some embodiments, the fluid dampers can be filled with immiscible compressible fluid such as water gas, which is usually produced from synthesis gas and composed of carbon monoxide and hydrogen.

Figure 2:
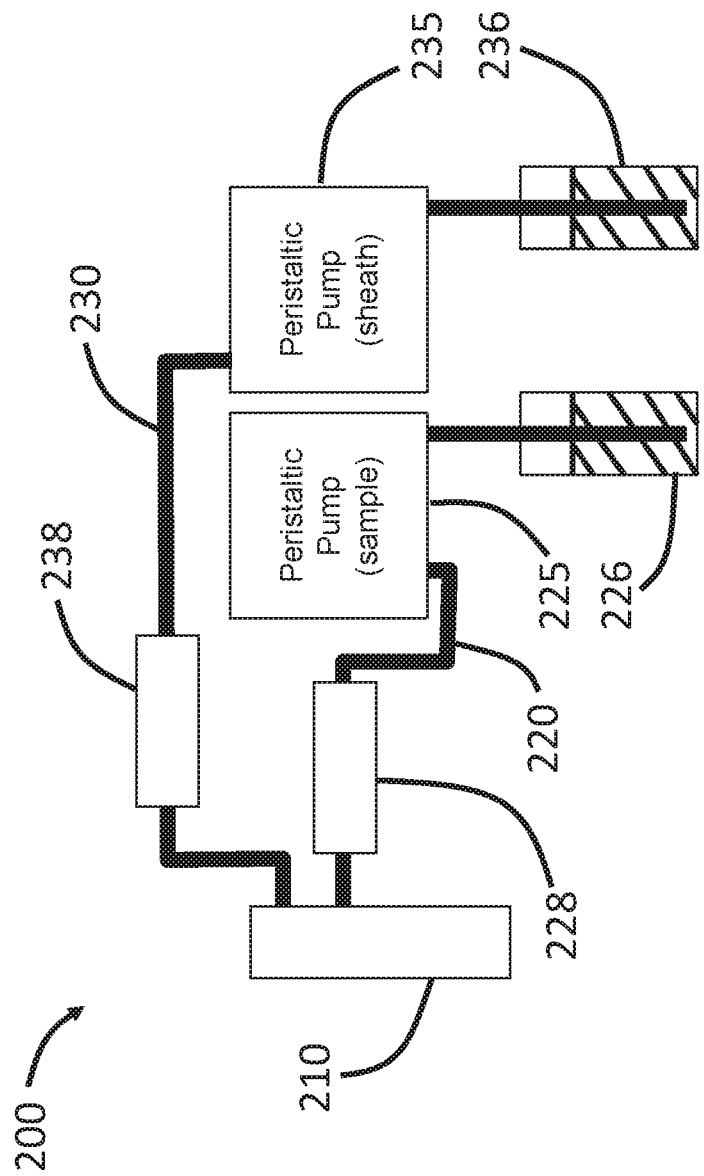
FIG. 2 illustrates a schematic of a cell sorting system that includes dampers, according to embodiments.

FIG. 2 shows a schematic of a schematic of a cell sorting system 200 that includes one or more dampers to reduce flow rate variations of peristaltic pumps, according to embodiments. The system 200 includes a sorting chamber 210 configured to receive a first fluid from a first fluid channel 220 (also sometimes referred to a "sample fluid channel") and to receive second fluid (e.g., a sheath fluid) from a second fluid channel 230 (also sometimes referred to a "sheath fluid channel"). A peristaltic pump 225 pumps the first fluid from a first fluid source 226 to the sorting chamber via the first fluid channel 220. A first damper 228 is coupled to the first fluid channel 220 to reduce the variations of the flow rate in the first channel 220 so as to deliver a consistent flow to the sorting chamber 210. Similarly, another peristaltic pump 235 is configured to pump the second fluid from a second fluid source 236 to the sorting chamber via the second fluid channel 230, and a second damper 238 is coupled to the second fluid channel 230 to reduce the variations of the flow rate in the second channel 230.

In operation, the dampers 228 and 238 in the first fluid channel 220 and the second fluid channel, respectively, can be filled with gas. In some embodiments, prior to cell sorting, the entire system 200 can be flushed with gas. A fluid can then be pumped through the system 200 to trap sonic gas within the dampers 228 and 238 and push out excess gas. When the first fluid is flowing in the first channel 220, the first fluid can enter the first damper 228 and compress the gas in the first damper 228. In other words, a portion of the gas in the first damper 228 can be trapped in the damper 228 that forms a cul-de-sac. In this manner, the first damper 228 can slow the flow of the first fluid in the first fluid channel 220. As the volumetric flow rate of the fluid leaving the peristaltic pump 225 can fluctuate periodically, the fluid volume in the first damper 228 can fluctuate proportionately as the gas is compressed or expanded due to changes in liquid pressure, which dampens the perturbations in flow rate. The second damper 238 can function in similar ways as the first damper 228 as described above.

In this manner, the dampers 228 and 238 can act as a mechanical low-pass filter that can reduce the dynamic range of flow rates (or the range of fluctuations in the flow rates, or the variation in flow rates, and/or the like). This reduction in flow rate range can narrow the distribution of cell/panicle velocities since the cells/particles are typically flowing at the same rate as the sample fluid. As a result, the time delay between cell detection and cell sorting can be derived more reliably, thereby improving the sorting performance. In some embodiments, the decreased pulsation can result in more confined hydrodynamic focusing of the sample fluid stream, which in turn can lead to higher coefficient of variation (CV) values in the fluorescent signals in the detection system.

Various types of gases can be filled in the dampers 228 and 238. In one example, the dampers 228 and 238 can be filled with atmospheric air. In another example, the dampers 228 and 238 can be filled with one or more gases that are not prone to react with the sample fluid and/or the sheath fluid, such as, for example, noble gases (e.g., Helium, Neon, Argon, Xenon, and/or combinations thereof). The initial pressure of the gas in the dampers 228 and 238 can be, for example, about 0.1 atmosphere, 0.2 atmosphere, 0.5 atmosphere, 0.8 atmosphere, 1 atmosphere, 1.2 atmosphere, 1.5 atmosphere, or any other pressure that is appropriate, including all values and sub ranges in between.

In some embodiments, at least one of the dampers 228 and 238 can be open to respective fluid channel (220 or 230) such that sample and sheath fluids can freely enter the dampers 228 and 238. In some embodiments, at least one of the dampers 228 and 238 can be separated from the corresponding channel 220 or 230 by a separator. The separator can include flexible or pliable membranes that readily allow expansion and contraction of the volume within the dampers 228 and 238 without leaking any gas within the dampers 228 and 238.

In some embodiments, one or more of the dampers 228 and 238 can be made of disposable materials. In some embodiments, the dampers 228 and 238 can include silicone and/or fiber-glass reinforced silicone. In some embodiments, the dampers 228 can 238 can be made of acryl (also referred to as the acryloyl group, prop-2-enoyl, or acrylyl). In sonic embodiments, the dampers 228 and 238 can include polydimethylsiloxane (PDMS). In yet another example, the dampers 228 and 238 can include poly(methyl methacrylate) (PMMA). PMMA is usually transparent to visible light and has low-fluorescence, thereby facilitating optical detection and sorting of cells, as well as microscopic imaging of the cells. In some embodiments, the tubing in the first channel 220 and the second channel 230 can also be made of the disposable materials.

Figure 3A:
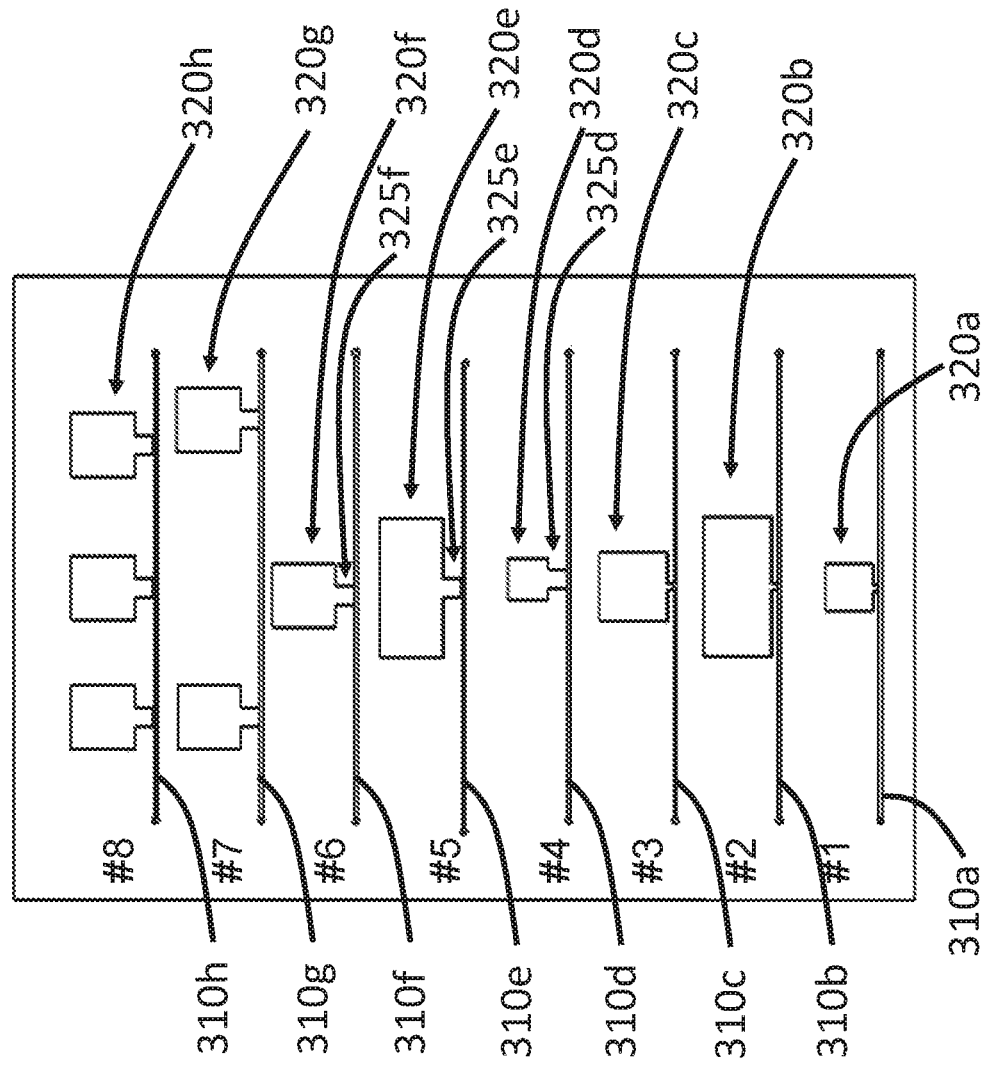
FIG. 3A illustrates schematics of air dampers that can be used in the cell sorting system shown in FIG. 2, according to embodiments.

FIG. 3A shows schematics of example dampers (collectively denoted by the reference character 300) that can be used to reduce flow rate variations in flow cytometers using peristaltic pumps as described herein. The dampers 300 include eight example, non-limiting configurations, numbered #1-#8. The first configuration #1 includes a fluid channel 310a (e.g., similar to the sample fluid channel or the sheath fluid channel) and a gas chamber 320a coupled to the fluid channel 310a to function as a damper. The gas chamber 320a has a substantially square shape. In an example embodiment, the volume of the gas chamber 320a can be about 92 mm$^3$. The second configuration #2 includes a fluid channel 310b and a gas chamber 320b coupled to the fluid channel 310b. The gas chamber 320b has a rectangular shape. In an example embodiment, the gas chamber 320b has a volume of about 369 mm$^3$. The third configuration #3 includes a fluid channel 310c and a gas chamber 320c coupled to the fluid channel 310c having a square shape. In an example embodiment, the gas chamber 320s has a volume of about 184 mm$^3$. For these three configurations #1 to #3, the gas chambers 320a to 320c are almost directly coupled to the fluid channels 310a to 310c, respectively. In other words, the sizes and/or volumes of the connectors between the gas chambers 320a to 320c and the corresponding fluid channels 310a to 310c can be negligible.

The fourth to sixth configurations #4 to #6 shown in FIG. 3A include gas chambers having different shapes. The fourth configuration #4 includes a fluid channel 310d and a gas chamber 320d coupled to the fluid channel 310d. The major part of the gas chamber 320d has a square shape but the gas chamber 320d also includes a neck portion 325d connecting the major part of the gas chamber 320d with the fluid channel 310d. In an example embodiment, the gas chamber 320d has a volume of 92 mm$^3$, which can be the same as the volume of the gas chamber 310a, but the neck portion 325d has a non-negligible volume. Similarly, the fifth configuration #5 includes a fluid channel 310e and a gas chamber 320e coupled to the fluid channel 310e. The gas chamber 320e includes a neck portion 325e to connect the major portion of the gas chamber 320e with the fluid channel 310e. In an example embodiment, the gas chamber 320e has a volume of about 369 mm$^3$. The sixth configuration #6 includes a fluid channel 310f and a gas chamber 320f coupled to the fluid channel 310f. The gas chamber 320f includes a neck portion 325f to connect the major portion of the gas chamber 320f with the fluid channel 310f. In an example embodiment, the gas chamber 320f has a volume of about 184 mm$^3$.

The seventh configuration 47 includes a fluid channel 310g and two gas chambers 320g coupled to the fluid channel 310g in series. In an example embodiment, the total volume of the two gas chambers 320g is about 368 mm$^3$. In one embodiment, each gas chamber of the two gas chambers 320g functions as a damper. In another embodiment, the two gas chambers 320g collectively function as a damper. The eighth configuration #8 includes a fluid channel 310h and three gas chambers 320h coupled to the fluid channel 310h in series. The total volume of the three gas chambers 320h is about 552 mm$^3$. The gas chambers 320g and 320h are disposed on the same side of the corresponding fluid channel 310g and 310h for illustrative purposes. In practice, the gas chambers can be disposed symmetrically or asymmetrically on both sides of the fluid channels. In addition, the number of gas chambers can also be greater than three (e.g., 5 gas chambers, 8 gas chambers, 10 gas chambers, or more).

The volume of the gas chambers 320a to 320h, in practice, can be different from the volumes shown in FIG. 3A. For example, the volume of the gas chambers 320a to 320h can be about 60 mm$^3$ to about 600 mm$^3$ (e.g., about 60 mm$^3$, about 80 mm$^3$, about 100 mm$^3$, about 120 mm$^3$, about 150 mm$^3$, about 180 mm$^3$, about 200 mm$^3$, about 240 mm$^3$, about 280 mm$^3$, about 300 mm$^3$, about 350 mm$^3$, about 400 mm$^3$, about 450 mm$^3$, about 500 mm$^3$, about 550 mm$^3$, and about 600 mm$^3$, including all values and sub ranges in between).

The two dimensional (2D) cross sections of the gas chambers 320a to 320h shown in FIG. 3A have a rectangular (or square) shape for illustrative purposes. Any suitable shape of the dampers 320a-320h can be employed depending on, for example, constraints of space in the resulting flow cytometer and/or desired form factor of the sorting cartridge. For example, the 2D cross sections of gas chambers 320a to 320h can be oval, round, polygonal, or any other shape known in the art. In the three dimensional (3D) space, the gas chambers 320a to 320h can be, for example, cylindrical, cuboid, spherical, or any other suitable shape known in the art.

As described herein, the gas chambers 320a to 320h can reduce flow rate variations of the fluid propagating in the corresponding fluid channels 310a to 310h. In sonic embodiments, the performance of the gas chambers 320a to 320h can be characterized by the flow rate variation after using the gas chambers 320a to 320h. For example, the variations of the flow rates can be less than 10% of the average flow rate (e.g., about 10%, about 8%, about 5%, about 3%, about 2%, about 1%, or less than 1%, including all values and sub ranges in between). The average flow rate that can be implemented in the system 300 can be, for example, about 1 µl/min to about 10 ml/min (e.g., 1 µl/min, 5 ml/min, 10 µl/min, 20 µl/min, 30 µl/min, 50 µl/min, 75 µl/min, 100 µl/min, 150 µl/min, 200 µl/min, 250 µl/min, 300 µl/min, 400 µl/min, 500 µl/min, 600 µl/min, 700 µl/min, 800 µl/min, 900 µl/min, 1 ml/min, 2 ml/min, 3 ml/min, 5 ml/min, 7.5 ml/min, or 10 ml/min, including all values and sub ranges in between).

Another parameter that can also characterize the performance of the gas chambers 320a to 320h is the reduction of flow rate variations induced by the use of the gas chambers 320a to 320h. The gas chambers 320a to 320h can be configured to reduce the variations of the flow rates by more than 80% compared to variations of flow rates without any gas chambers (e.g., more than 80%, more than 85%, more than 90%, more than 92.5%, more than 95%, more than 97.5%, more than 98%, more than 99%, or more than 99.5%, including all values and sub ranges in between). For example, flow rates after peristaltic pumps can be anywhere between 0 and 200 µl/min, i.e. the variation of the flow rates is about 200 µl/min. After using the gas chambers 320a to 320h, the flow rates can be about 110 µl/min to about 115 µl/min, i.e. the variation of the flow rates is about 5 µl/min, corresponding to a reduction of 97.5%.

Figure 3B:
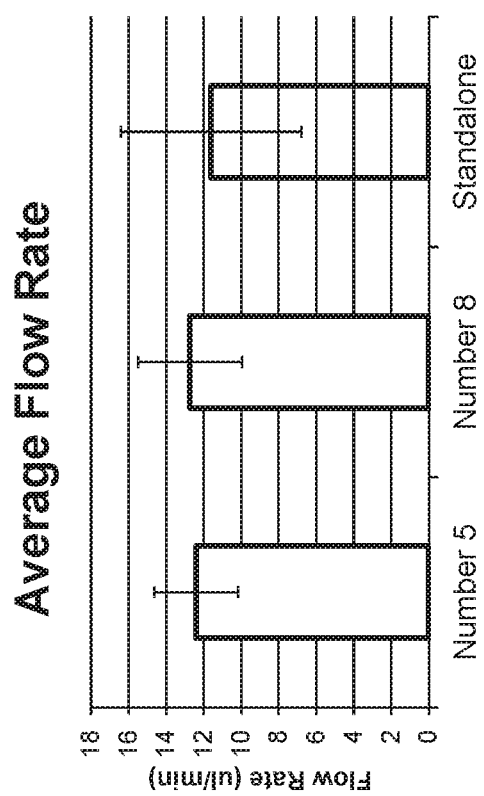
FIG. 3B illustrates flow rates of systems using air dampers shown in FIG. 3A, according to embodiments.

FIG. 3B illustrates measured flow rates in the fifth ("Number 5") and eighth ("Number 8") configurations shown in FIG. 3A. For comparison, flow rates in a system without dampers are also included in FIG. 3B ("Standalone"). It can be seen that the three systems have similar average flow rates of about 12 µl/min, but the fifth configuration has the most stable performance (i.e., the least amount of flow variations as indicated by the error bar). In some embodiments, larger damper volume can lead to better performance as the damper volume determines, at least in part, the amount of trapped gas that can be compressed and expanded for pulsation dampening. The fifth configuration also demonstrates robust performance under a wide range of flow rates (for example between 1 µl/min to 1 ml/min).

Figure 4A:
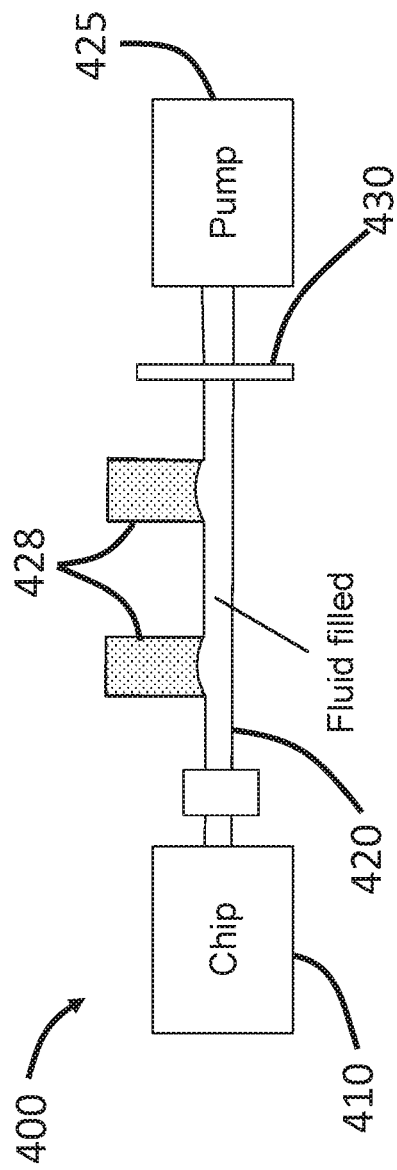
FIG. 4A illustrates a schematic of external gas dampers coupled to fluid channels for cell sorting systems, according to embodiments.

FIG. 4A illustrates a system 400 using external dampers to regulate flow rates after peristaltic pumps, according to embodiments. The system 400 includes a target chip 410 that receives fluid (e.g., sample fluid and/or sheath fluid) delivered by a fluid channel 420. The target chip 410 can be a sorting chamber, a detection chamber, and/or any other device(s) that receive fluid at constant flow rates. A peristaltic pump 425 pumps the fluid toward the target chip 410 via two chambers 428. The fluid channel 420 can also include an optional in-line filter 430 for sterilizing or clarifying culture media.

Figure 4B:
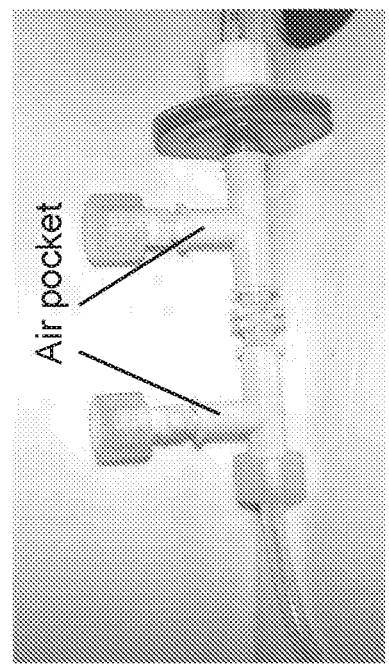
FIG. 4B illustrates an example system using external air dampers, according to embodiments.

FIG. 4B illustrates an example system schematically shown in FIG. 4A. In this example, the dampers 428 can be constructed using fluidic fittings (e.g., Nordson Medical, Fort Collins, CO). More specifically, the male end of a Male Luer to Female Luer Thread Style Coupler (LC78-1) can be connected to the vertical segment of a female Luer lug style tee (e.g., FTLT-1). The female end of the same Male Luer to Female Luer Thread Style Coupler can be capped with a Male Luer Integral Lock Ring Plug (e.g., LP4-1) so as to create a chamber that can trap gases. A second identical fitting assembly can also be constructed to produce a second gas chamber. A Male Luer Slip Coupler (e.g., MTLCS-1) can be used to connect the two assemblies with the capped vertical segments both facing upward. A 0.2 µm Acrodisc Syringe Filter (e.g., 4612, PALL Life Sciences, Port Washington, NY) can be connected to one end of the combined assembly. Two Male Luer Integral Lock Ring to 500 Series Barb (1/16") fittings (MTLL004-1) can be connected to both free ends of the resulting assembly. External dampers 428 without the filter 420 can be used for sample fluid. An inlet silicone tubing can be connected to the barb on the filter end of the air damper 428, while an outlet silicone tubing can be connected to the barb on the outlet end of the air damper 428.

Figure 5:
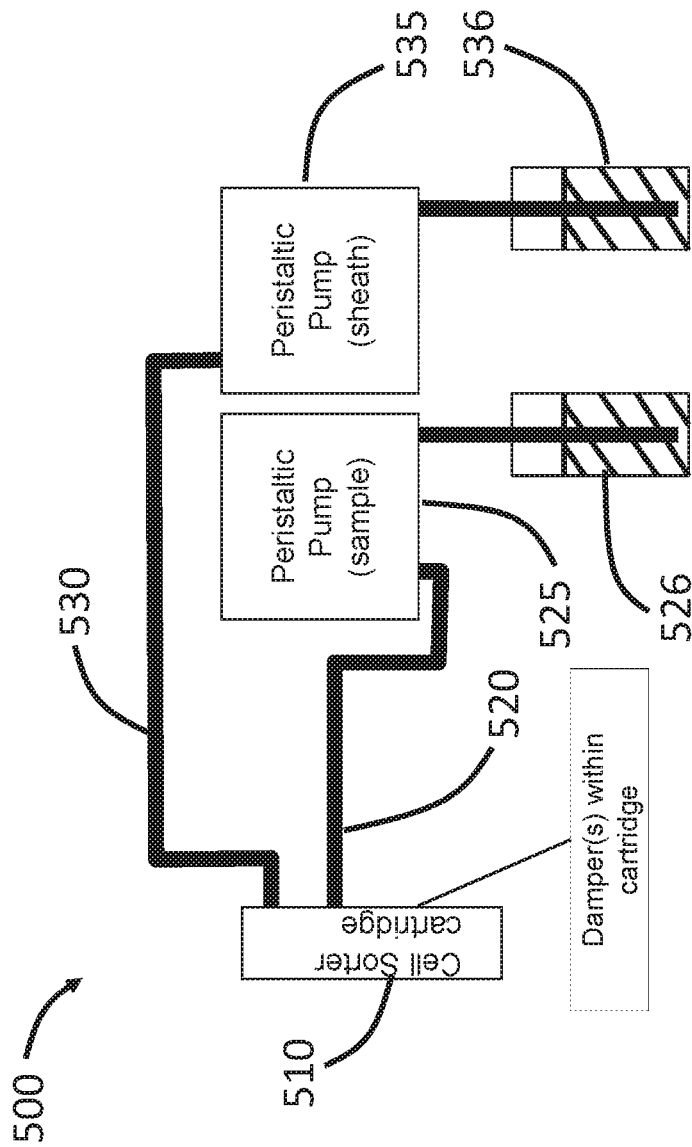
FIG. 5 illustrates integrated gas dampers for peristaltic pumps that pump sample and sheath fluid to a microfluidic cell sorting system, according to embodiments.

FIG. 5 illustrates a system 500 using one or more on-cartridge dampers to regulate flow rates of fluid delivered by peristaltic pumps. The system 500 includes a cartridge 510 configured to receive sample fluid from a sample channel 520 and to receive sheath fluid from a sheath channel 530. A peristaltic pump 525 in the sample channel 520 pumps the sample fluid from a sample fluid source 526 toward the cartridge 510 and another peristaltic pump 535 in the sheath channel 530 pumps the sheath fluid from a sheath fluid source 536 toward the cartridge 510. The system 500 shown in FIG. 5 is different from the system 100 shown in FIG. 1 in that the cartridge 510 includes integrated dampers (see, e.g., FIG. 6A, FIG. 6B, or FIG. 7) to regulate flow rates of the sample and sheath fluid.

FIG. 6A illustrates a system 600, and illustrates how empty space in an existing substrate design can be modified to construct/include gas dampers. The system 600 includes a substrate 601, in which empty space is fabricated to construct a fluid channel 610 and a gas chamber 620 ("air pocket") in fluid communication with the fluid channel 610. The substrate 601 can be made of low-cost and disposable materials such as silicone, fiber-glass reinforced silicone, acryl, PDMS, PMMA, or any other material known in the art. In one example, the gas chamber 620 can be molded in the cartridge 610 along the fluidic channel 610. In another example, the gas chamber 620 can be fabricated by etching the substrate 601. The parameters of the gas chamber 620 (e.g., volume, reduction of flow rate variations, etc.) can be substantially similar to the gas chambers 320a to 320h shown in FIG. 3A and described above.

FIG. 6B is a photo of an example cell sorting cartridge including integrated dampers schematically shown in FIG. 6A. Using integrated dampers (also referred to as on-cartridge dampers) can reduce the size and cost of the damper, by utilizing empty space in the chip cartridge rather than fabricating additional external gas dampers. The working principle of the integrated on-cartridge gas damper can be identical to the external dampers described above: gas is trapped in a pocket above the fluid channel and compresses to dampen flow rate pulsations.

Figure 7:
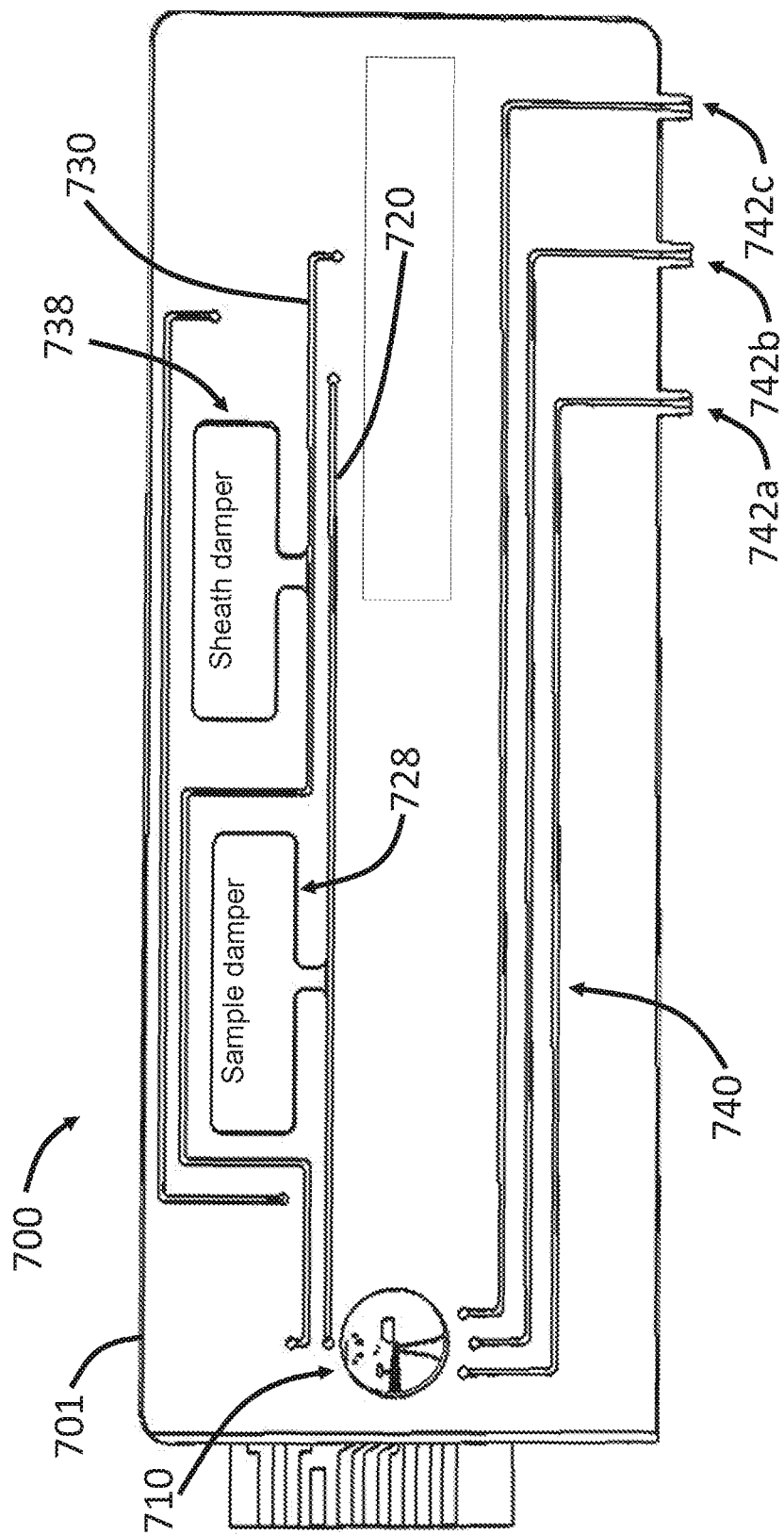
FIG. 7 illustrates a cell sorting cartridge with on-cartridge bubble dampers for both sample fluid channel and sheath fluid channel, according to embodiments.

FIG. 7 illustrates an example flow cytometer 700 using on-chip dampers to regulate flow rates of fluids, such as, for example, sample and sheath fluids. The cytometer 700 includes a substrate 701, in which a sorting chamber 710 is fabricated. The sorting chamber 710 receives sample fluid, including cells to be sorted, from a sample channel 720 and receives sheath fluid from a sheath channel 730. The sample channel 720 includes a sample fluid damper 728 in fluid communication with the sample fluid channel 720. The sheath channel 730 similarly includes a sheath fluid damper 738 in fluid communication with the sheath fluid channel 730. The two dampers 728 and 738 (also referred to as bubble dampers) include empty spaces defined by the substrate 701 and therefore are intergrade into the substrate 701 with high compactness. After sorting, different types of cells in the sample fluid are directed into three different output ports 742a, 742b, and 742c in an output channel 740. In practice, the number of output ports (also the number of different types of cells that can be distinguished by the sorting system 700) can be greater or less than three. The system 700 shown in FIG. 7 is fabricated in a single chip and therefore can be highly compact. In addition, the substrate 701 can be made of low-cost and disposable materials, thereby avoiding extensive cleaning between runs.

Figure 8A:
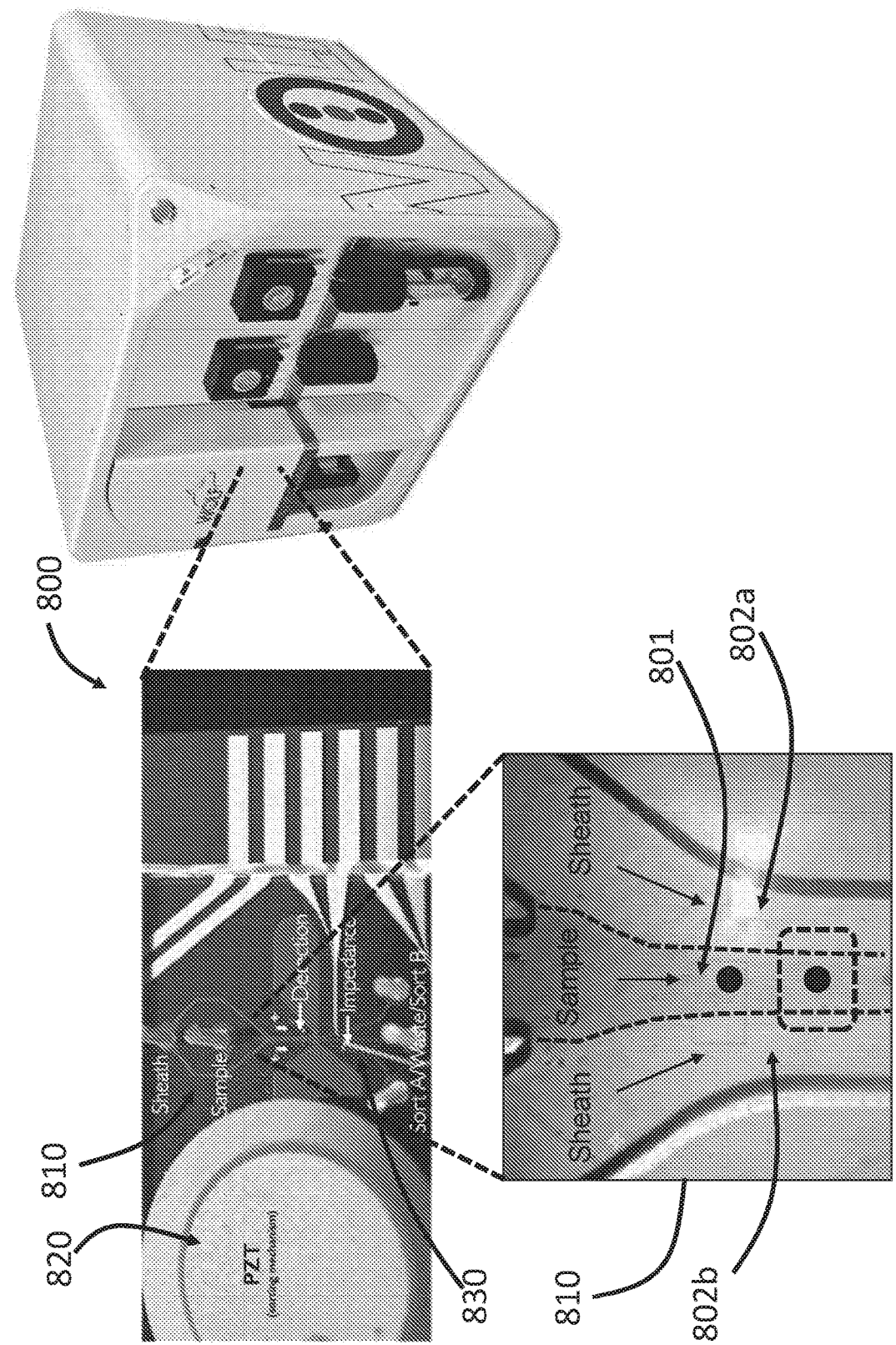
FIG. 8A illustrates a cell sorter and a closed-path microfluidic cell sorter chip that can use peristaltic pumps and gas dampers, according to embodiments.

FIG. 8A shows an example flow cytometer 800 where gas dampers described herein can be employed to stabilize flow rates, such as of sample and sheath fluids. The flow cytometer 800 includes a sorting chamber 810, where sample fluid 801 including cells of interest is sandwiched between two streams of sheath fluid 802a and 802b. Pressure ratio from the two streams of sheath fluid 820a and 802b and the sample fluid 801 can be consistent and stable for proper analysis and sorting along the main channel. One factor that can influence this pressure ratio can be the flow rates of the sample and sheath fluid. To this end, peristaltic pumps in combination with gas dampers described above can be used to deliver the sample fluid 801 and sheath fluid 802a and 802b so as to achieve constant flow rates. Once a cell of interest is detected, the sorting chamber can use a piezoelectric actuator 802 to deflect the sample fluid 801 toward a designated output channel 830. More information of flow cytometers using piezoelectric sorting can be found in U.S. Pat. No. 9,134,221, the entire disclosure of which is incorporated herein by reference in its entirety.

Figure 8B:
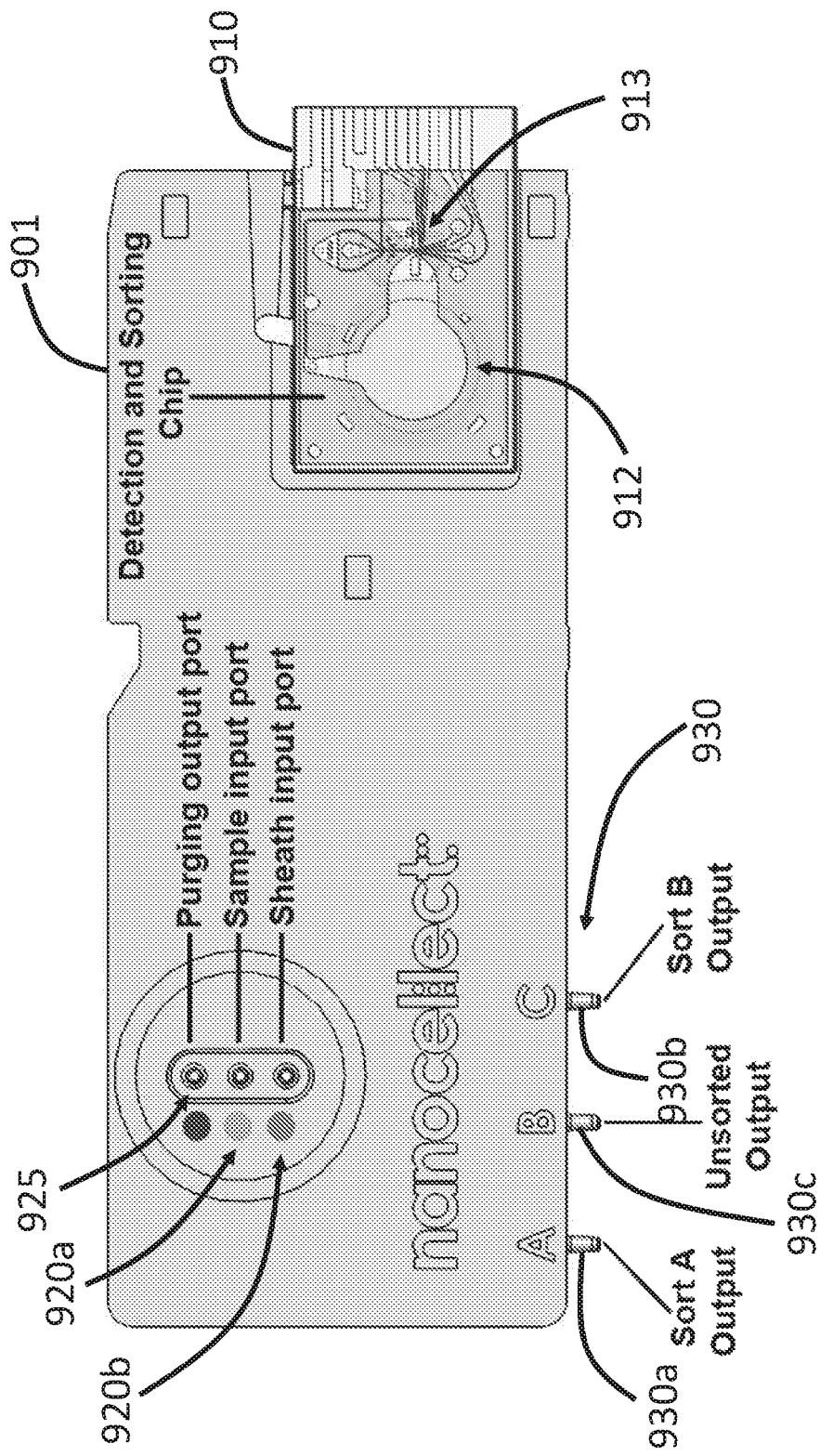
FIG. 8B illustrates a system including a detection and sorting chip that can use peristaltic pumps and gas dampers, according to embodiments.

FIG. 8B illustrates an example detection and sorting chip 910 that can employ one or more dampers as described herein. An external chip 901 holds and/or is generally fluidly coupleable to the detection and sorting chip 910. In some embodiments, the detection and sorting chip 910 can be removable from the external chip 901. The detection and sorting chip 910 includes a sorting junction 913 where different cells are directed into different output channels by a piezoelectric actuator 912. In some embodiments, the piezoelectric actuator 912 can bend upward in response to a positive voltage applied on the piezoelectric actuator 912 and bend downward in response to a negative voltage applied on the piezoelectric actuator 912. By bending toward different directions, the piezoelectric actuator 912 can direct cell(s) in an input channel of the chip 910 into different output channels of the chip 910.

The external chip 901 includes a sample input port 920a to transmit sample fluid into the system 900 and a sheath input port to transmit sheath fluid into the system 900. The external chip 901 further includes a purging output port 925 to remove purging fluid after, for example, the purging fluid cleans the system 900. Three output ports 930a-930c are disposed at the edge of the external chip 901 to receive cells from the sorting junction 913 and deliver the received cells. The output ports 930 include a sort A output 930a, an unsorted output 930c, and a sort B output 930b. In some embodiments, the Sort A output 930a and Sort B output 930b receive cells from the sorting junction when the piezoelectric actuator 912 is bending upward and downward, respectively, and the unsorted output 930c can receives cells when the piezoelectric actuator 912 is in its natural state without applied voltage. Said another way, the external chip 901 can have formed therein fluidic channels (not shown) that couple the input ports 920a-920b, the purging output port 925, and the post-sorting output ports 930a-930c to respective ports of the detection and sorting chip 910. The use of a replaceable detection and sorting chip 910 can prevent sample-to-sample contamination.

Figure 9:
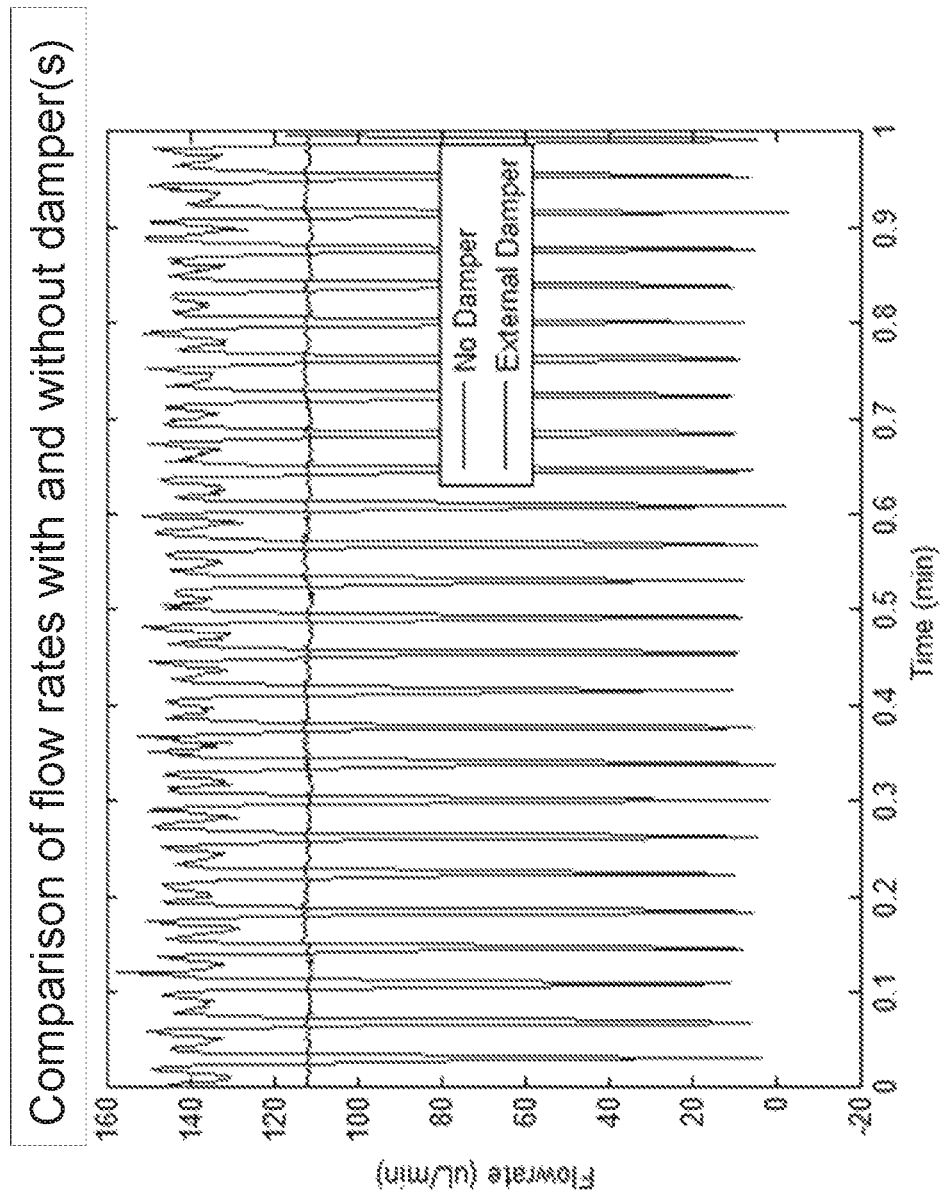
FIG. 9 is a plot that shows flow rates versus time with and without gas dampers, according to embodiments.

FIG. 9 illustrates measured flow rates with and without gas dampers in systems using peristaltic pumps. When the peristaltic pump tubing is directly connected to the sorting chip without a gas damper, severe pulsation ("No Damper" line) is observed with a flow rate sensor (e.g., Fluigent, Paris) placed downstream in series with the fluidic line. This flow rate pulsation ranges from 0 to over 200 When a gas damper is connected between the pump and chip, the flow rate pulsation range drops to 110 to 113 µL/min ("External Damper" line), demonstrating significant reduction of variations of flow rates.

FIGS. 10A-10B are plots of flow rates versus time with external gas dampers for sample fluid and sheath fluid, respectively. Repeated analysis of both sheath fluid and sample fluid flow rates show consistent reduction of pulsation when using gas dampers. In these experiments, the average flow rate of the sheath fluid is about 120 µL/min and the average flow rate of the sample fluid is about 20 µL/min. In both cases, the resulting variations of the flow rates are less than 5 µL/min. This reduction in flow rate variation can allow cell sorting systems to use peristaltic pumps without sacrificing the performance of the sorting function.

Figure 11B:
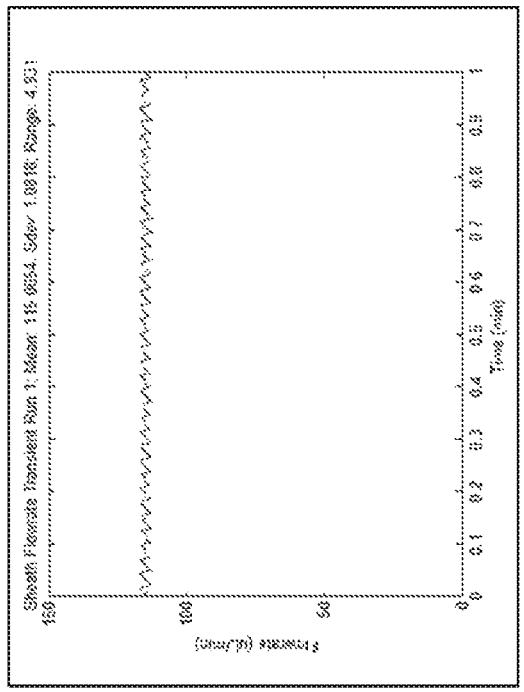
FIGS. 11A and 11B are plots of flow rate versus time with and without an on-cartridge damper, respectively, for sheath fluid, according to embodiments.
Figure 11A:
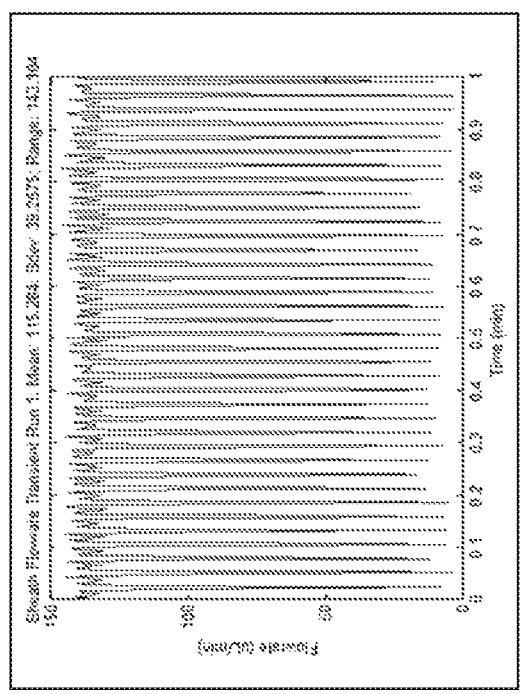

FIGS. 11A-11B are plots of flow rates versus time with and without an on-cartridge damper for sheath fluid. Without on-cartridge dampers, the flow rates of the sheath fluid after peristaltic pump are oscillating between 0 and about 145 µL/min at an oscillation frequency of about 40 cycles per minute. Including on-cartridge dampers into the system substantially stabilizes the flow rate at around 115 µL/min, with a variation less than 5 µL/min.

Figure 12B:
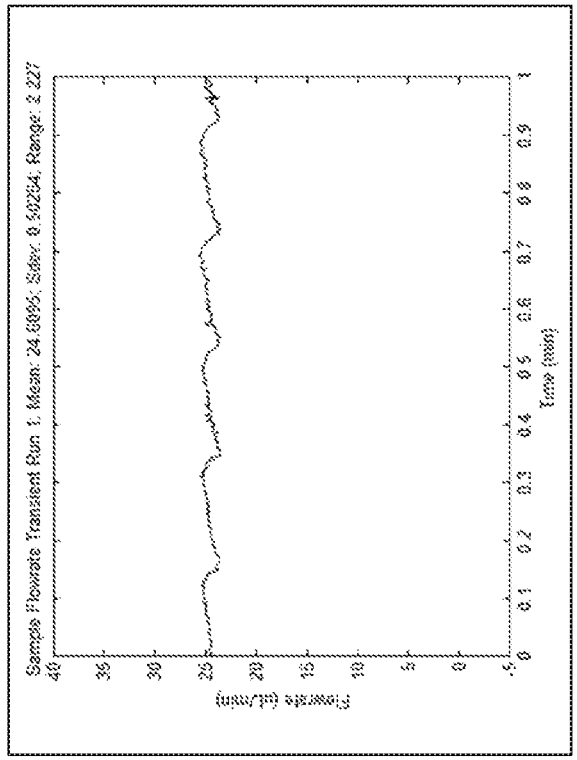
FIGS. 12A and 12B are plots of flow rate versus time with and without an on-cartridge damper, respectively, for sample fluid, according to embodiments.
Figure 12A:
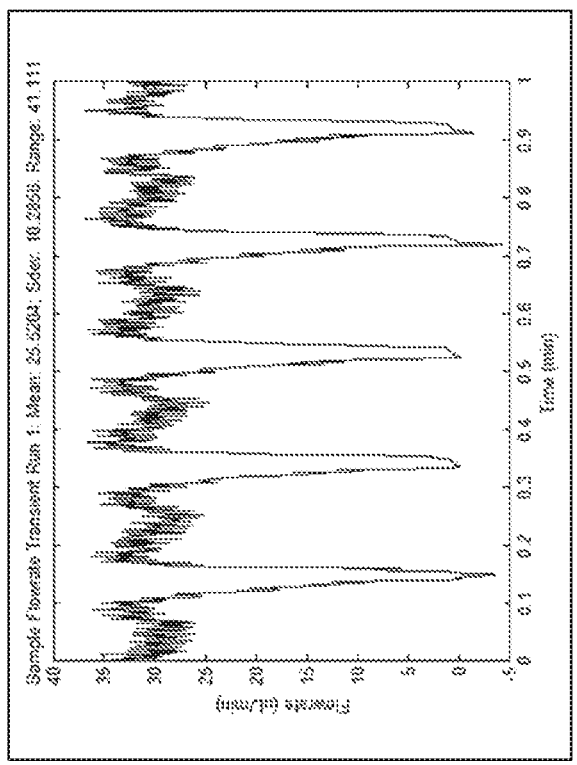

FIGS. 12A-12B are plots of flow rate versus time with and without an on-cartridge damper for sample fluid. Without on-cartridge dampers, the flow rates of the sample fluid after peristaltic pump are oscillating between 0 and about 35 µL/min at an oscillation frequency of about 6 cycles per minute. In addition, there are also some high frequency oscillations of flow rates within each cycle. Including on-cartridge dampers into the system substantially stabilizes the flow rate at around 25 µL/min, with a variation less than 3 µL/min.

Figure 13A:
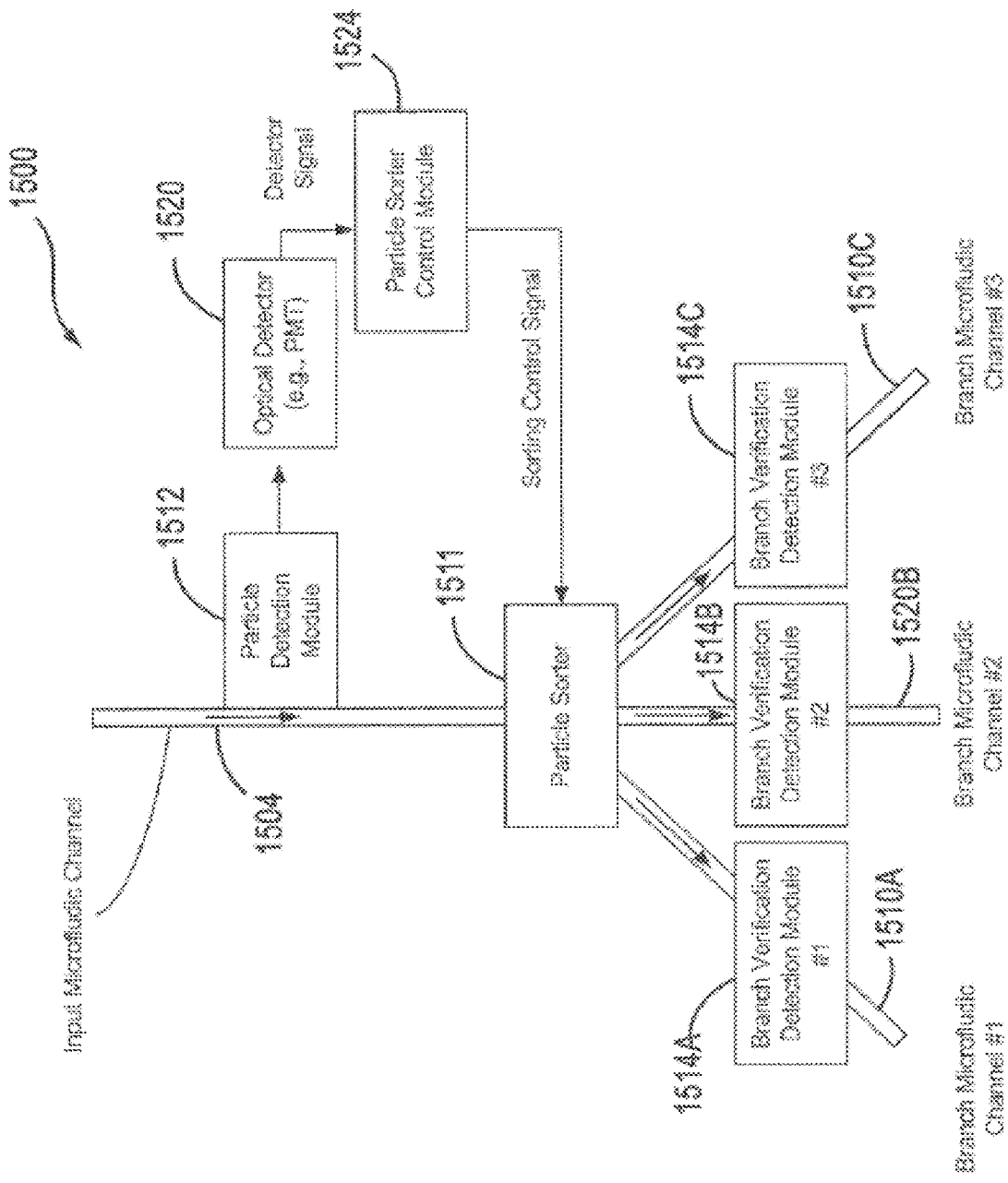
FIG. 13A illustrates a microfluidic cell detector and sorter, according to an embodiment.

FIG. 13A illustrates an approach for verification of sorting, and illustrates a microfluidic detector/sorter 1500 (e.g., structurally and/or functionally similar to aspects of the system 100) including a sensing mechanism (e.g., reference characters 1514A-1514C, described in more detail below) in one or more branch fluidic channels 1510A-1510C downstream from a particle sorting junction 1511. In some embodiments, the combination of using the optical sensing at a pre-sorting location and sensing (e.g., optical sensing, impedance-based sensing, and/or the like) at a post-sorting location in a microfluidic detector can be used to provide better controlled operation for more efficient flow cytometry measurements. In the illustrated embodiment, the post-sorting sensing can be used to verify whether a desired particle sorting performed by the actuator in the particle sorting junction 1511 is properly executed. In the illustrated embodiment, the post-sorting sensing can be used as input for operating a post-sort valve.

In some embodiments, the embodiment of FIG. 13A includes a branch verification structure (e.g., 1514A) that is coupled to one of the branch fluidic channels (e.g., the channel 1510A) to receive light from and/or detect impedance variation in the one branch fluidic channel and to produce a branch verification optical signal that can be used to verify whether a target particle is directed by the actuator into the one branch fluidic channel. Two or more such branch verification structures can be implemented in some embodiments. In the embodiment of FIG. 13A, all three branch fluidic channels 1510A-1510C have such verification detection modules 1514A-1514C. In other embodiments, some branches can have such verification structures, when other branches may not.

In an example embodiment of FIG. 13A, the optical detector 1520 is located to receive light which includes at least the one or more optical signals from the particle detection module 1512 and the branch verification optical signal from the verification detection modules 1514A-1514C. In some embodiments, an optical detector produces a detector signal that carries information contained in the received light. The signal processing mechanism in the particle sorter control module 1524 extracts information of the branch verification optical signal to produce an indicator that verifies whether a target particle is directed by the actuator into the one branch fluidic channel. In some embodiments, irrespective of whether optical-based verification or impedance-based verification is used, the verification signal can be automatically fed back to the particle sorter control module 1524 which can, in response to a verification of malfunction in the sorting, interrupt the system operation (e.g., stopping the incoming sample flow and the sorting operation by the actuator). In some embodiments, an alert signal (e.g., a visual signal such as a pop-up warning and/or a blinking light, an audio signal such as a beep, and/or the like) can be generated by the particle sorter control module 1524 to alert the operator of a microfluidic detector of the malfunction in the sorting.

Figures 26A, 26B:
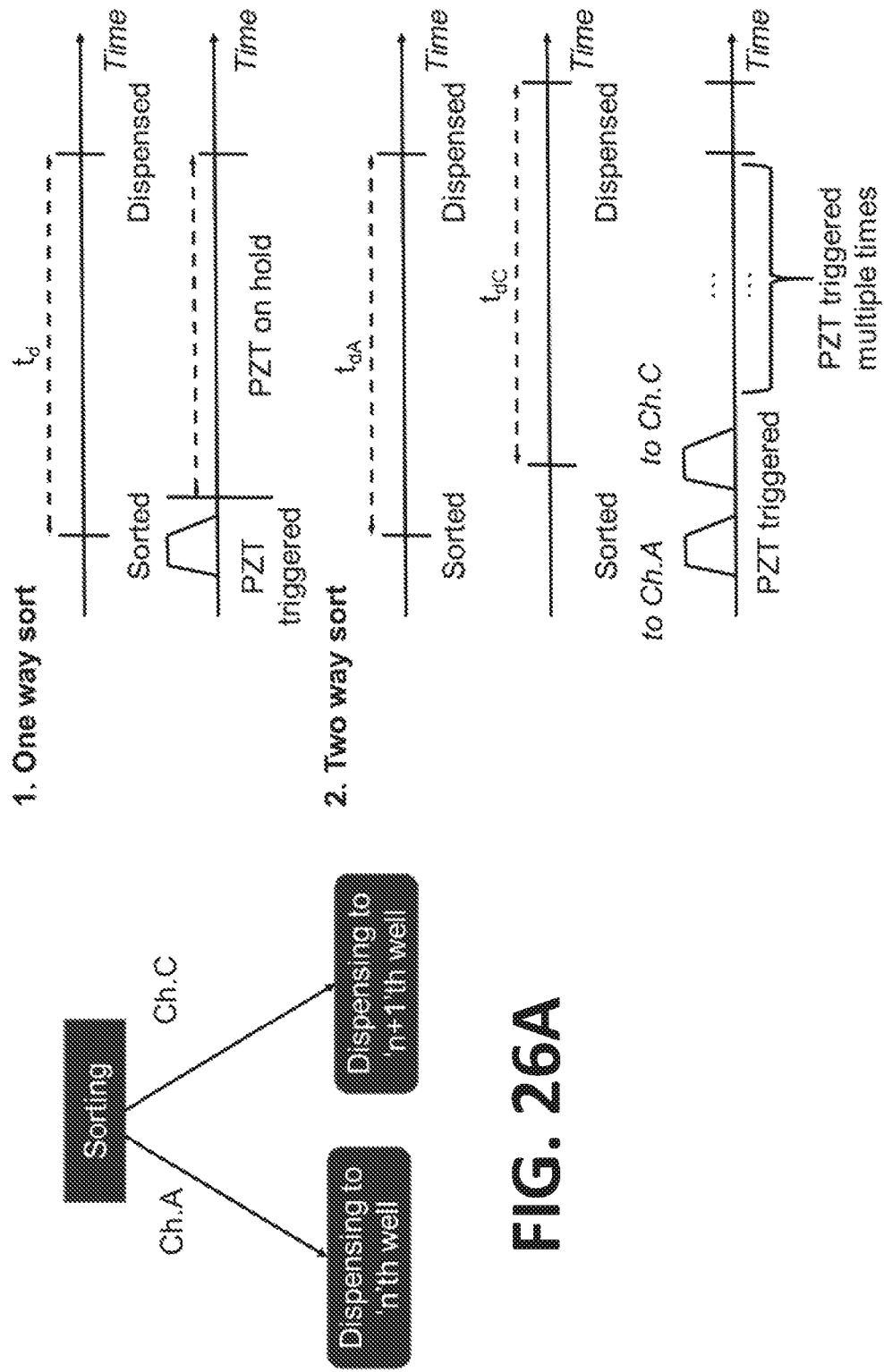
FIGS. 26A-26B illustrate approaches for dispensing of sorted particles.

In some embodiments, as best illustrated in FIGS. 13A and 26A-26B, each sorted particle, such as a particle sorted into the channel 1510A or the channel 1510C, or cell can be dispensed onto a suitable substrate (not shown) for post-sorting processing and/or handling. In some embodiments, the substrate can be a well plate (e.g., with or without media, cells, and/or matrix-forming materials in one or more wells), a glass or polymer surface (e.g., a glass slide), a culture plate (e.g., with or without media), directly into a target organism (e.g., a mouse), and/or the like. In some embodiments, such dispensing can be performed for unsorted particles. In some embodiments, the sorted/unsorted cells or particles are dispensed into 96- or 384-well plates. In some embodiments, a single particle or multiple particles can be disposed in a single operation.

In some embodiments, the system 1500 and/or the channel (e.g., the channel 1510A) can be coupled to the downstream substrate via any suitable means, such as by tubing, by conduits formed at least partially in a cartridge (e.g., see FIG. 7) of the system 1500, and/or the like. In some embodiments, the system 1500 can be configured to dispense a predetermined volume of liquid (e.g., using peristaltic pumps, as disclosed herein) with a predetermined number of particles (e.g., where the number of particles is determined by optical detection and/or post-sorting verification as disclosed herein). In some embodiments, dispensing is affected by movement of the system 1500 relative to the substrate, while in other embodiments, dispensing is affected by movement of the substrate relative to the system. FIG. 26A illustrates an example embodiment where particles sorted to two different channels, Ch. A (e.g., the channel 1510) and Ch. C the channel 1510C) are dispensed into two different wells (e.g., two adjacent wells) of a multi-well plate.

In some embodiments, after a first particle is sorted to a branch channel, a second particle is not sorted until the first particle has been dispensed. In this manner, when velocities of different particles in an input stream are variable, cross-contamination can be avoided. As illustrated in FIG. 26B ("one way sort"), in such embodiments, the system 1500 can be configured to not trigger sorting via the particle sorter 1511 (e.g., the piezoelectric actuator as described herein) until the sorted particle has been dispensed, after time td. When particle velocities are consistent, the number of particles that can be sorted can be limited by the relative speed of movement between the system 1500 and the substrate.

Still referring to FIG. 26B, in some embodiments, when two particles are sorted to different channels (e.g., see FIG. 26A, and "two way sort" in FIG. 26B) with a sort-to-dispense time of $t_{dA}$ and $t_{dC}$ respectively, dispensing at a higher rate at be achieved, relative to using one branch channel alone. Said another way, since the particle sorter 1511/piezoelectric actuator can be triggered more frequently relative to the "one way sort" approach, a higher dispensing throughput can be achieved.

In some embodiments, the substrate can be coupled to one or more analytical tools, such as a microscope, that is configured to verify the desired particle(s), or a quantity thereof, when dispensing the particle(s) onto a substrate. In some example embodiments, the microscope is attached to a gantry that also carries tubing for dispensing of particles from the branch channel(s) into one or more wells of a cell culture plate. In some embodiments, the microscope can be of the (relatively miniature) form as generally disclosed in "Miniaturized integration of a fluorescence microscope", Ghosh et al., *Nature Methods* 8, 871-878 (2011), the entire disclosure of which is incorporated herein by reference. In some embodiments, the microscope can perform optical measurement and/or analysis on the dispensed particle during dispensing, and in some embodiments, the optical measurement/analysis can be done after dispensing. In some embodiments, the optical measurement and/or analysis can be repeated over time, such as to, for example, measure cell growth, differentiation, and/or the like. For example, in some embodiments, the optical measurement/analysis can be used to confirm mono-clonality in cell line development, to measure growth or a lack thereof, one or more color(s) associated with the sorted particle(s), fluorescence, chemical or bioluminescence, refractive/reflective/diffusive qualities, phase contrast, and/or the like. When a microscope similar to that disclosed in Ghosh et al. is employed, the small and relatively inexpensive nature of the microscope allows for real-time optical analysis while maintaining a compact footprint.

Referring again to the optical detector 1520 of FIG. 13A, in some embodiments, optical verification of sorting can be performed as follows, explained using the branch verification detection module 1514A for simplicity. The module 1514A can include a light source, such as an LED, configured to generate a light signal that is passed through a slit of the module 1514A and is configured to shape and direct the light into the path of a particle in the branch channel 1510A. The sorted particle in the channel 1510A can obstructs all or a portion of the light, resulting in a characteristic change in an optical detector of the module 1514A, such as a PMT or silicon diode. For example, the obstruction of light by the particle can result in a "shadow" on the detector, and be indicative of the presence of a particle. In some embodiments, such optical verification can be repeated for a multiple particle paths in parallel such as, and as illustrated in FIG. 13A, by use of each of the modules 1514A-1514C to perform optical verification for its respective channel as described herein for the module 1514A. In some embodiments (not shown), a single light source and detector can be employed across all channels 1510A-1510C for optical verification.

In some embodiments (not shown), such optical verification can be repeated using multiple detectors in series to improve reliability of verification; i.e., the module 1510A can encompass multiple detectors in series, and any suitable resolution approach can be used to determine whether to deem that a particle has been sorted. For example, the use of multiple detectors can provide for improved SNR when the signal from a single detector alone is weak. As another example, if at least one detector deems that the particle has been sorted, then sorting can be verified. As yet another example, in a channel where non-sorted particles enter (e.g., channel 1510B), the multiple detectors can be employed to confirm depletion of cells relative to the source fluid due to sorting of some particles into other channels (e.g., the channel 1510A and/or the channel 1510C).

Figure 27A:
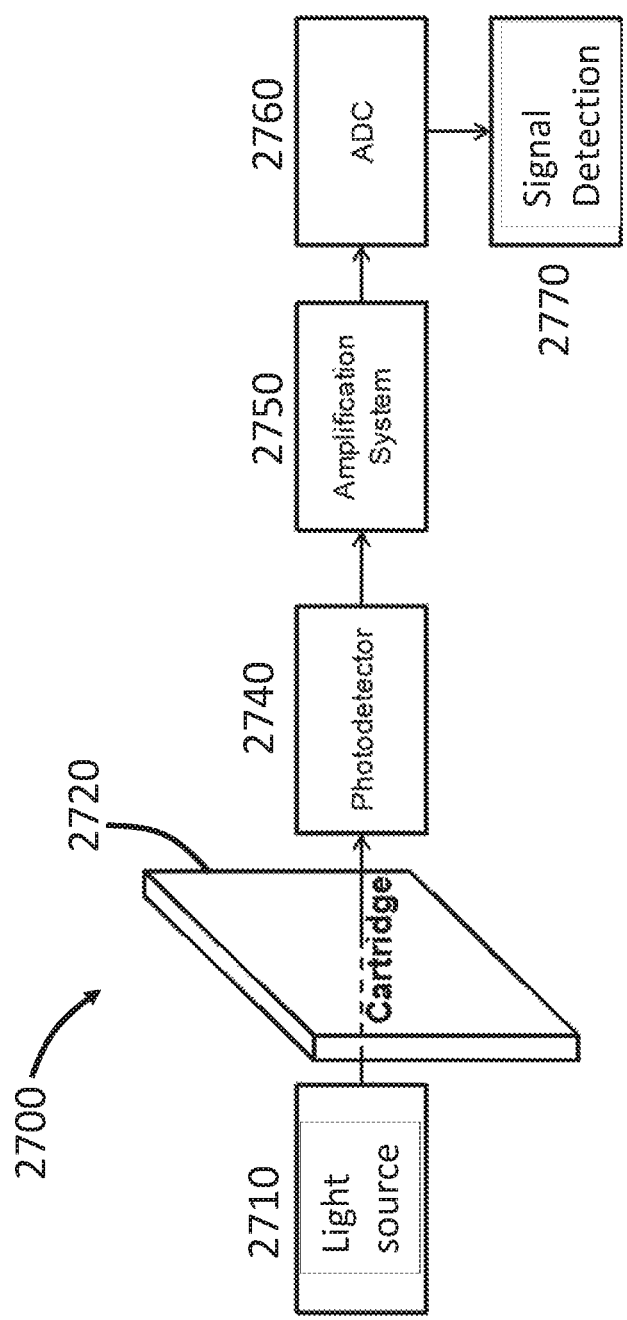

FIG. 27A illustrates a system 2700 of such an example branch verification module as disclosed herein when used to verify sorting in a channel of a cartridge (e.g., the cartridges in FIG. 7, FIGS. 30A-30D, or FIG. 35). The system 2700 includes a light source 2710 (e.g. LED or LED array) to emit light signals that illuminate a cartridge 2720 (more specifically branch channels on the cartridge 2720). A detector 2740 (e.g. photodetector or photodetector array) is in optical communication with the cartridge 2720 to receive the light signals after the cartridge 2720. The light signals after the cartridge can include light that is transmitted through the cartridge 2720, scattered/diffused by particles in the cartridge 2720, emitted by particles (e.g. fluorescence) in the cartridge 2720, or any other light that is indicative of the presence or absence thereof. The system 2700 also includes an optional amplification system 2750 (e.g. an operational amplifier) to amplify the detection signal generated by the detector 2740, an optional analog-to-digital (ADC) 2760 to digitize the amplified signal, and an optional signal detection unit 2770 (e.g. a processor) to analyze the digital signal.

FIG. 27B illustrates optical verification for three channels 2730 (also referred to as branch channels 2730, such as channels similar to the branch verification channels 1510A-C), according to embodiments. In these embodiments, each module includes a corresponding light source 2710 configured to emit a light signal 2712 at its corresponding channel via a corresponding slit 2715 during use. In some embodiments, each detector 2740 is configured to detect the light signal 2712 in its corresponding channel, with the lack of detection of at least a portion of the light signal indicative of the presence of a particle 2750a. FIG. 27B also illustrates that the particle in a particular channel can then dispensed into a corresponding substrate 2760 as described herein. In some embodiments, the particle can be included and/or enclosed in a droplet.

FIG. 27C shows a sample signal (e.g. received by the one of the detectors 2740) indicating the presence of the particle 2750a. The particle 2750a blocks the light signal 2712 illuminating the branch channel 2730 where the particle 2750a is sorted into, thereby generating a dip in the light signal detected by the detector 2740. For comparison, a second particle 2750b is also illustrated in FIG. 27B. The second particle 2750b is out of the illumination region and therefore does not affect the detection signal shown in FIG. 27C.

Figure 27D:
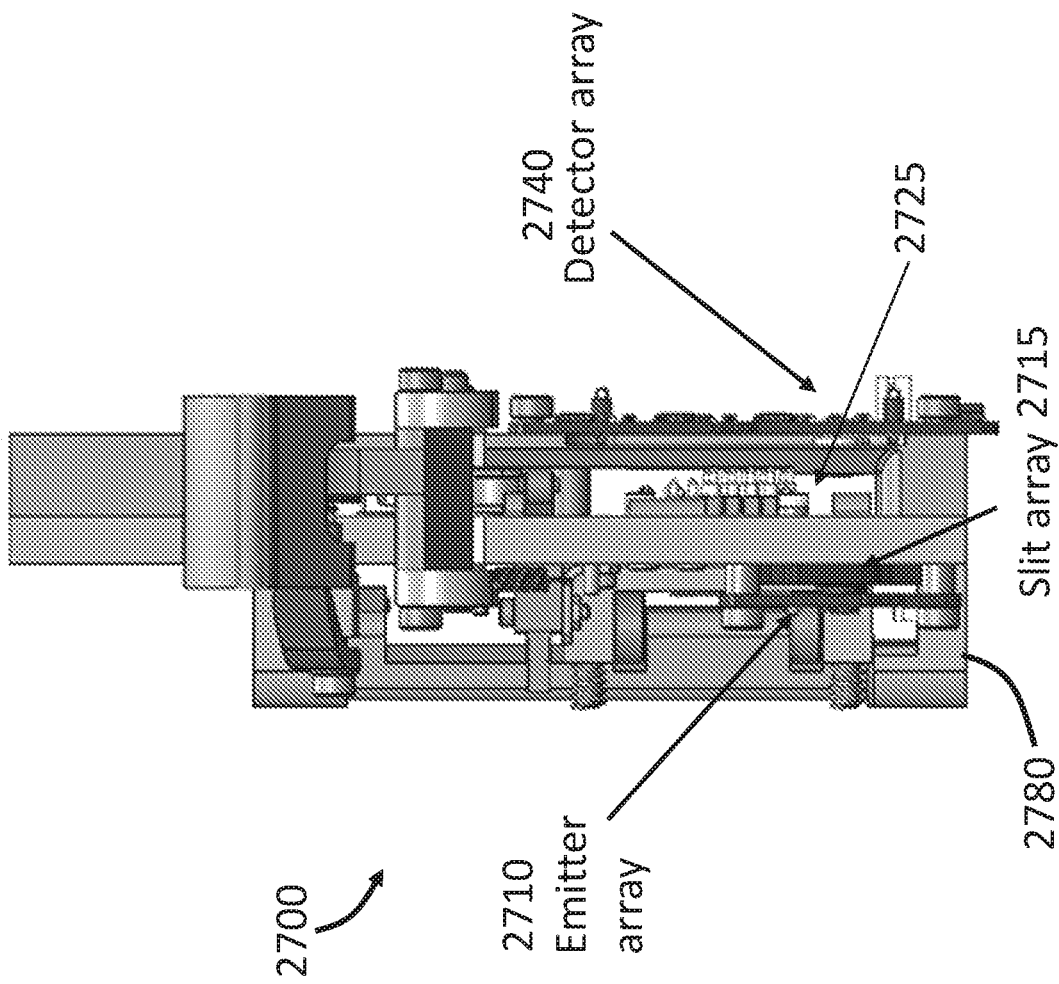

In some embodiments, the LED 2710, the slits 2715, and the detector 2740 can be integrated into a receiving fixture 2780 (also referred to as a receiving structure 2780) that can be configured to receive and align the cartridge 2720, as illustrated in FIG. 27D. The receiving fixture 2780 can include an opening 2725 to receive the cartridge 2720. When the cartridge 2720 is inserted into the receiving fixture 2780 and properly secured (e.g. via alignment features on the cartridge 2720 and/or the receiving fixture 2780), the branch channels 2730 are aligned with the light source 2710, the slit array 2715, and the detector 2740. More details about the fixture 2780 are provided below with reference to FIGS. 29A-29D.

Figure 27F:
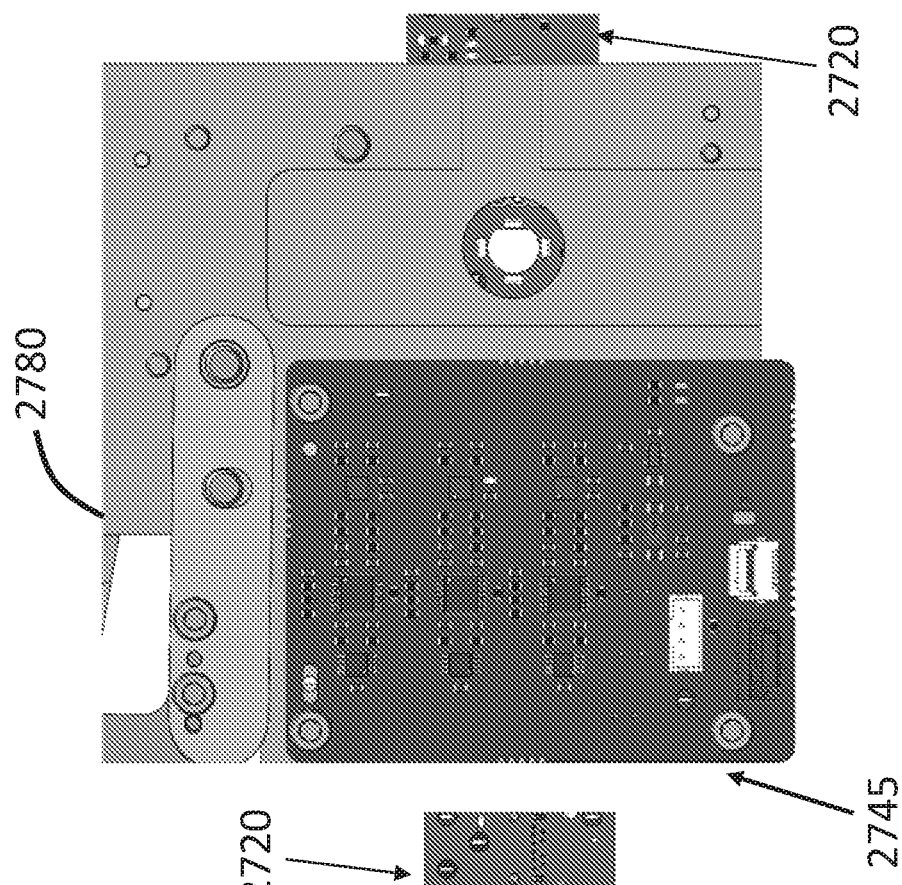
Figure 27E:
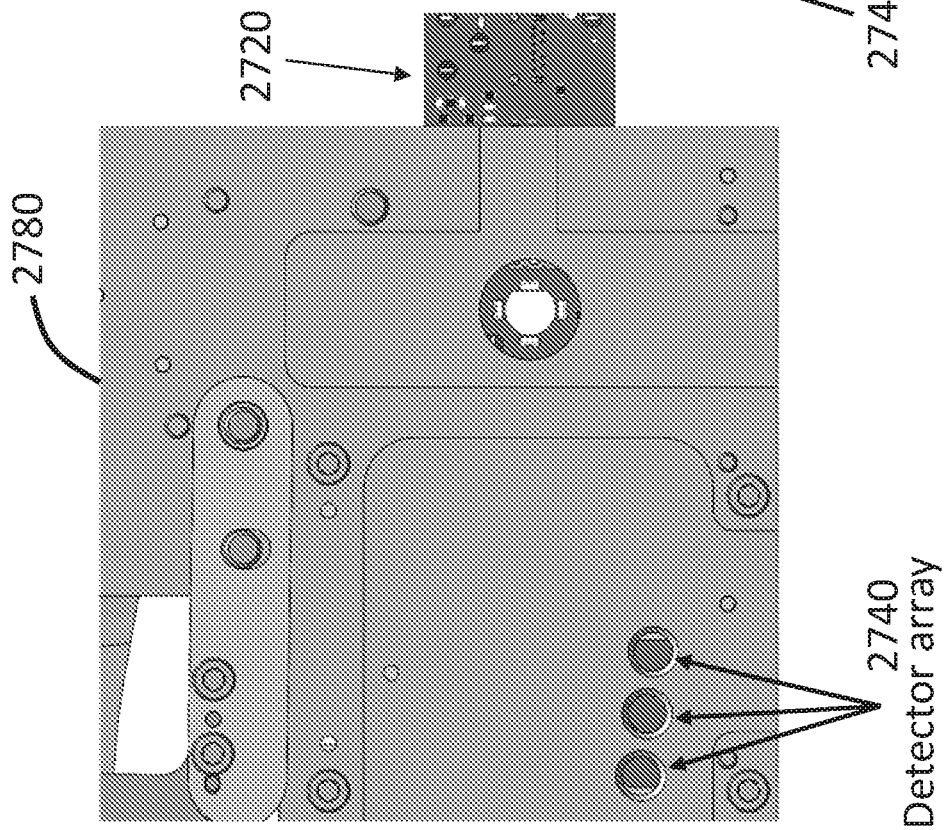

FIGS. 27E and 27F illustrate the receiving fixture 2780 on the detector/detection side. The cartridge 2720 is secured in the receiving fixture 2780. In this configuration, the branch channels 2730 in the cartridge 2720 are vertically arrayed (e.g. with reference to the flow direction in the branch channels 2730). Accordingly, the detectors 2740 integrated in the receiving fixture 2780 are also vertically offset from each other to detect signals from the corresponding branch channel. In some embodiments, the detectors 2740 can be integrated into a printed circuit assembly (PCA) 2745, which in turn is coupled to the receiving fixture 2780, as illustrated in FIG. 27F. The PCA 2745 can further include various other components to facilitate the operation of the detectors 2740, such as power supply, read-out circuit, sampling circuit, and/or data output ports, among others.

Figure 27I:
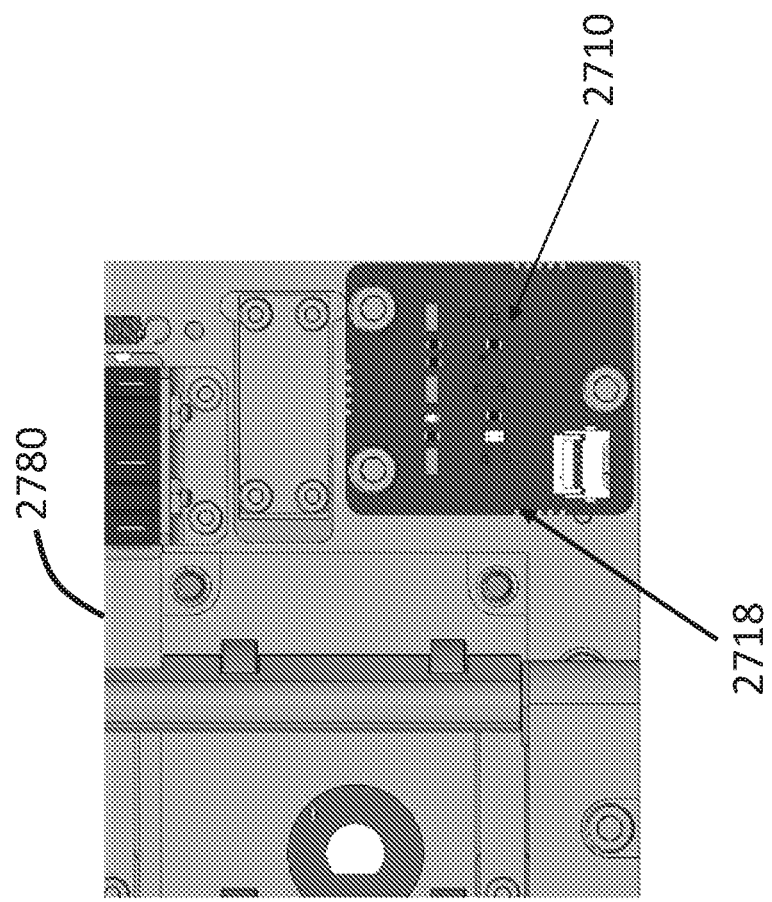

FIGS. 27G-27I illustrate the receiving fixture 2780 on the illumination/emitter side. FIG. 27G illustrates the detectors 2740 viewed via a window 2748 in the receiving fixture 2780. FIG. 27H illustrates the slit array 2715 mounted on the window 2748. FIG. 27I illustrates a PCA 2718 including the light source 2710. When assembled, the detectors 2740, the slit array 2715, and the light source 2710 in the receiving fixture 2780 are optically aligned. In some embodiments, the width of each slit in the slit array 2715 can be about 0.1 mm to about 1 mm (e.g. about 0.1 mm, about 0.2 mm, about 0.3 mm, about 0.5 mm, or about 1 mm, including any values and sub ranges in between).

Figure 27J:
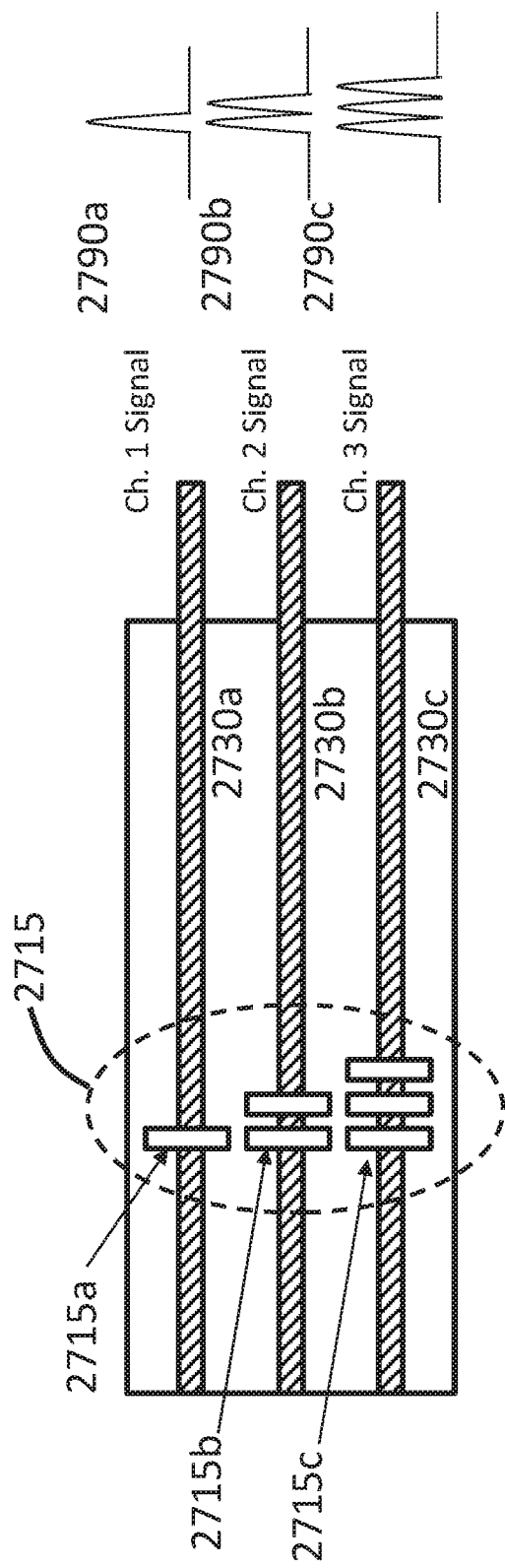

In some embodiments, the light source 2710 can include a single illumination source (e.g., a single LED) and the detector 2740 can include a single detector, as illustrated in FIG. 27J. In these embodiments, the slit array 2715 can include slits having different spatial configurations to distinguish signals from different branch channels. For example, the first slit 2715a can include a single slit, the second slit 2715b can include two slits, and the third slit 2715c can include three slits. The resulting optical signals 2790a to 2790c after the slit array 2715 therefore have different shapes that can be used to indicate the source of the optical signal. For example, the first optical signal 2790a from the first channel 2730a includes a single peak in time domain (also sometimes referred to as a temporal peak) corresponding to the light transmitted after the first slit 2715a, the second optical signal 2790b from the second channel 2730b includes two peaks in time domain corresponding to the light transmitted after the second slit 2715b, and the third optical signal 2790c includes three peaks in time domain corresponding to the light transmitted after the third slit 2715c.

The slit array 2715 can modulate optical signals emitted by the light source 2710 and the modulated signals can be analyzed (e.g. by a processor) to determine the operational status of microfluidic channels in the microfluidic chip. In some embodiments, the modulated optical signals can be used to estimate the speed/velocity of particles in the microfluidic channels and/or in the verification channels 2730. The speed can be calculated, for example, based on the distance between adjacent slits (e.g. in 2715c) and the time difference between adjacent peaks in the optical signal 2790c. In some embodiments, the modulated signals can be used to determine whether there is any clogging/blockage in the microfluidic channel and/or in the verification channels 2730. For example, if the estimated travel speed of the particle is less than an expected or predetermined value, or outside an expected/predetermined range of values, the processor may determine that the channels 2730 are at least partially blocked or clogged, and corrective action can be taken.

Returning to FIG. 13, FIG. 13B is an oscilloscope trace that shows the various steps of a sorting process. First, the left-most peak in the fluorescent signal is detected optically. The negative peak moments indicates activation of the sorting actuator (e.g., a piezoelectric actuator shown in FIG. 8). The right-most peak is a post-sorting verification impedance signal as a result of successful sorting. More information about post-sorting verification using impedance signals can be found in PCT Application No. PCT/US2013/065111, which is hereby incorporated by reference in its entirety.

Figure 28:
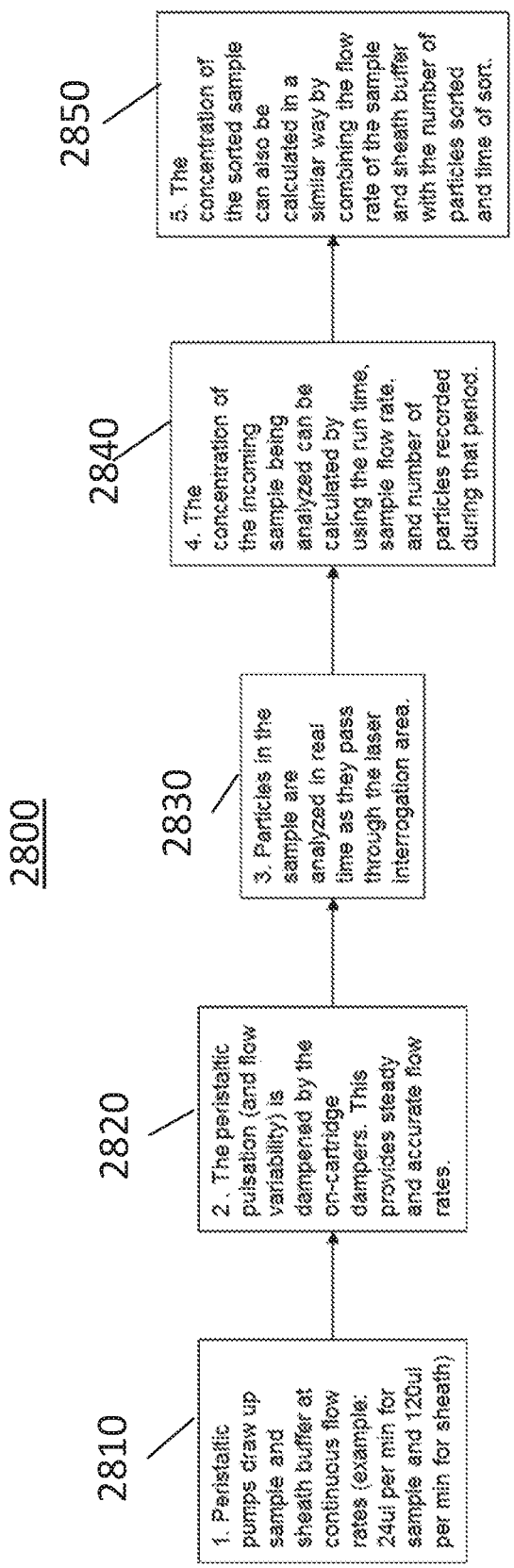
FIG. 28 illustrates a method for calculating particle concentration, according to embodiments.

In some embodiments, the use of peristaltic pumps further permits for determination of particle concentration in the sample fluid and/or the fluid in which the sorted particles are present via measurement of liquid volume based on the speed and duration of peristaltic pump action. In this manner, volume measurements are afforded in a system with a disposable cartridge but without the need for in-line flowmeters or other similar devices. FIG. 28 illustrates an example method 2800 of calculation of particle concentration in systems disclosed herein. At 2810, the peristaltic pumps (e.g., the pumps 125, 135) draw up sample fluid and sheath buffer, respectively, at substantially continuous flow rates. In some embodiments, the sample fluid flow rate can be about 1 µl/min, about 5 µl/min, about 10 µl/min, about 50 µl/min, about 100 µl/min, about 200 µl/min, about 500 µl/min, about 900 µl/min, about 990 µl/min, about 1000 µl/min, including all values and sub ranges in between. In some embodiments, the sheath buffer flow rate can be about 1 µl/min, about 5 µl/min, about 10 µl/min, about 50 µl/min, about 100 µl/min, about 200 µl/min, about 500 µl/min, about 900 µl/min, about 990 µl/min, about 1000 µl/min, including all values and sub ranges in between. For example, the flow rate can be about 24 µl/min for the sample fluid and about 120 µl/min for the sheath buffer. At 2820, the dampers (e.g., the dampers 728, 738) are configured to dampen the peristaltic pulsations and minimize flow variability as disclosed herein, thereby providing substantially steady and accurate flow rates. In some embodiments, the flow rate after the dampers can be about 1 µl/min, about 5 µl/min, about 10 µl/min, about 50 µl/min, about 100 µl/min, about 200 µl/min, about 500 µl/min, about 900 µl/min, about 990 µl/min, about 1000 µl/min, including all values and sub ranges in between.

At 2830, the sample fluid/particles or cells therein are analyzed in substantially real-time as they pass through the interrogation area (e.g., where they interact with the laser beam 2420). At 2840, the particle concentration in the sample fluid can be calculated, for a given time period, based on the sample flow rate, the number of particles detected in that time period, and the duration of the time period. In some embodiments, at 2850, the particle concentration after sorting (i.e., of the sorted particle) can be calculated based on sample fluid flow rate, the sheath buffer flow rate, the number of sorted particles, and timing of sorting.

Figure 13B:
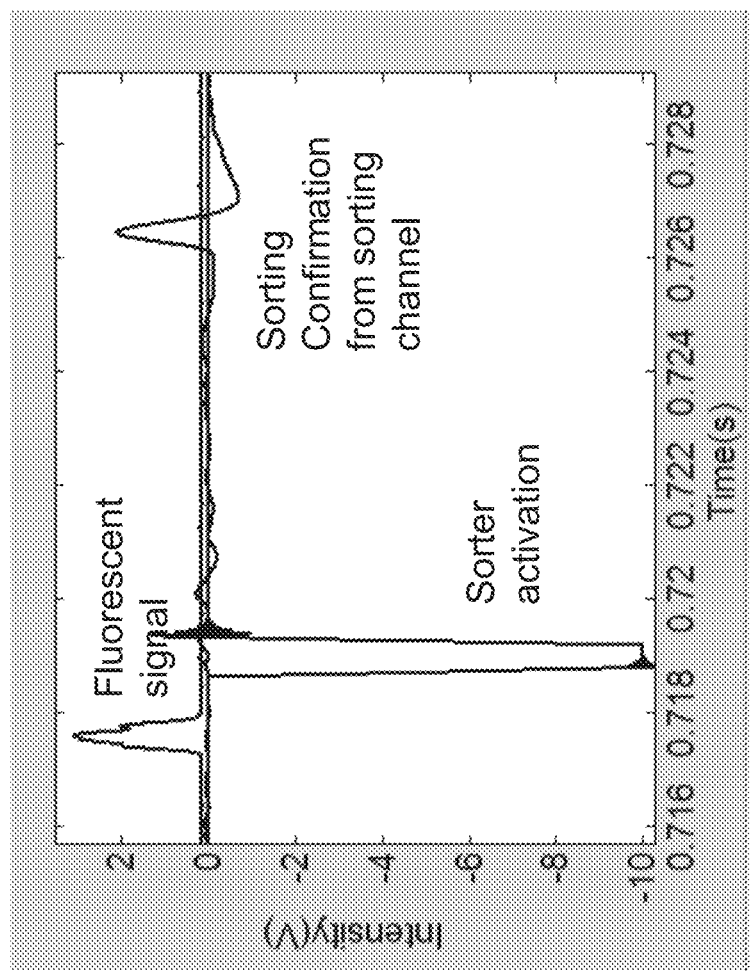
FIG. 13B is a plot that illustrates sorting using a peristaltic pump with an on-cartridge bubble damper, according to embodiments.

If the flow rate pulsation is too high, few correct sorting events can be observed. In addition, the speed of a particle traveling can be less consistent. Therefore, the sorting delay time, which is the time between particle detection and particle sorting actuation, is accordingly less consistent. This can result in a particle being either accelerated or decelerated, thereby decreasing the sorting efficiency, which can be defined as the ratio of the number of correct sorting events to the number of detection events. For example, if 100 cells are detected by the detection system and 50 cells are directed to the correct output channel, then the sorting efficiency is 50%. Without the dampers the sorting efficiency can be poor and varies greatly between about 0 and about 70%. Sorting performance can be noticeably improved by peristaltic pumps when gas dampers are utilized. FIG. 13B demonstrates that sorting efficiency greater than about 90%, and up to about 99%, can be achieved.

As best illustrated in FIG. 13A, in some embodiments, an interrogation region (e.g., 1504) can be disposed close to a sorting region (e.g., 1511) in order to achieve more reliable sorting. The distance can be, for example, less than a few millimeters (e.g., less than 5 mm, less than 3 mm, or less than 2 mm, including any values and sub ranges in between). The velocity of the particle flow can be about 0.1 m/s to about 10 m/s (e.g., about 0.1 m/s, about 0.5 m/s, about 1 m/s, about 2 m/s, about 5 m/s, or about 10 m/s, including any values and sub ranges in between), In this case, it takes a cell a few milliseconds to travel from the interrogation region to the sorting region. During this short time duration between particle detection and particle sorting, the flow cytometer processes the data acquired from interrogation and identifies the type of the particle so as to provide sorting instructions before the particle passes over the sorting region.

The processing time for the flow cytometer can be even shorter (i.e., more stringent requirement) when the time for the sorting mechanism to actuate is also taken into account. For example, in a flow cytometer with piezoelectric (PZT) sorting (see, e.g., FIG. 8A), it can take a few hundreds of microseconds to charge the PZT and another a few hundreds of microseconds for the fluidic stream to return to equilibrium following a sorting action. The time left for processing is thus the traveling time of the particles subtracting the actuation time and equilibration time.

Conventional flow cytometers use a high-speed analog-to-digital converter (ADC) to sample incoming analog detection signals from commercially available particle detectors. The signals from the particle detectors may represent different cell characteristics. In some embodiments, these characteristics can include forward-scatter, side-scatter, back-scatter, and fluorescence intensity at different excitation wavelengths. After data processing, these signals can provide various types of information, such as enumeration of total particles, enumeration of each sub-population of particles, particle velocity, system detection time, and single- or multiple-particle detection, and/or the like. A user can generate a variety of plots based on the above information and create a "gate" to identify a "target particle". Afterward, the computer processor typically performs a point-by-point comparison of each new particle value with one or more user-defined gates to make a sorting decision. Because the user-defined gate or gates can have a random shape drawn in a software graphical user interface, and there can be multiple gates with or without dependencies, algorithmic processing can place high demands on the computer processor.

To increase the efficiency of processing the interrogation data, FIGS. 14A-16 illustrate a grid sorting technique/approach. In embodiments based on such grid sorting approaches, a two-dimensional (2D) array of cells to is employed discretize a gate (e.g., a user defined gate, a predefined gate, and/or a dynamically defined gate) on a dot plot. Each cell in the 2D array of cells is assigned a cell value (e.g., "0" or "1") depending on the location of the cell with respect to the gate. These cell values form a lookup table (also referred to as grid data). New particle data is compared with this lookup table to determine whether and how this new particle is to be sorted.

Various types of cell values can be used. In general, the cell has a first value when it is within the gate or intersecting with the gate, and has a second value different from the first value when it is outside the gate. In some embodiments, the cells values can include "1" and "0." In some embodiments, the cell values can include more than two values. For example, a cell can have a cell value "5" when it is entirely within the gate, and can have a cell value "1", "2", "3," or "4" depending on the percentage of the cell lying within the gate.

Figure 14A:
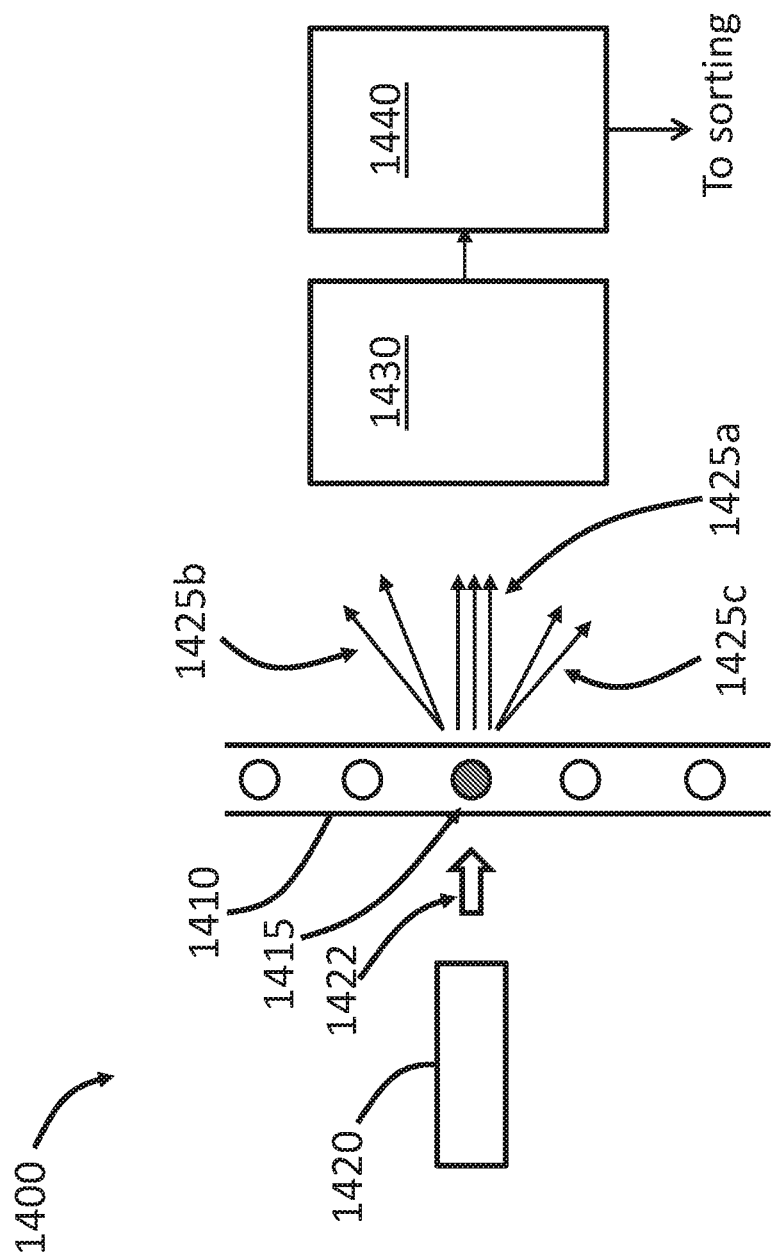
FIG. 14A illustrates aspects of the cell sorting system that are useful for optical interrogation and grid sorting, according to some embodiments.

FIG. 14A illustrates a cell sorting system 1400 for grid sorting, which can be similar to, for example, the system 1500 shown in FIG. 13A. The system 1400 includes an interrogation region 1410, in which particles 1415 are flowing through and subject to optical interrogation. A light source 1420 is in optical communication with the interrogation region 1410 to illuminate the particles 1415 with an excitation light 1422. The interaction between the particles 1415 and the light 1422 can produce several types of radiation. For example, the interaction can produce forward scatter 1425a along the same direction of the incident light 1422. The interaction can also produce side scatter 1425b along a different direction than the direction of the incident light 1422. In addition, fluorescence 1425c may also be generated by the particles 1415 upon the illumination of the light 1422. The fluorescence 1425c usually has a different wavelength from the wavelength of the incident light 1422. A detector 1430 is employed in the system 1400 to collect the radiation 1425a-1425c. The acquired detection data is transmitted to a processor 1440 for subsequent processing, including generating dot plots, identifying the type of the particles 1415, and making corresponding sorting instructions.

Figure 14B:
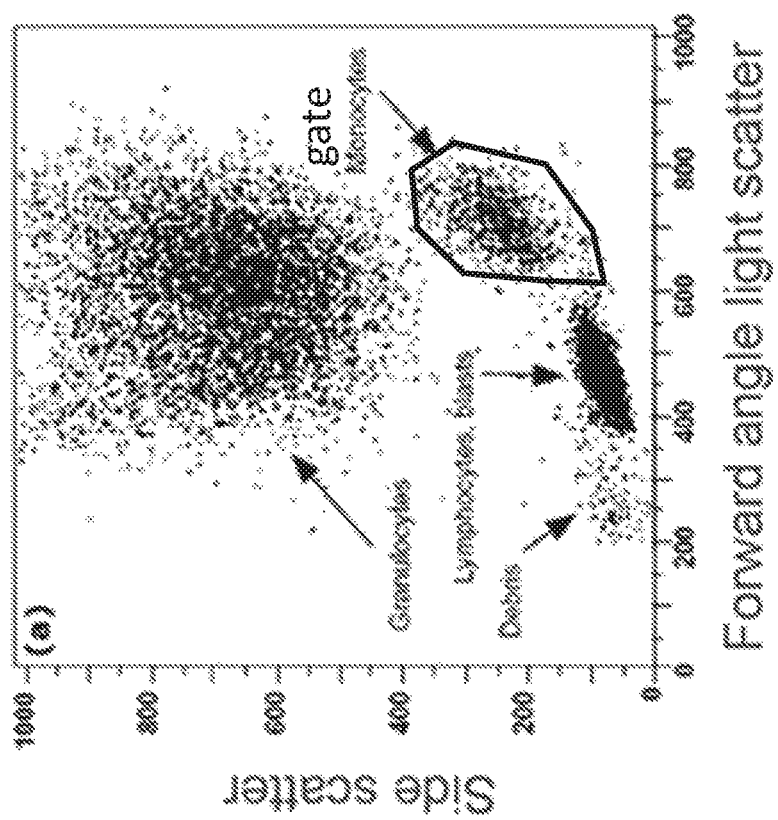
FIG. 14B is an example dot plot of forward scatter and side scatter of a blood sample that can be acquired by the system 1400 shown in FIG. 14A.

FIG. 14B illustrates an example dot plot of side scatter versus forward scatter that can be generated by a blood sample in the system 1400 shown in FIG. 14A. Forward scatter from a particle usually correlates with the particle size and side scatter is usually proportional to the granularity of the particle. In this manner, the particle can often be identified based on its relative size and granularity alone. In the example dot plot shown in FIG. 14B, particles of the same type tend to aggregate toward the same region. In other words, the type of the particle can be determined by the location of its forward/side scatter on the dot plot.

For example, in FIG. 14B, larger and more granular granulocytes produce a large population with high SS and FS. These cells occupy the upper right region of the plot. Monocytes are large cells, but not as granular, so these cells produce a separate population with high FS but lower SS, as shown in the lower right region in the plot. Smaller lymphocytes and lyrnphoblasts produce a separate population with less FS. They are not granular cells, so also have low SS. These cells are in the lower left region in FIG. 14B.

FIG. 14B also shows a gate for monocytes, shaped as a polygon (or any other suitable shape) that encloses the measurement points acquired from monocytes. Once this gate is made, any future measurement point of a particle can be added to the plot. If the measurement point is within or on the gate, the particle is a monocyte. Otherwise, the particle is something else. Similarly, other gates can be used for granulocytes, lymphoblast, debris, and/or the like.

Figure 15:
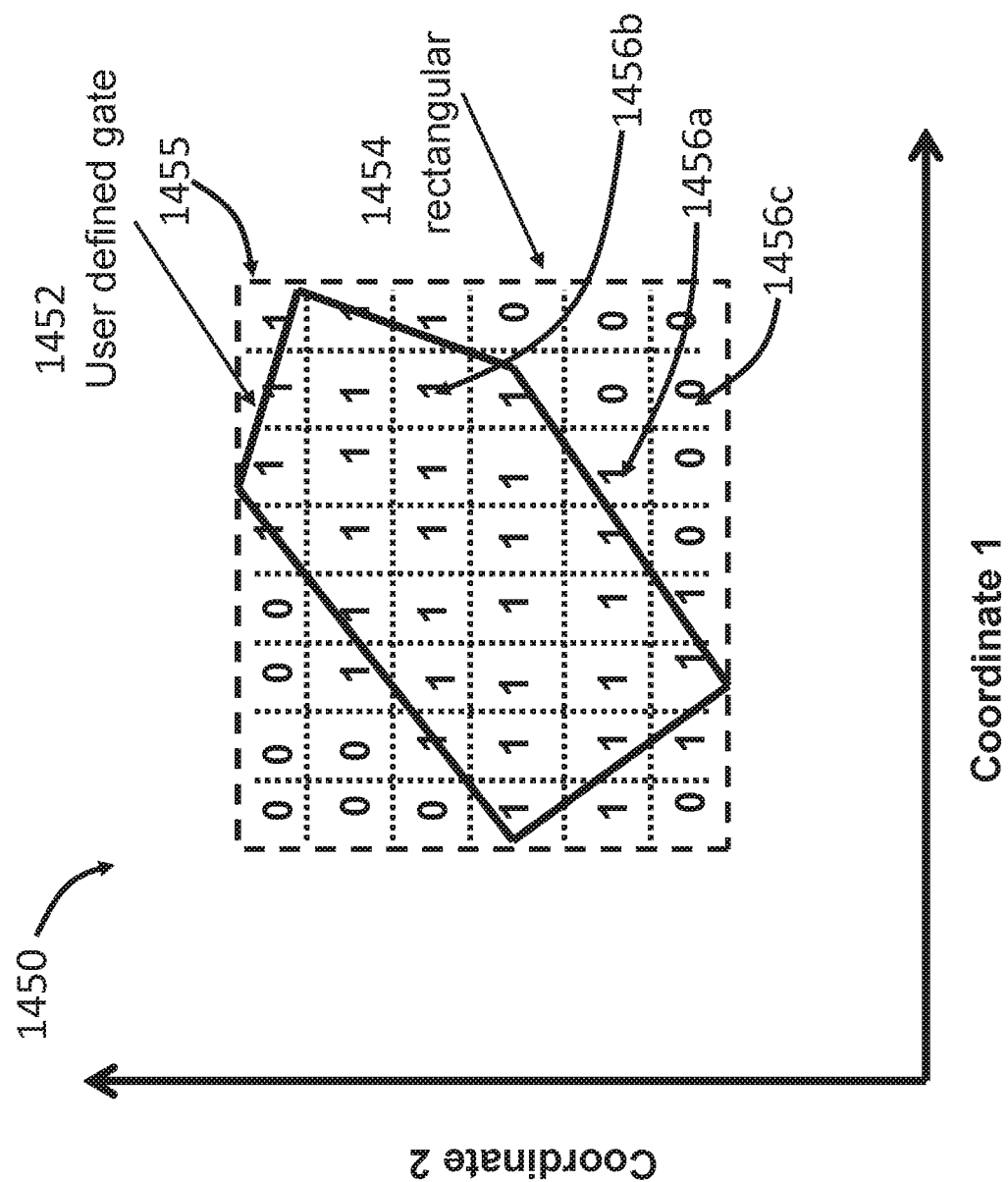
FIG. 15 is an example dot plot illustrating the grid sorting technique, according to some embodiments.

FIG. 15 is an example dot plot 1450 illustrating the grid sorting technique. In some embodiments, the coordinates of the plot 1450 can be forward scatter (e.g., coordinate 1) and side scatter (coordinate 2). In some embodiments, other parameters, such as fluorescence, can also be used as the coordinate, as long as the parameter(s) is useful for discriminating between two or more types of particles. A gate 1452 is produced on the plot 1450 for a target particle. In some embodiments, the gate 1452 can be drawn by a user on an interactive interface (not shown in FIG. 14), such as a touch screen. In some embodiments, the gate 1452 can be generated by specifying the boundary coordinates of the gate 1452 via, for example, a keyboard.

A rectangular shape 1454 is created to encapsulate the gate 1452. In some embodiments, the rectangular shape 1454 can be manually created by a user on an interactive interface (e.g., the same interface for creating the gate 1452). In some embodiments, the rectangular shape 1454 can be automatically created by a processor after the gate 1452 is created. The processor can, for example, identify turning points on the boundary of the gate 1452 and generate the rectangular shape based on the turning points. In some embodiments, the processor can generate one or more tentative rectangular shapes and a user can then decide which one to use.

The rectangular shape 1454 is divided into an n by in array of cells, where 'n' and 'in' can be any suitable integers. In some embodiments, the gate 1452 can be multi-dimensional (e.g., include three or more dimensions), and the shape 1454 can encompass a multidimensional form, such as, for example, a cube, a cuboid, a sphere, a torus, a cylinder, a cone, a pyramid, and/or the like. In such embodiments, the shape 1454 can encompass any suitable array of cells. For example, the shape 1454 can be a cuboid and be divided into a an n by in by p array of cells, where 'n', 'm', and 'p' can be any suitable integers.

In some embodiments, the shape 1454 can be a $2^n$ by $2^m$ array of cells 1455, where n and m are positive integers. In some embodiments, n and m can be equal. In some embodiments, n and m can be different. In some embodiments, each cell 1455 can have a square shape. In some embodiments, each cell 1455 can have a rectangular shape, which has a first length along the first coordinate and a second length along the second coordinate. In sonic embodiments, n and m can be about 5 to about 200 (e.g., about 5, about 10, about 20, about 50, about 100, or about 200, including any values and sub ranges in between). In some embodiments, the cell 1455 can include any suitable interlocking shape, such as a square, an pentagon, and/or the like. In some embodiments, the cells can encompass two or more different types of interlocking shapes, such as squares and rectangular, for example.

Each cell 1455 is assigned a cell value "0" or "1" depending on the location of the cell with respect to the gate 1452. If the cell has an intersection with the boundary of the gate 1452 (e.g., cell 1456a) or falls within the gate 1452 (e.g., cell 1456b), the assigned value is "1." If the cell is outside the gate 1452 (e.g., cell 1456c), the assigned value is "0." The assignment of cell values therefore generates a 2D array (also referred to as a 2D matrix, a grid, or a table) of binary elements (i.e., "0" or "1") and each element in the 2D array has a corresponding 2D coordinate. The array is stored in a storage device (e.g., a Random Access Memory, or RAM) to allow rapid access during operation.

To assess the relationship of a newly detected particle with respect to the gate, the coordinates of the detected particle is compared to the coordinates of cell values in the 2D array saved to describe the gate 1452. If the searching index finds a match at the corresponding index, a sorting value is assigned. If no match is found, a no-sort value is assigned. For example, in FIG. 15, the saved 2D array can include three entries (6, 2, 1), (7, 4, 1), and (7, 1, 0) corresponding to the three cells 1456a, 1456b, and 1456c, respectively, where the first two numbers are the coordinates of the cells and the last number is the cell value. If a new particle has a coordinate (6, 2), then a searching of the 2D array would return a cell value "1," meaning that the new particle is within the gate 1452, and may. If, however, the new particle has a coordinate (7, 1), then a searching of the 2D array would return a cell value "0," in which case the new particle is outside the gate 1452.

In some embodiments, the saved 2D array can include only entries with a cell value "1." In this case, if the search finds a match between the coordinates of a new particle and saved coordinates in the 2D array, the new particle is determined to be within the gate 1452. Otherwise, if no matching coordinates are found, the new particle is determined to be outside the gate 1452.

Depending on the result of the searching, a sorting value can be assigned to the new particle. For example, if the new particle is within the gate 1452, the corresponding sorting value can instruct the sorting mechanism (e.g., 1511 in FIG. 13A) to divert the new particle into a corresponding sorting branch (e.g., 1510A or 1510C), If the new particle is outside the gate 1452, the corresponding sorting value can instruct the sorting mechanism to permit the new particle to continue on its original path, without sorting (e.g., into the branch 1520B).

The grid sorting method described above can be interpreted as a lookup table method. Only two possible values, "1" or "0," are assigned to describe the cells within the array describing the gate. The entire gate area is therefore a binary array that is well-suited to computer processing and memory access. In this manner, the traditional point-by-point comparison is converted into a binary array searching. By converting the gate area to a binary array, the processing and decision-making time can be reduced to a microsecond timescale. The resolution can also be very high with a large dimension of the $2^m \times 2^n$ array (e.g., m and n greater than 50).

In some embodiments, the grid sorting technique can be performed by a processor or a computer. Processor-executable instructions can be saved in a memory and the processor can perform grid sorting by executing the stored instructions. In some embodiments. The grid sorting technique can be performed by a combination of manual steps and computer steps. For example, a user can define the gate, and a computer or a processor can be configured to perform other steps, such as generating the rectangular shape, dividing the rectangular shape into cells, and assigning cell values, FIG. 15 shows one gate 1452 for illustrative purposes. In some embodiments, more than one gate can be used. For example, the plot 1450 can include a first gate for a first type of particle (e.g., monocytes) and a second gate for a second type of particle (e.g., granulocytes). Each gate has a corresponding rectangular shape encapsulating the gate, and accordingly each gate also has a corresponding 2D array of cell values. When a new particle is detected, the coordinates of the new particle are compared to both 2D arrays to determine whether the particle is a monocyte, a granulocyte, or something else. The result of the determination is then transmitted to the sorting module to make corresponding sorting actions for the new particle.

Accordingly, in some embodiments, a method acquiring first optical information (e.g., fluorescence) associated with optical interrogation of particles in a first channel (e.g., an input microfluidic channel in a chip as disclosed herein). In some embodiments, the first optical information is selected from the group consisting of: forward scatter information; side scatter information; and fluorescence information The method can further include acquiring second optical information associated with the particles, where the second optical information is different from the first optical information and, in some embodiments, is selected from the group consisting of: forward scatter information; side scatter information; and fluorescence information. The method can further include generating an image of particle distribution based on the first optical information and the second optical information (e.g., the plot in FIG. 14B). The method can further include receiving a selection of a first gating region (e.g., the gating region 1452 illustrated in FIG. 15) within the image, and creating a second gating region encapsulating the first gating region (e.g., the gating region 1454 in FIG. 15). The method can also include dividing the second gating region into an array of subregions (e.g., the subregions 1456a/1456b/1456c) and assigning each subregion that lies wholly or partially within the first region a first value (e.g., assigning the subregions 1456a, 1456b a value of 1). The method also includes assigning each subregion that lies wholly outside the first region a second value (e.g., assigning the subregion 1456c a value of 0) to generate an array of first values and second values. The method further includes acquiring the first optical information and the second optical information associated with optical interrogation of a subsequent particle in the channel, and mapping the subsequent particle onto the image based on its first optical information and its second optical information (e.g., determining that the particle falls within the subregion 1456a). The method also includes sorting the subsequent particle from the first channel to a selected second channel of a set of second channels based on whether the mapped location of the subsequent particle on the image is within a subregion having the first value or the second value (e.g., sorting the subsequent particle to a selected second channel based on the subregion 1456a having a value of 1).

Figure 16A:
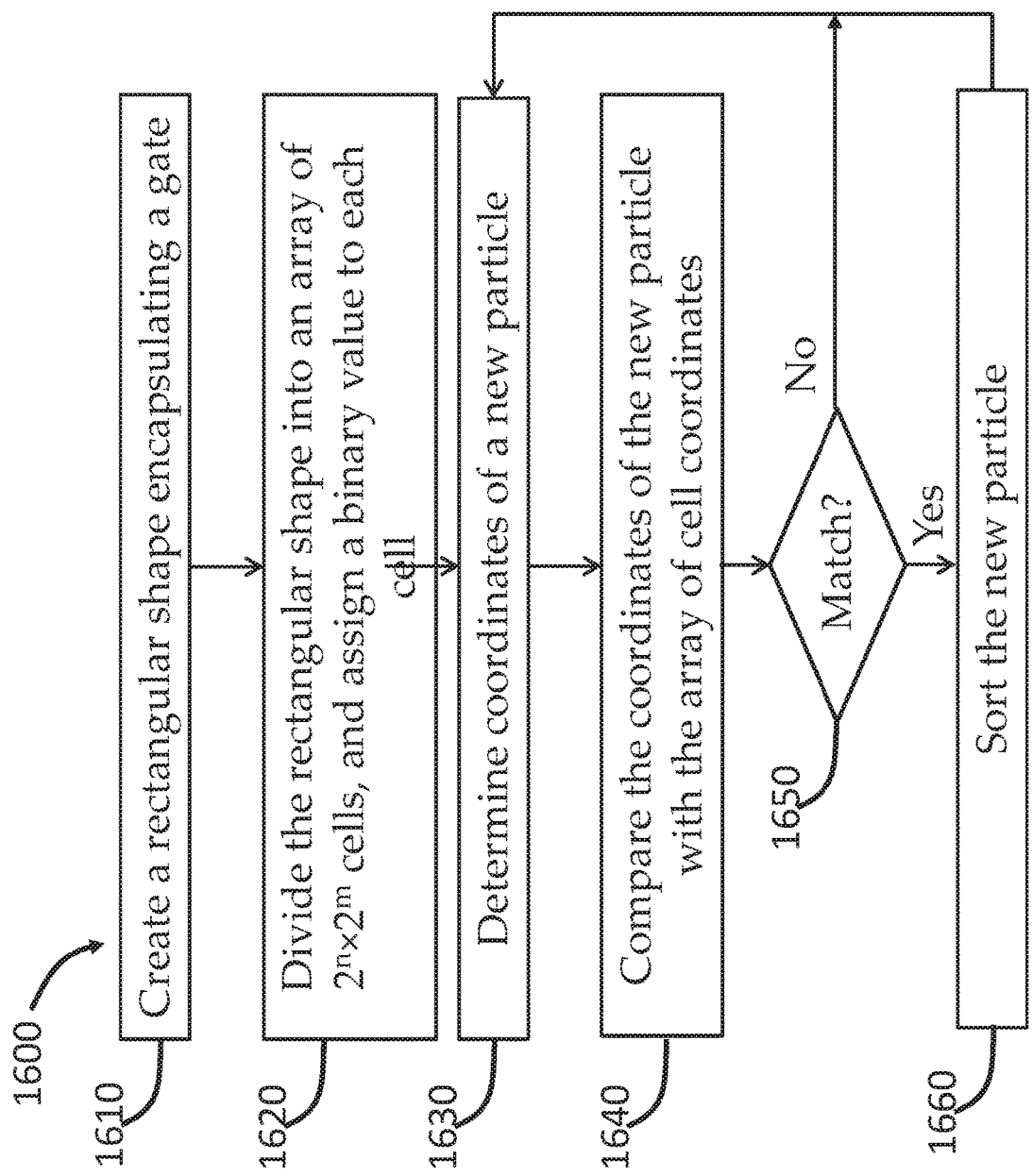
FIG. 16A is a flowchart illustrating a method of grid sorting, according to some embodiments.

FIG. 16A is a flowchart illustrating an example method 1600 of grid sorting, according to some embodiments. In some embodiments, the method 1600 can be executed by a processor, such as the processor 1440 in the system 1400. The method 1600 includes creating a rectangular shape that encapsulates a user defined gate, at 1610. In some embodiments, the rectangular shape can be created by the user on an interactive interface, such as a touch screen. In some embodiments, the rectangular shape can be automatically generated by a processor based on the gate defined by the user. At 1620, the rectangular shape is divided into a $2^n \times 2^m$ array of cells, each of which is assigned a cell value depending on its location with respect to the gate. If a cell is within the gate or has an intersection with the gate, a cell value "1" is assigned to the cell. If a cell is outside the gate, a cell value "0" is assigned to the cell. In this manner, a 2D matrix of cell values is generated. Each entry in the 2D matrix has a 2D coordinates and a corresponding entry value.

At 1630, a new particle is detected and its coordinates are determined. At 1640, the coordinates of the new particle are compared against the 2D matrix, which can function as a lookup table. A decision is made at 1650 about whether a match in the 2D matrix is found. If the cell value in the entry having the coordinates of the new particle is "1," a match is found and the new particle is determined to be within the gate. In this case, a corresponding sorting action is carried out on the new particle at 1660. On the other hand, if the cell value in the entry having the coordinates of the new particle is "0," or the 2D matrix does not include the coordinates of the new particle, a match is not found and the new particle is determined to be outside the gate. In this case, the method 1600 can return back to 1630 to detect another new particle.

Figure 16B:
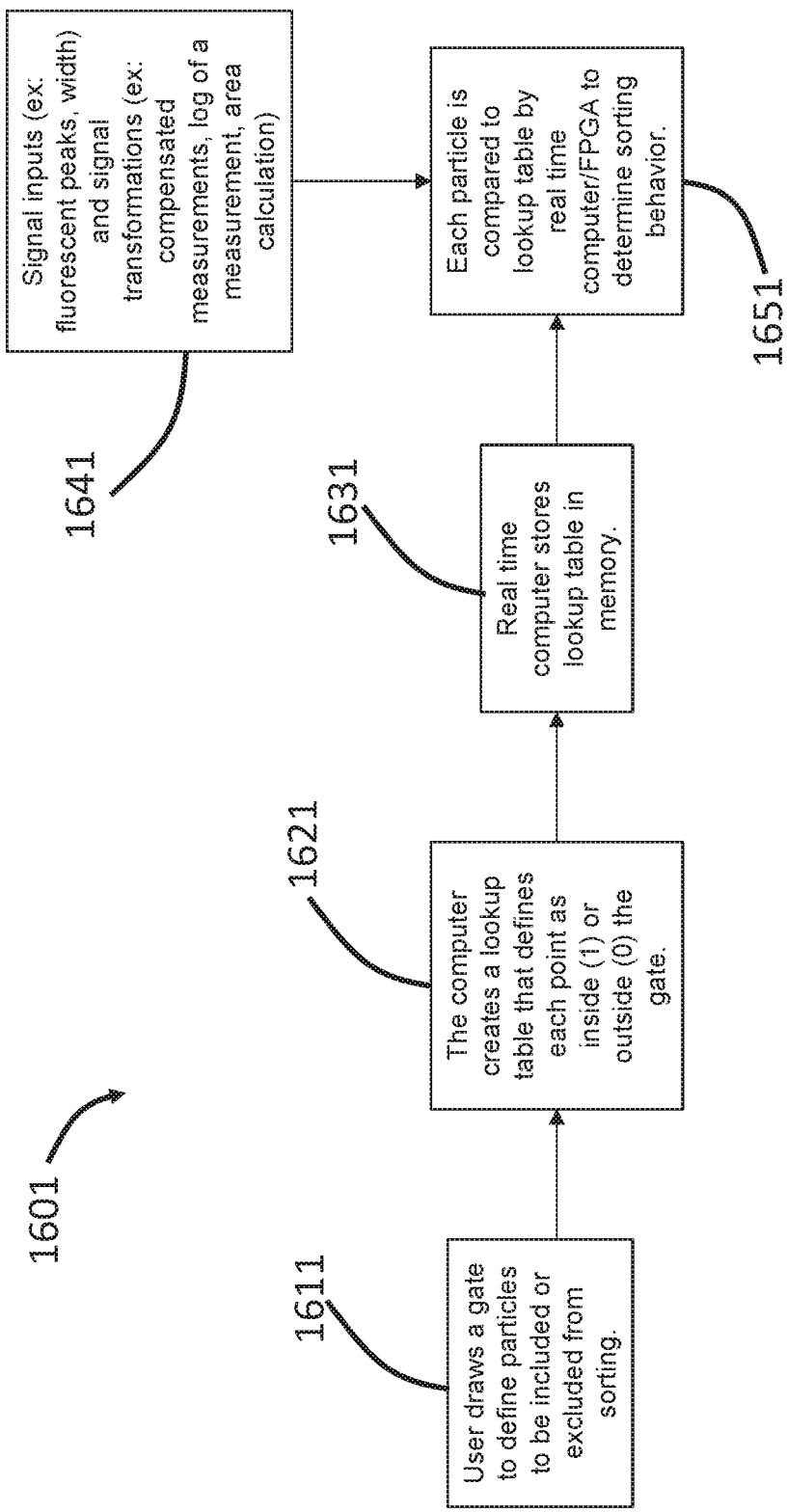
FIG. 16B is a flowchart illustrating a computer-executed method of grid sorting, according to some embodiments.

FIG. 16B is a flowchart illustrating a computer-executed method 1601 of grid sorting, according to some embodiments. The method 1601 includes defining a gate at 1611 on a dot plot. At this step, a user can draw the gate on an interactive interface to designate which particles to be included or excluded from sorting. At 1621, a processor (or a computer including a processor) is configured to create a lookup table that defines each point on the dot plot as inside or outside the gate. For any point inside the gate, the processor is configured to assign a value "1" to the point in the lookup table. For any point outside the gate, the processor is configured to assign a value "0" to the point in the lookup table.

In some embodiments, each point in the look up table can include one pixel on the dot plot. This can result in high resolution of the lookup table. In some embodiments, each point can include multiple pixels that can form a cell. For example, each point can include 5×5 pixels, 10×10 pixels, 15×15 pixels, or 20×20 pixels. In another example, each point can have a rectangular shape and can include, for example, 5×10 pixels, or 10×15 pixels. If there is one pixel within the gate, the value assigned to the entire cell is "1." On the other hand, if a cell has no pixel within the gate, the value assigned to the cell is "0."

This lookup table is saved in memory, such as a RAM for fast access, at 1631. At 1641, new particles are detected and signal inputs and transformations are acquired. Signal input of a new particle includes, for example, location and width of fluorescent peaks, forward scatter, and side scatter. Signal transformations include, for example, compensated measurements, log of a measurement, and area calculation. This data is used by the processor to calculate the coordinates of the new particle on the dot plot where the user-defined gate is made. At 1651, each new particle is compared with the saved lookup table by real time computer or a field programmable gate array (FPGA) to determine sorting action to be applied on the new particle.

In some embodiments, the method 1601 can include modifying the user-defined gate when new particles are being detected and identified. For example, when more and more particles are detected, it might turn out that the previous user-defined gate is not accurate enough to capture all desired particles or capture some undesired particles. In this case, the user can modify the gate (e.g., at 1611). In response to modification of the gate, the computer can automatically update the lookup table (e.g., at 1621) and save the table to the memory in a real time manner (e.g., at 1631), such that the next detection can be compared with the updated lookup table.

In most microfluidic systems, complete or substantially complete removal of air bubbles can be desirable since air bubbles tend to degrade signal quality and can make it hard to control the fluid due to their compressibility. To achieve stable and controllable flow status for optimal instrument performance, microfluidic chips are typically pre-filled with a liquid (a process known as "priming") so as to remove any gas bubbles in microfluidic channels. Priming a chip with liquid and removing gas bubbles prior to running a particle sample for analysis or cell sorting can be accomplished using a combination of strategically designed microfluidic channels and ports.

Figure 17:
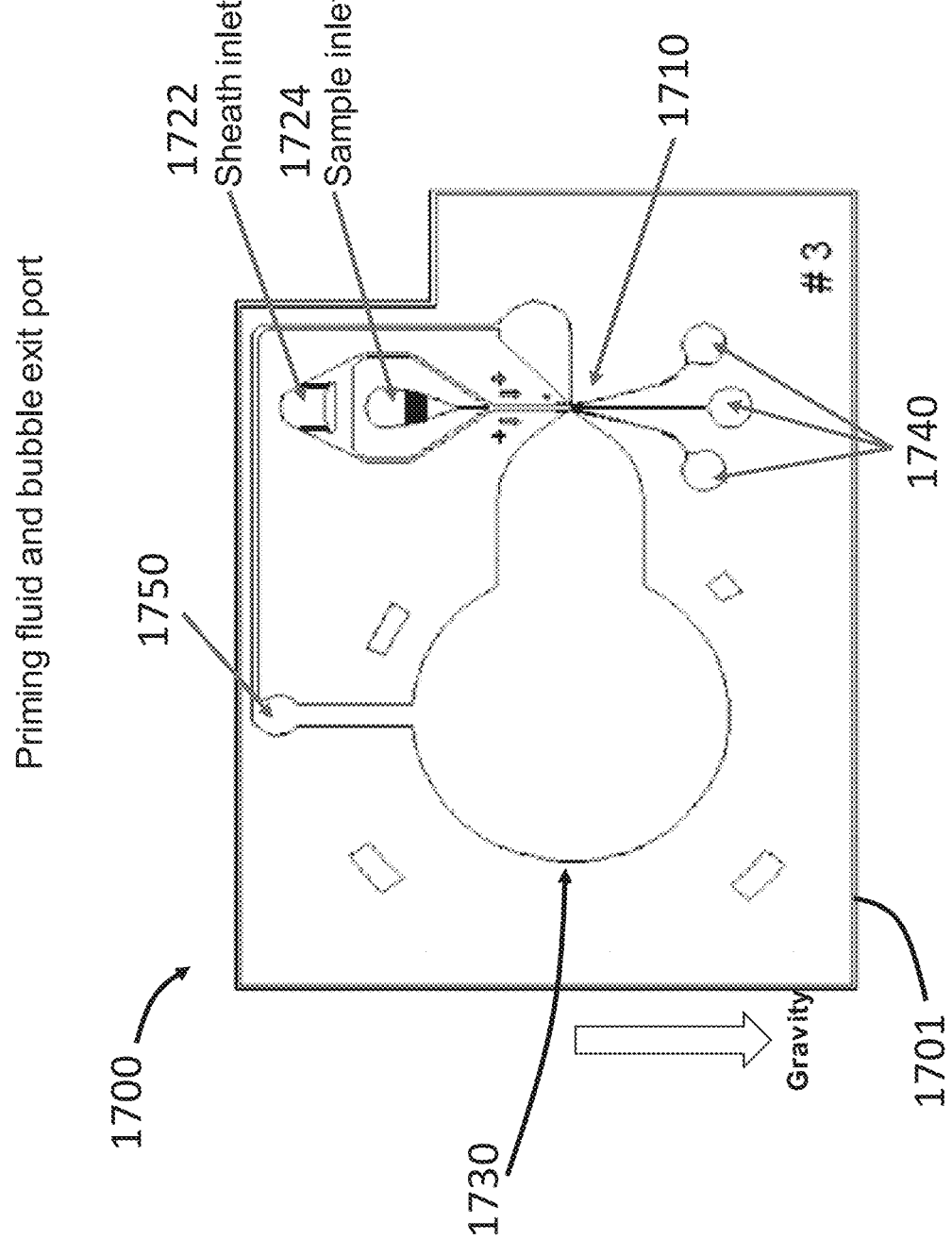
FIG. 17 illustrates an example cell sorter chip, according to embodiments.

FIG. 17 shows a schematic of a microfluidic chip to illustrate methods of priming. The chip 1700 includes a substrate 1701 (or base), on which other components in the chip 1700 can be disposed. The chip 1700 includes two fluid inlets: a sheath fluid inlet 1722 to deliver sheath fluid and a sample fluid inlet 1724 to deliver sample fluid. The sheath fluid and the sample fluid are transmitted to a sorting junction 1710, where different cells in the sample fluid are directed into different output channels 1740. The sorting is carried out by a piezoelectric (PZE) actuator in a PZT chamber 1730 that can deflect the sample fluid toward different output channels 1740. In some examples, the diameter of the PZT chamber 1730 can be about 10 mm to about 30 mm (e.g., 10 mm, 15 mm, 20 mm, 25 mm, or 30 mm) and the depth of the PZT chamber 1730 can vary between 2-5 mm (e.g., 2 mm, 2.5 mm, 3 mm, 3.5 mm, 4 mm, 4.5 mm, and 5 mm). This chamber 1730 can be 1-2 orders of magnitude greater in diameter and volume than typical microfluidic chambers, which are tens to hundreds of micrometers. Due to the dimension mismatch between the microfluidic channel and the chamber and its structure, introducing liquid may not be sufficient to prime the microfluidic chip 1700 by displacing gas.

Since the chamber 1730 has meso-scale dimensions, unlike typical microfluidics, gravity can impose a larger influence on flow and filling. Therefore, mounting the chip vertically and creating a purging port 1750 on top of the PZT chamber 1730 helps to fill up the chamber completely. The PZT chamber 1730 and the liquid chamber on the opposite side can be connected via fluidic channels that vent gas, ensuring that both chambers are filled completely with liquid. The orientation and positioning of the fluidic channels and purging port 1750 allow gravity to assist in purging unwanted gas.

Accordingly, in some embodiments, a method includes orienting a chip (e.g., the chip 1700) vertically to align the longitudinal axis of a microfluidic channel of the chip with gravitational forces. The method also includes flowing fluid in the microfluidic channel (e.g., via the sample inlet 1724), the chip including a piezoelectric actuator having a chamber (e.g., the chamber 1730) in fluid communication with the channel such that the fluid displaces gas present the chamber via a purging port (e.g., the port 1750) in fluid communication with the chamber. The purging port is positioned to permit substantially complete, gravity-enabled purging of the gas from the chamber. In some embodiments, the fluid is degassed prior to flowing the fluid in the microfluidic channel.

Figure 18A:
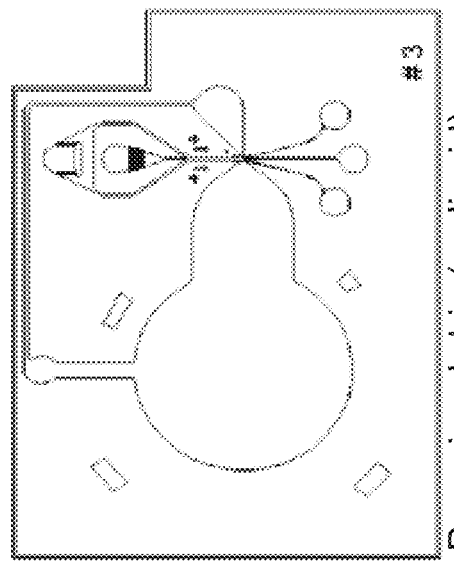
FIGS. 18A-18B illustrate priming the cell sorter chip of FIG. 17 with a regular buffer, according to embodiments.
Figure 18B:
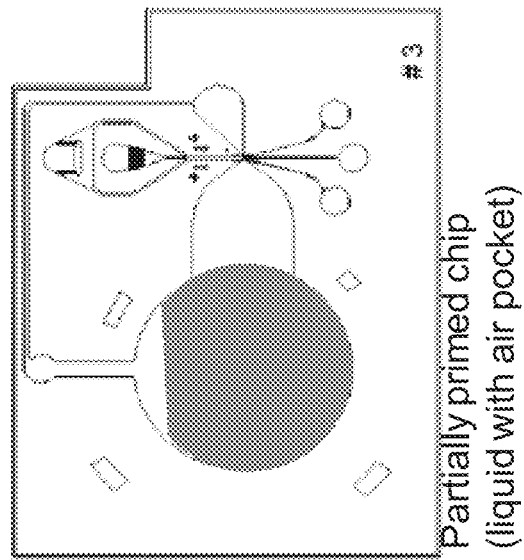

The main flow channel and the neck that connects the main flow channel to the sorting chamber can be prone to small gas bubbles mainly due to the poor wettability of most plastic materials, including PDMS, PMMA and Cyclic Olefin Copolymer COC/Cyclic Olefin Polymer COPs. FIGS. 18A-18B illustrate this issue. After filling regular buffer into the chip 1700, there can still be some gas in the PZE chamber 1730.

Figure 19:
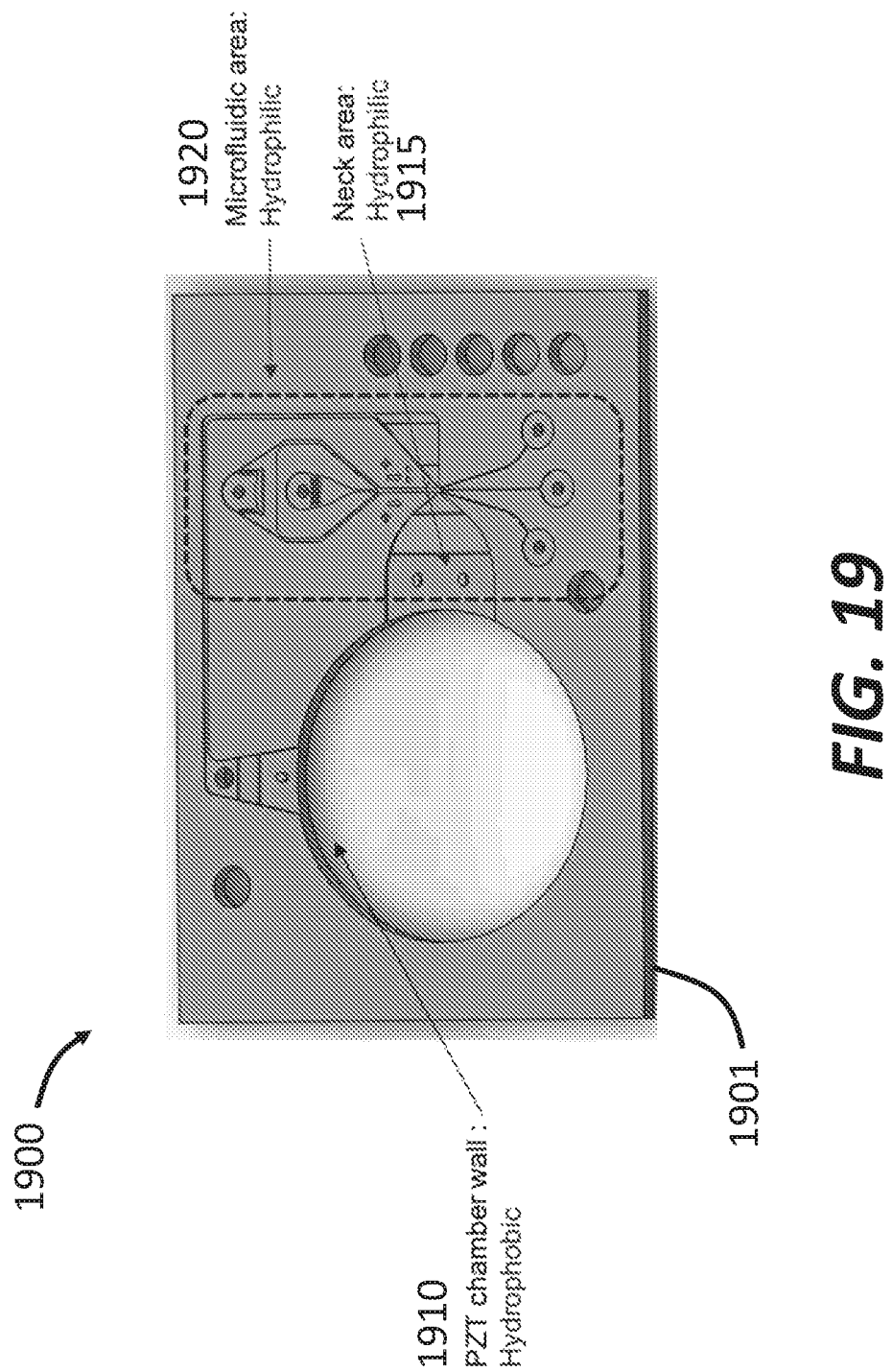
FIG. 19 is a schematic of the cell sorter chip illustrating a priming technique based on selective coating of the chip, according to some embodiments.

FIGS. 18C-18D illustrate methods of priming the microfluidic chip 1700 using degassed buffer. In order to remove any remaining gas bubbles after introducing fluid to fill the chambers, a degassed buffer can be loaded and a pump can direct the buffer into the chip 1700. Alternatively, the line between the pump and chip could have an "in-line" degasser. The priming liquid can be degassed before loading into the instrument or degassed using an "in-line" vacuum that can be placed in between the pump(s) and the chip. When the degassed liquid is introduced to the region of the neck between the microfluidic channel and the sorting PZT chamber, any trapped gas dissolves into the fluid and the chip is completely filled with liquid as illustrated in FIG. 18D, FIGS. 19-21C illustrate another priming technique based on selective treatment of inner surfaces of microfluidic chips. FIG. 19 is a schematic of a cell sorting chip 1900 illustrating a priming technique based on selective coating of the chip 1900. The cell sorting chip 1900 is substantially similar to the microfluidic chip 1700 shown in FIG. 17 and described above. For convenience to illustrate the priming technique, the chip 1900 is divided into three regions: a piezoelectric region 1910, a microfluidic region 1920, and a neck region 1915 connecting the piezoelectric region 1910 and the microfluidic region 1920. The piezoelectric region 1910 includes a PZT chamber that can deflect sample fluids toward different output channels in the microfluidic region 1920. The microfluidic region 1920 includes various microfluidic channels, including input channels, output channels, an interrogation zone, and a sorting zone.

Priming the chip 1900 can be accomplished using a combination of hydrophilic and hydrophobic surface treatment (sometimes also referred to as "hybrid treatment", "selective surface treatment", and variants thereof). In the chip 1900, the main flow channel in the microfluidic region 1920 and the neck region 1915 can be prone to small gas bubbles mainly due to the poor wettability of most plastic materials, including Polydimethylsiloxane (PDMS), Poly (methyl methacrylate) (PMMA), Cyclic Olefin Copolymer (COC), and Cyclic Olefin Polymer (COP). Since most plastic materials used in the manufacture of microfluidic chips or cartridges are hydrophobic, it can be difficult to completely prime the microfluidic region 1920 with liquid and eliminate all gas bubbles. To address this, hydrophobic plastic channel surfaces are hydrophilically treated to make liquid, such as water or buffer solutions, easier to wet and flow smoothly, so that the chips can be completely primed.

On the other hand, the PZT chamber in the piezoelectric region 1910 usually has meso-scale (e.g., on the order of a few mm) dimensions. Gravity can have a larger influence on flow and filling (i.e., priming) in meso-scale structures, such as the PZT chamber. Therefore, when the chamber wall of the piezoelectric region 1910 is hydrophilically-treated like the microfluidic channels in the microfluidic region 1920 and the neck region 1915, the meso-scale chamber may not be completely primed, since liquid buffer can escape via capillary action along the hydrophilically-treated wall, leaving gas bubbles in the chamber due to the high wettability of the walls.

Complete or substantially complete priming of the chip 1900 including both microfluidic channels and the meso-scale PZT chambers can be achieved by selectively coating or treating. More specifically, the microfluidic channel surfaces in the microfluidic region 1920 and the neck region can be treated with a "hydrophilic" coating, and the meso-scale structure such as the PZT chamber can be treated with a "hydrophobic" coating. For example, one or more surfaces of the chip 1900 can be made hydrophibic by treatment with plasma. As another example, one or more surfaces of the chip 1900 can be made hydrophilic by treatment with aqueous polytetrafluoroethylene (e.g., aqueous teflon). The complete priming by selective surface treatment ensures precise control of the fluid, thus resulting in reliable analysis and sorting performance of the instrument.

Figures 20A, 20B, 20C:
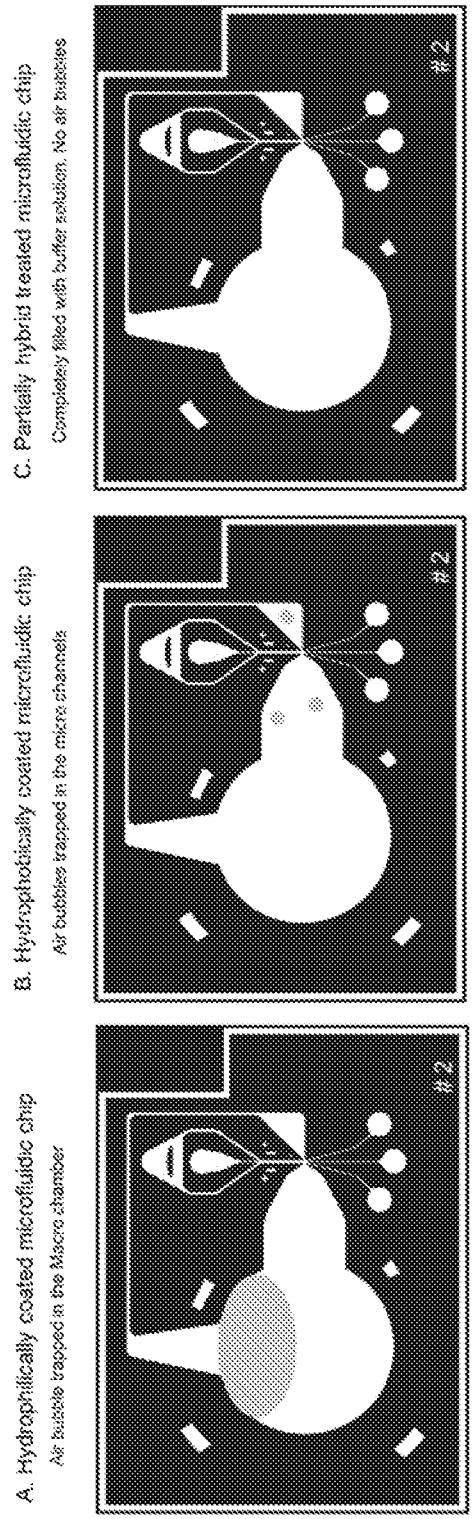
FIGS. 20A-20C are schematics of the cell sorter chip with a hydrophilic coating only (FIG. 20A), a hydrophobic coating only (FIG. 20B), and a hybrid coating (FIG. 20C), respectively.

FIGS. 20A-20C are schematics of a microfluidic chip with hydrophilic coating, hydrophobic coating, and hybrid coating, respectively. FIGS. 21A-21C are images of a microfluidic chip with hydrophilic coating, hydrophobic coating, and hybrid coating, respectively, after priming. These figures illustrates that when using only hydrophilic coating for all regions, air bubbles are trapped in the PZT chamber after priming (see, FIGS. 20A and 21A). When only hydrophobic coating is used, air bubbles are trapped in the micro channels in the neck region 1915 and the microfluidic region 1920 (see, FIGS. 20B and 21B). In contrast, when hydrophobic coating is used for the piezoelectric region 1910 and hydrophilic coating is used for the neck region 1915 and the microfluidic region, no air bubble remains in the chip 1900 and the complete priming of the chip 1900 is thereby achieved to ensure reliable analysis and sorting performance.

Accordingly, in some embodiments, an apparatus/chip includes a substrate (e.g., the chip of FIG. 21C), and a structure formed in the substrate, the structure including an input channel connected at an actuation area to a set of output channels. The particles in the fluid flow through the input channel to the actuation area, and each particle travels from the actuation area to one of the set of output channels. In some embodiments, each of the input channel and the set of output channels having a hydrophilic coating applied thereto. The chip also includes a piezoelectric actuator coupled to the substrate and in fluid communication with the actuation area. The piezoelectric actuator is configured to, in response to a voltage signal, cause a flow displacement to direct a particle along a trajectory to one of the set of output channels which is different than the output channel to which the particle would travel without the flow displacement. In some embodiments, the piezoelectric actuator has a hydrophobic coating applied thereto.

Traditional particle sorting methods use a piezoelectric transducer to break the stream into droplets. Particles (e.g., cells) can be contained in some of those droplets as they break off. As droplets are formed, the droplets can be charged with positive or negative ions. The stream of droplets then passes through a pair of charged plates (e.g., charged at ±5000 V) so that the charged droplets can be deflected and collected into test tubes/wells.

One aspect of flow sorting is, therefore, to apply a charge to the correct drops (i.e., the ones containing the desired particles) and to no others. To do this, a parameter called "time delay" or "sort delay" should be precisely adjusted. In traditional cell sorters, the time delay or sort delay is the time that it takes a particle to move from the analysis point to the point where the drop containing it breaks away from the stream. The time delay is determined by several factors including but not limited to: the distance between analysis point and sorting point, flow velocity, the generating rate of drops, the charging frequency, etc. If the time delay is not properly adjusted, the sorting purity and efficiency can be negatively affected. In addition, the user may not be able to monitor the sorting results in real time. Instead, the user has to collect and analyze the sorted sample with a cytometer to obtain the sorting information. This can be one reason why traditional cell sorters are usually operated only by well-trained technicians in a core facility.

The particle sorters as disclosed here, however, can be used to perform closed-loop particle sorting. In the system shown in FIG. 13A, the time/sort delay is the time between when a particle is optically detected and when the particle reaches the sorting junction (in this case, the actuator that is triggered to deflect the particle into one of the three sorting channels). It can use scattered light and/or emitted fluorescence (detected by one or more photodetectors) as the signal to trigger sorting activation. An on-chip Piezoelectric (PZT) actuator sorts the particles by changing the flow movement transiently at the chip sorting junction. The particle sorter uses electrical methods (e.g., impedance measurements) and/or optical methods to obtain a validation signal to confirm the sorting status. In addition, a processor (electronics hardware) implements a method to adjust the timing in relation to the optical detection signal, PZT triggering signal, and validation signal to increase the sorting efficiency and monitor the sorting status in real time.

A digital sort delay can be used to compensate for any minor Y-axis alignment differences, minor manufacturing differences, or minor flow rate differences. Alignment in the Y-axis can affect proper sort timing, as the PZT sorting actuator should be activated at the exact time when the particle is in the microfluidic sorting junction following its upstream detection at the detection region. The proper sort delay can also vary from chip-to-chip due to imperfections in the microfluidic chip fabrication and variations in PLT performance. Generally, the desired sort delay for a given chip remains constant for a given flow rate.

To address fabrication imperfections and performance variations, the sorting system can define a range for sorting delay based on the distance and velocity information instead of one fixed sorting delay value. Subsequently, the system can step through this range of sort delay values. For instance, the system can step through one or sort delay values separated by as little as 1 μs per step. In some cases, the system can take large steps (e.g., 10 μs) for coarse calibration and smaller steps (e.g., 1 μs) for more precise calibration.

At each step, the system measures tens, hundreds, or thousands of particles or more to obtain the sort efficiency, which is defined as the percentage of sorting confirmation signals compared to the total number of PZT trigger events. The sorting verification signals can be electrical or optical signals measured downstream in the sorting channels. One example is to use gold electrodes downstream of fluidic channels in the microfluidics chip. The electrodes are used to provide an electric field. When a particle travels across this electric field, the system measures modulation of an electrical signal (e.g., an impedance signal) caused by a particle flowing through the channel.

Once the system finishes a loop calculation of a certain distance range (for example 100 μm to 250 μm), it notifies the user of the achieved sorting efficiency. If this sorting accuracy is above an acceptable threshold, the system sets the sort delay that produced the sorting accuracy, resets the system in preparation for an actual sample run, and notifies the user that the calibration process is complete. Otherwise, the system prompts the user to repeat the calibration process with wider sorting delay range. If the desired sorting accuracy is not achieved (e.g., after three trials), the system notifies the user to replace the chip and repeat this auto calibration test.

Figure 22:
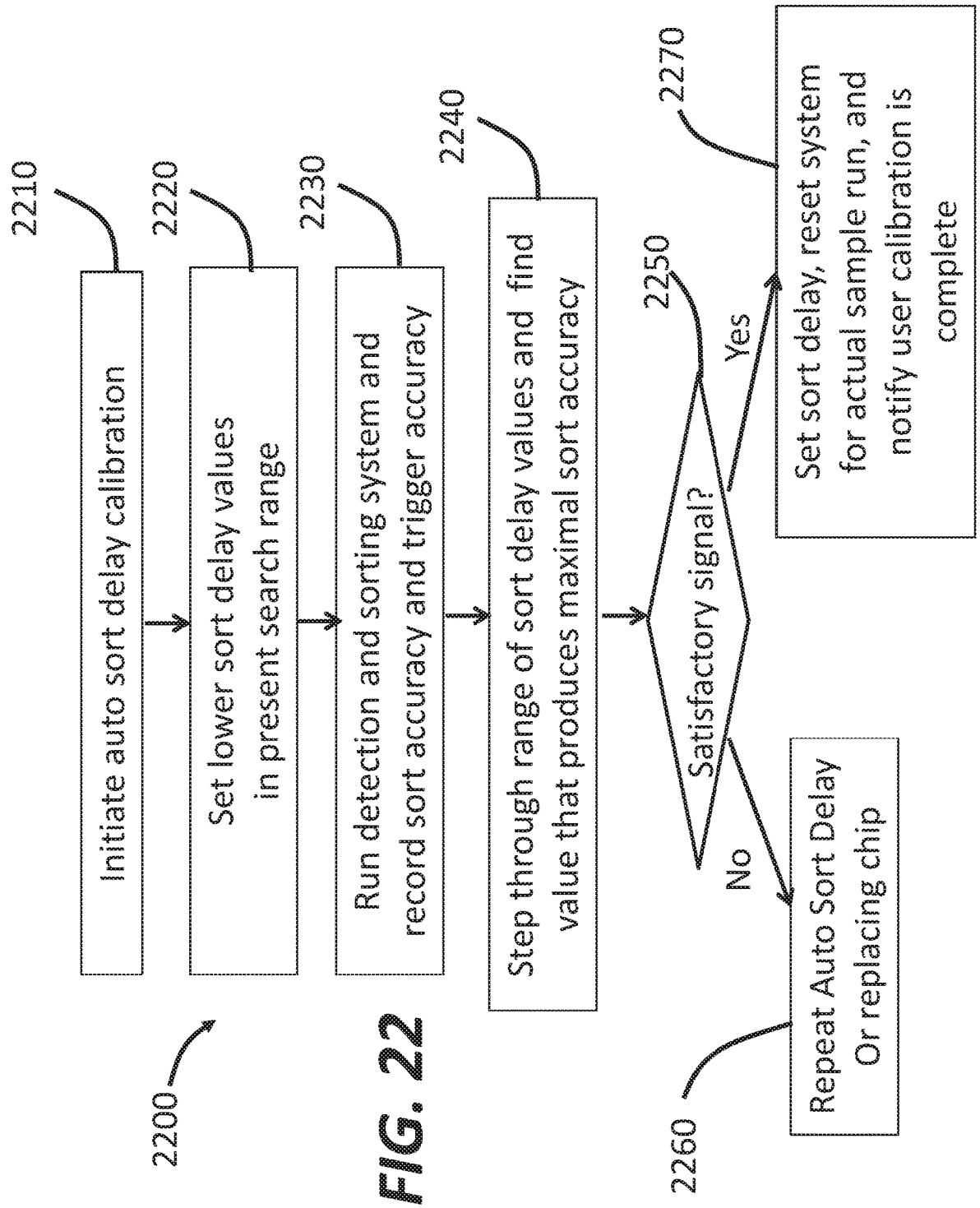
FIG. 22 is a flow chart illustrating an auto-sort calibration process, according to embodiments.

FIG. 22 illustrates a method of auto sort delay calibration described above. The method 2200 starts at step 2210 to initiate the auto sort delay calibration, followed by step 2220, at which a lower sort delay value is set in present search range. At step 2230, the detection and sorting system is operated and sort accuracy and trigger accuracy are recorded. The recorded sort accuracy and trigger accuracy can be used to find out the value of sort delay that produces the maximal sort accuracy, as in step 2240. At step 2250, the signal is examined to determine whether it is satisfactory. In response to non-satisfactory signal, the method 2200 proceeds to step 2260, where the auto sort delay is repeated or the sorting chip is replaced. On the other hand, in response to satisfactory signal at step 2250, the method 2200 proceeds to step 2270, where the sort delay producing the maximal sort accuracy is set. In addition, the system can also be set for actual sample run, thereby completing the calibration.

Figure 23B:
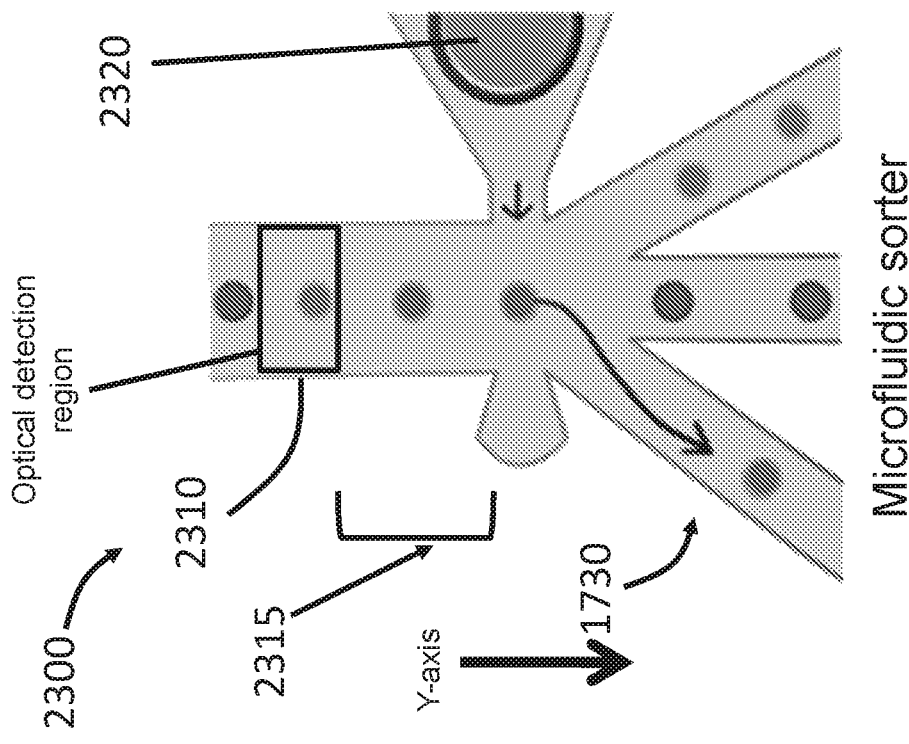
FIGS. 23A-23B illustrate optimization of particle sorting positioning and timing, according to embodiments.
Figure 23A:
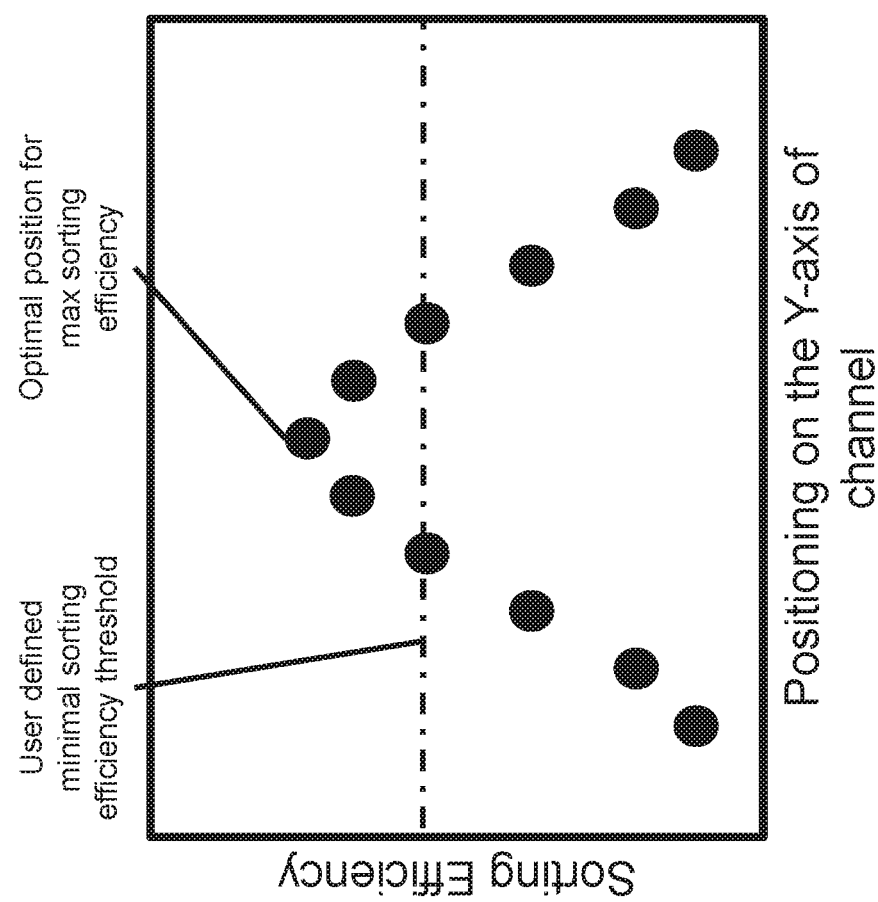

FIGS. 23A-23B illustrate optimization of particle sorting positioning and timing. FIG. 23A is a plot of sorting efficiency as a function of position on the Y-axis of the channel. FIG. 23B shows a schematic of a sorting junction 2300 including a fluid channel 2310 to propagate sample fluid and a PZT actuator 2320 to direct cells in the sample fluid toward designated output channels 2330. The fluid channel 2310 includes a region 2315, which is called Y-axis region where position is optimized to control precise timing of PZT triggering. Based on the plot shown in FIG. 23A, one can choose the position that produces the maximal sorting efficiency to set up the microfluidic chip.

In some embodiments, the cell sorters described above (e.g., see FIGS. 8A-8B, FIG. 17, and FIG. 19) analyze and sort cells or particles inside a disposable cartridge to enhance user friendliness, to ensure biosafety by not generating air-borne aerosols, and to prevent cross contamination between samples from different users. One challenge for such cartridge-based sorting approaches can be the precise alignment (e.g., with sub-micron precision) of each disposable chip-cartridge assembly to the center of the optical interrogation zone. In the case of most cell sorter applications, even 1 µm misalignment in any axis can cause significant signal-to-noise degradation in detection. Manual alignment can be performed by an expert, but this limits the use of this technology by a broader market, in turn limiting the commercial value.

FIGS. 24A-24D illustrate a method of optical alignment of disposable assay cartridges. FIG. 24A illustrates a schematic of a chip 2400. The chip 2400 includes an alignment marker 2410 formed in a substrate 2405 that defines the chip 2400. The substrate 2405 also defines a microfluidic channel 2430 to flow the sample during operation of the sorting device. A laser beam 2420 is also labelled in FIG. 24A for facilitating alignment. The laser beam 2420 is aligned with an opening 2440, also defined on the substrate 2405, so as to allow scattered light or fluorescent light from the sample to enter detection devices. The beam path of the scattered/fluorescent light defines an optical axis of the chip 2400.

FIGS. 24B-24D illustrate the alignment of the chip 2400 using the pre-defined marker 2410 as a fiduciary marker. As a preliminary step, the chip 2400 is inserted into a cartridge carriage. Due to variations in chip dimensions and mechanical tolerances in machining the cartridge carriage, it is possible that the chip is not precisely aligned to the optical axis.

The alignment process can include obtaining an image of the chip 2400 from a camera, as illustrated in FIG. 24B. The chip 2400 can be coupled to a motion stage that allows three-dimensional (3D) movement of the chip 2400. At this step, the field of view of the camera is scanned to locate the alignment marker 2410. The alignment marker 2410 can be of any shape and any dimension as long as it can be imaged with sufficient resolution. In some embodiments, the alignment marker 2410 can be an opening formed in the substrate 2405. In some embodiments, the alignment marker 2410 can be a marker disposed on the substrate 2405, in which case the alignment marker 2410 can have a different color from the color of the substrate 2405. In some embodiments, the alignment marker 2410 can be painted on the substrate 2405.

Once the alignment marker 2410 is located, the motion stage can move the chip 2400 along the z-axis (i.e., perpendicular to the plane of FIG. 24A) until the alignment marker 2410 is substantially in focus, i.e., the camera acquires a sharp image of the alignment marker 2410 as shown in FIG. 24C. At this point, the z-axis alignment is completed.

As the alignment marker 2410 is pre-defined with reference to a region or regions for which alignment is sought (e.g., the opening 2440), the next step in the alignment is to move the chip 2400 along the X and Y axis to bring the designed region or regions into optical alignment, as illustrated in FIG. 24D. At this step, the laser beam 2420 may also be used to mark the location of the opening 2440.

In some embodiments, the alignment illustrated in FIGS. 24B-24D can be performed manually. In some embodiments, the alignment illustrated in FIGS. 24B-24D can be performed automatically by a processor. In this case, the chip 2400 can be placed on a motion stage coupled to a servomotor, which in turn is controlled by the processor. Upon execution of processor-executable instructions, the processor controls the servomotor to move the cartridge so as to, for example, locate the alignment marker 2410, bring the alignment marker 2410 in focus, and bring the chip 2400 in alignment with the optical axis.

Figure 25A:
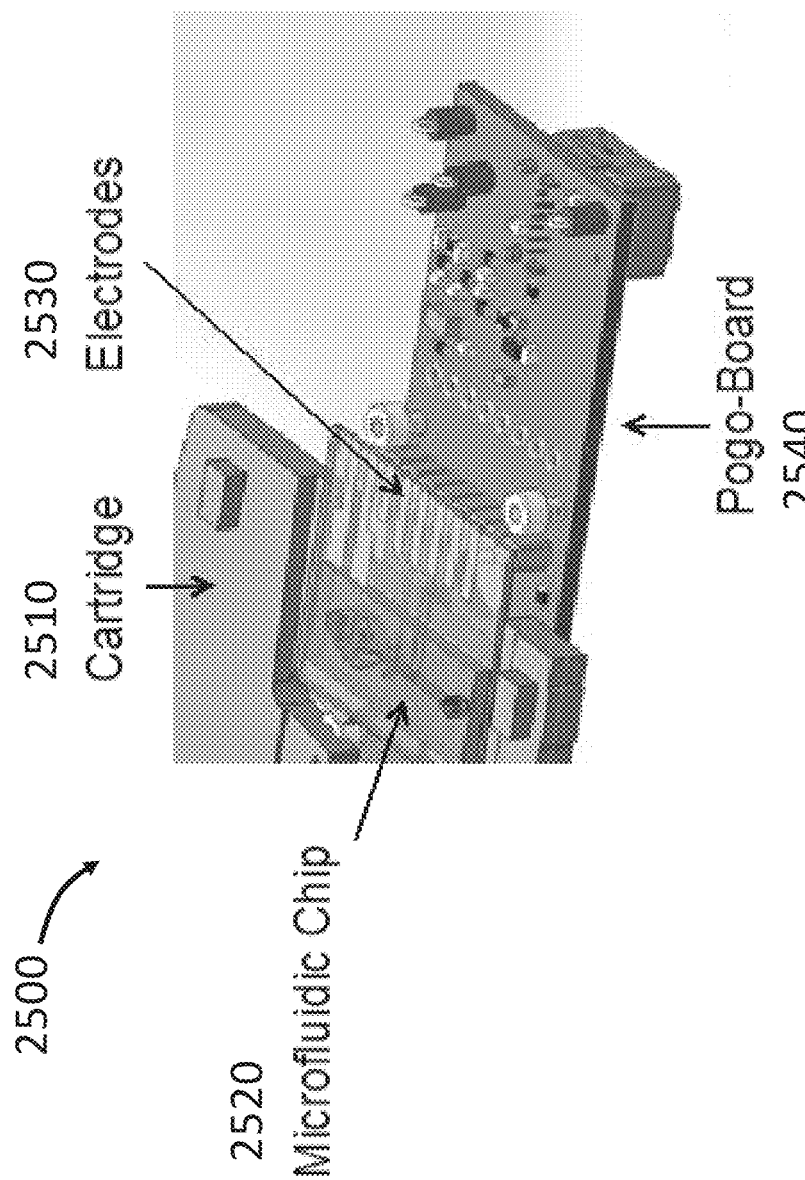
FIGS. 25A-25B illustrate a microfluidic device using pogo pins to establish electrical connectivity of microfluidic chips with electrical devices.
Figure 25B:
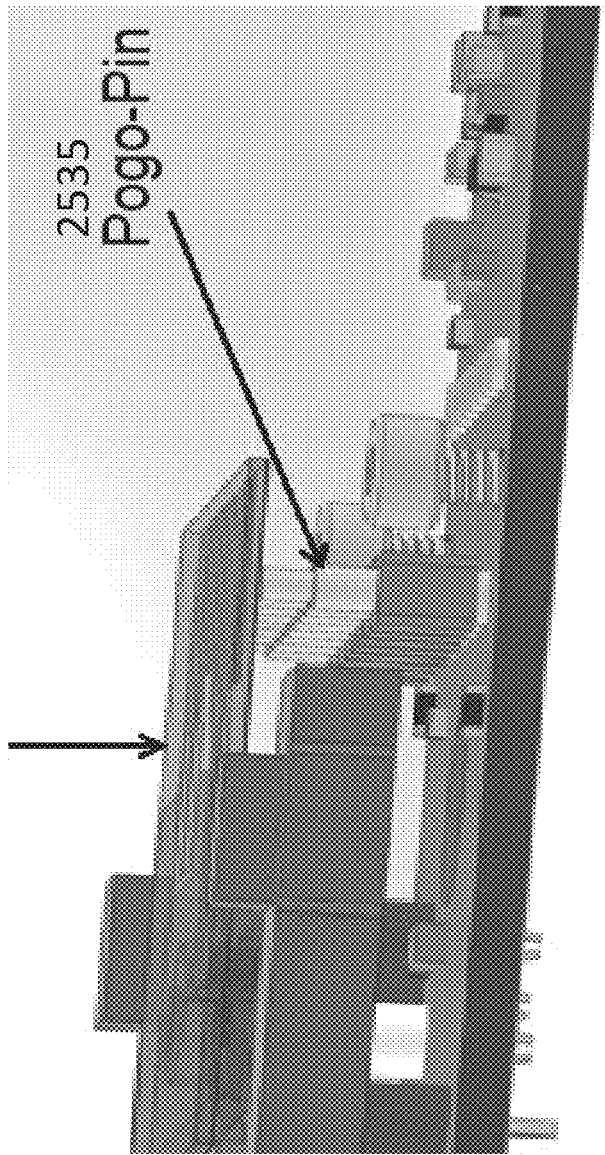

FIGS. 25A-25B illustrate a microfluidic device 2500 using pogo pins to establish electrical connectivity between components, such as microfluidic chips and electrical devices. A pogo pin is a device used in electronics to establish a connection between two printed circuit boards. Usually this connection is temporary, so convenient connection and disconnection can be helpful. The pogo pin typically takes the form of a slender cylinder containing two sharp, spring-loaded pins.

The device 2500 includes a microfluidic chip 2520 coupled with a cartridge 2510. The combination of the microfluidic chip 2520 and the cartridge 2510 are electrically connected to a circuit board 2540 via electrodes 2530. The electrodes 2530 can include an array of Pogo pins 2535 as shown in FIG. 25B.

In some embodiments, the circuit board 2540 can be part of an external electrical device to power a piezoelectric sorting mechanism in the microfluidic chip 2520. In some embodiments, the external electrical device can collect electrical recordings (e.g. impedance).

Using pogo pins 2535 eliminates the need for wires on the cartridge 2510 and between the cartridge 2510 and the device 2540, while permitting relative movement between the device 2540 and the cartridge 2510 without losing electrical connectivity. Furthermore, the pogo pins 2535 provide a standard interface that allows modification of the cartridge 2510 without modification of the machine. A variety of pogo pin architectures can be adopted to overcome space constraints or varying numbers of electrical connections.

In some embodiments, particles or cells can be monitored one or multiple times from the inlet to the outlet to collect different metrics of the cell and/or to provide real-time feedback. For example, a status that is inconsistent with an assigned value can be presented to the user as a method of indicating normal or abnormal function. In some embodiments, the pogo pins 2535 conduct voltage to the cartridge actuator for sorting particles or cells. In some embodiments, the pogo pins 2535 conduct carrier wave voltage to the cartridge electrodes for sensing electrical signals induced by particles or cells.

FIGS. 29A-29D illustrate a system 2900 for alignment of assay cartridges, according to embodiments. In some embodiments, the system 2900 can be part of a larger system/device that can include components such as housing, power supply, sample tank, and mechanical pump (e.g. peristaltic pump), among others. The system 2900 includes a receiving fixture 2920 to receive a cartridge 2910 (e.g. similar to the cartridge shown in FIGS. 6A-6B, FIG. 7, and FIGS. 30A-30D). The cartridge 2910 includes a slot 2915 for receiving a microfluidic chip (e.g. the sorting chip 910 shown in FIG. 8B) that has a set of first channels. The cartridge 2910 includes input channels 2970a to deliver, for example, sample fluid (including particles to be detected and/or sorted) and sheath fluid, and output channels 2970b to deliver the sorted particles to output ports 2980. When the microfluidic chip is properly inserted into the cartridge 2910, the set of first channels in the microfluidic chip is configured to connect the input channels 2970a to the output channels 2970b.

Figure 29A:
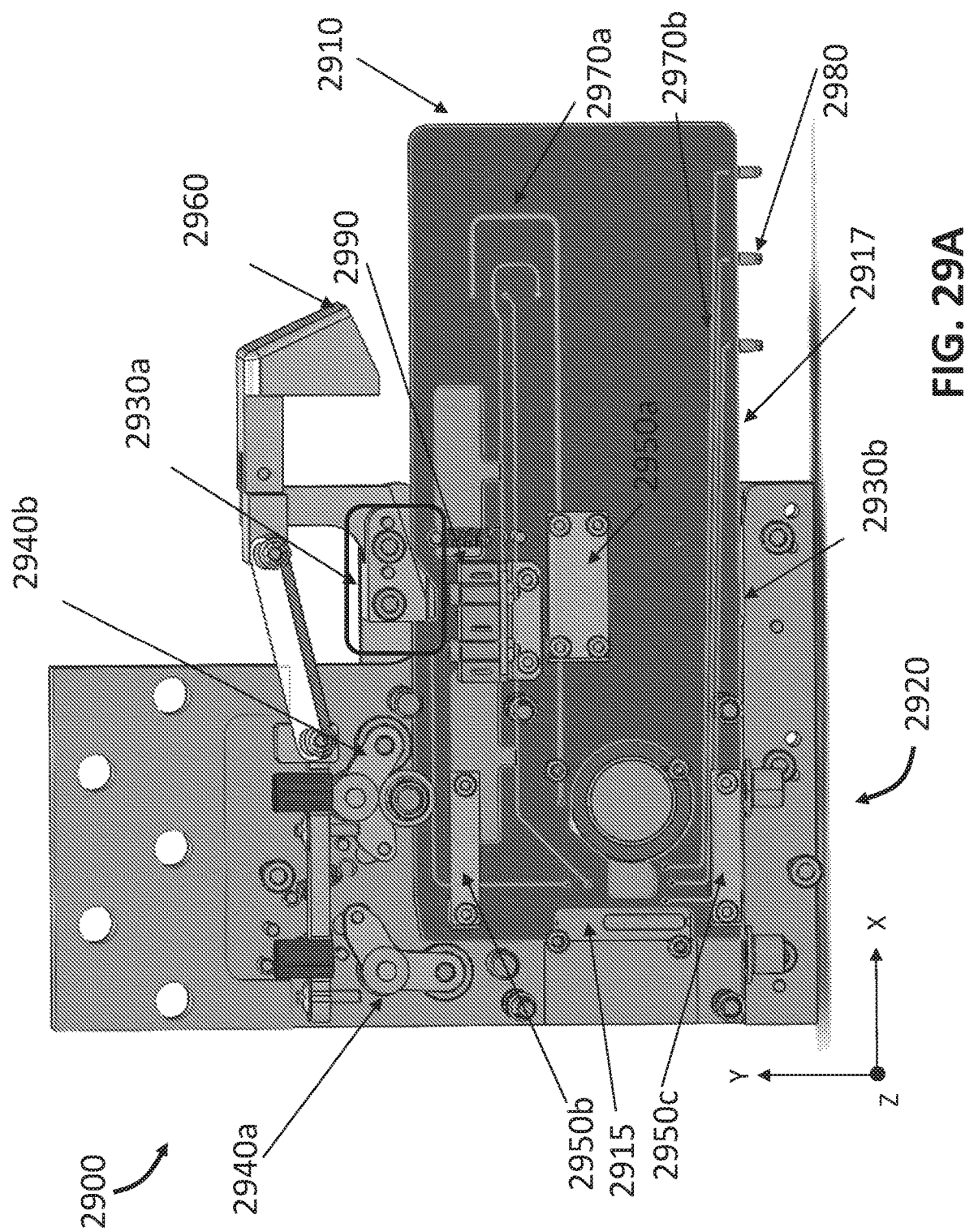
Figure 29B:
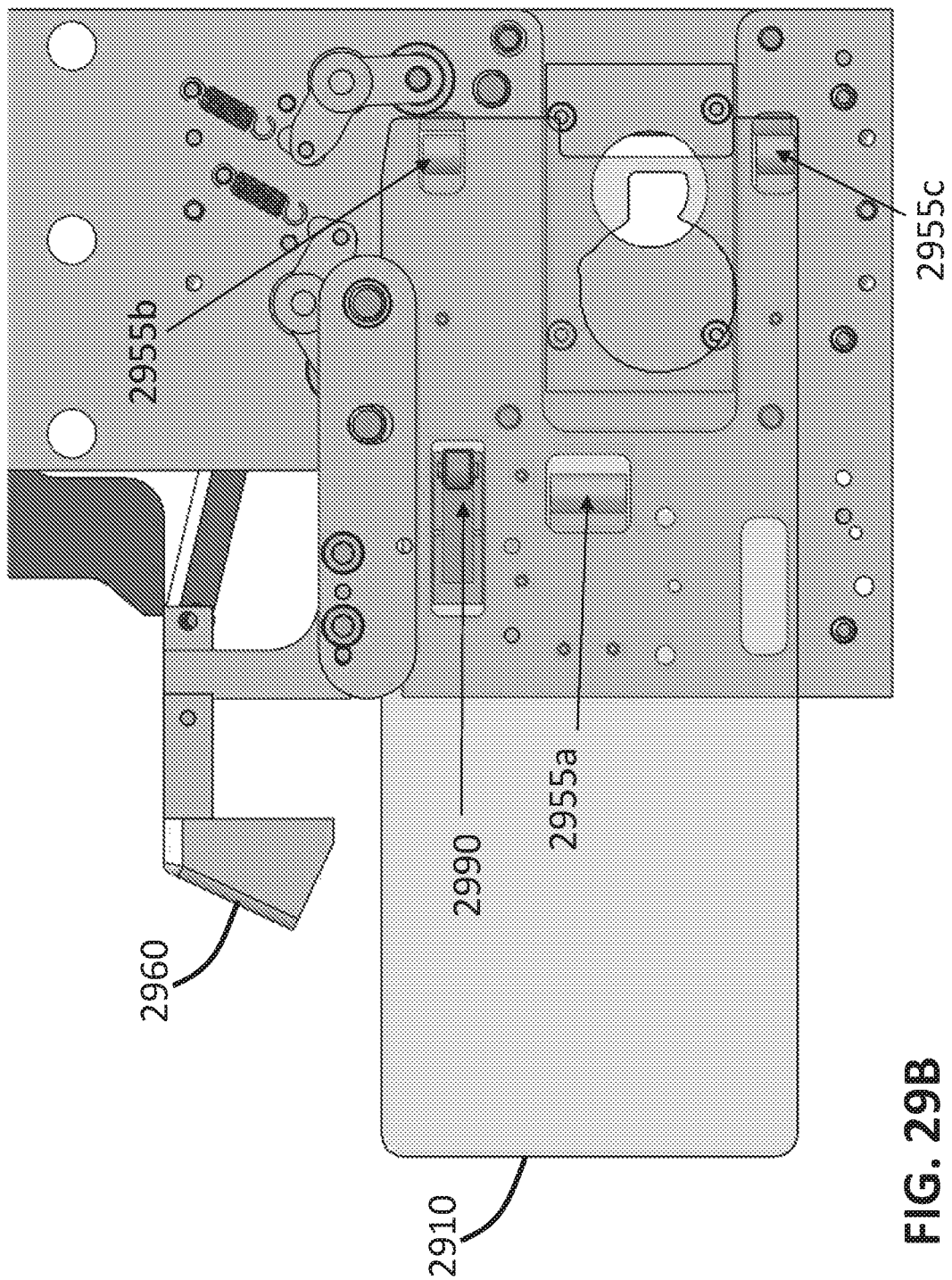
Figure 29D:
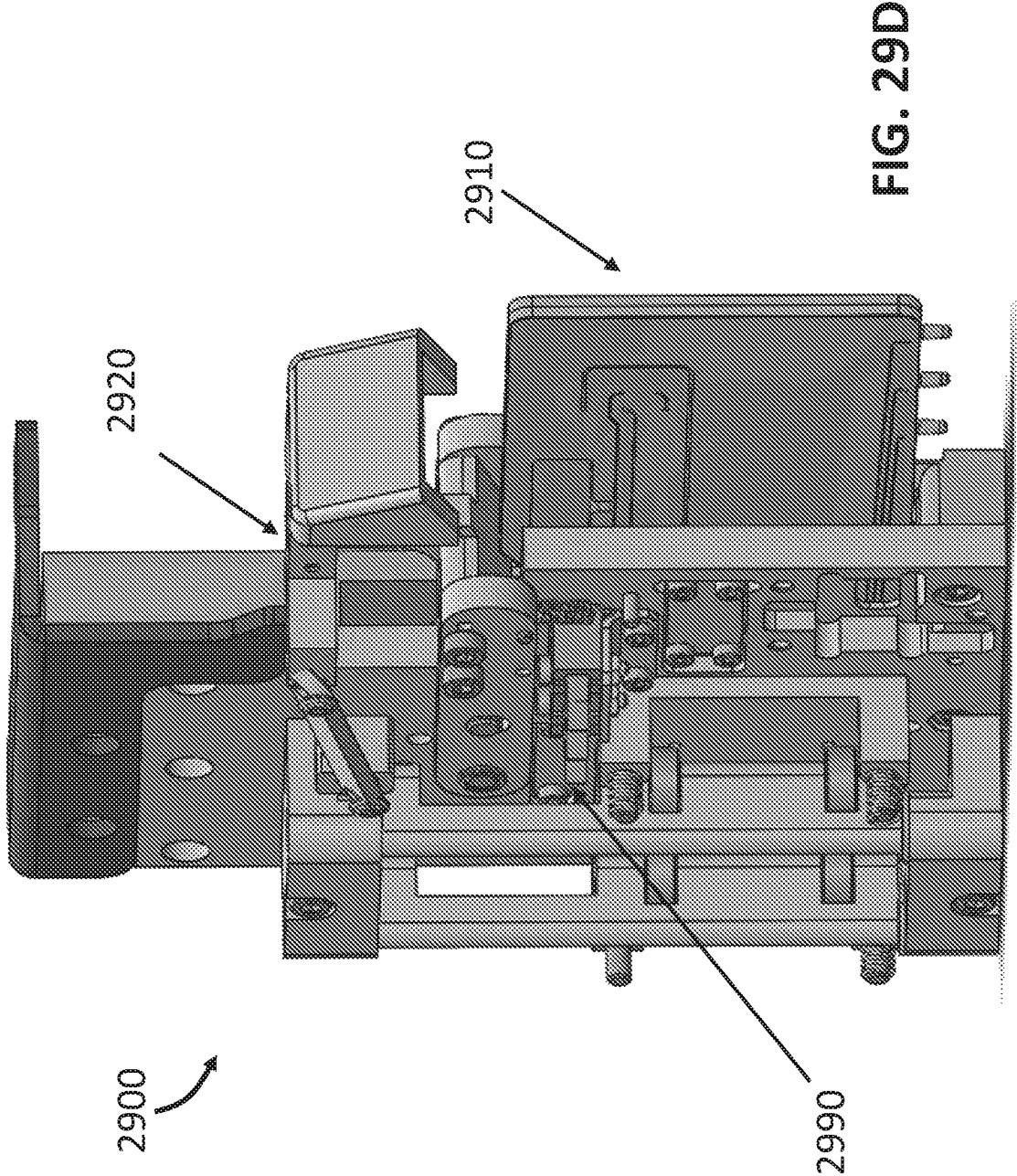

The cartridge 2910 also includes an indent (see, e.g. FIGS. 30A-30D) configured for engagement and alignment of the cartridge 2910 with the receiving fixture 2920 during use. To facilitate the engagement and alignment of the cartridge 2910, the receiving fixture 2920 includes three biasing members. In some embodiments, more or fewer biasing members can be employed. The first biasing member 2940a is configured for alignment of the cartridge 2910 along a first direction (e.g. the x direction illustrated in FIG. 29A). For example, as illustrated in FIG. 29A, the first biasing member 2940a includes a spring and roller structure configured to move the cartridge 2910 along the x direction. In some embodiments, the first biasing member 2940a can include a winder or any other structure that can move the cartridge 2910. During use, a user can insert the cartridge 2910 into the receiving fixture 2920 and slide the cartridge 2910 toward the left to pass the alignment position. Alternatively, the cartridge 2910 can be disposed into the receiving fixture 2920 by an automated handling system, such as a mechanical arm. The spring and roller structure in the first biasing member 2940a then pushes the cartridge 2910 back until the indent on the cartridge 2910 (e.g. on the upper edge of the cartridge, see FIGS. 30A-30B) is coupled to a first alignment feature 2930a (also sometimes referred to as a datum, such as a notch) in the receiving fixture 2920. Once the first datum 2930a is locked to the indent on the cartridge 2910, the alignment on the x direction can be considered substantially complete.

The second biasing member 2940b is configured for alignment of the cartridge 2910 along a second direction (e.g. the y direction as illustrated in FIG. 29A). In some embodiments, the second biasing member 2940b also includes a spring and roller structure (or any other suitable mechanism, such as a winder) configured to move the cartridge 2910 along the y direction. The receiving fixture 2920 can also include a second alignment feature 2930b, such as a groove defined on the bottom plate of the receiving structure 2920. During use, the second biasing member 2940b can move the cartridge 2910 so as to cause the edge 2917 of the cartridge 2910 to lock into the groove of the receiving structure 2920, thereby realizing alignment in they direction.

The third biasing member includes three springs 2950a, 2950b, and 2950c, each of which is paired with a corresponding roller 2955a, 2955b, and 2955c, respectively. These components can move the cartridge 2910 along a third direction (e.g. the z axis illustrated in FIG. 29A). In some embodiments, the receiving fixture 2920 can include a plate 2940c (see FIG. 29C) as the alignment for the alignment of the cartridge 2910. In some embodiments, the alignment of the cartridge 2910 on the z direction can be achieved by securing a surface of the cartridge 2910 against the plate 2940c. In some embodiments, the surface of the cartridge 2910 and the plate 2940c can both have mating features to facilitate alignment and/or securing, such as, for example, a raised portion on the surface and a corresponding depression in the plate. In some embodiments, the cartridge 2910 can include one or more alignment features (e.g. datum) 2915 disposed on the side surface of the cartridge 2910. These alignment features can be used for securing against the plate 2940c. In some embodiments, the alignment features can include mating features.

The receiving fixture 2920 also includes a locking member 2960 (e.g. a latch) to hold the cartridge 2910 once the cartridge 2910 is aligned with the receiving fixture 2920. In some embodiments, the receiving structure 2920 can also include a detection switch 2990 configured to detect whether the cartridge 2910 is inserted into the receiving fixture 2920. In some embodiments, the system 2900 can include a processor operably coupled to the detection switch 2990 and memory stored with a software program. If the cartridge 2910 is not inserted, the software program can generate and display a message indicating the absence of any cartridge and/or reminding a user to insert a cartridge. In some embodiments, the system 2900 can include an indicator (e.g. a laser, a light emitting diode, etc.) to indicate the presence and/or absence of the cartridge 2910. In some embodiments, the detection switch 2990 can include a mechanical switch having a roller and a metal piece. When the cartridge 2910 is properly inserted, the roller in the detection switch 2990 contacts the surface of the cartridge 2910 and the metal piece goes up (i.e. switch ON). On the other side of the receiving fixture 2920, wires can be connected to a control board.

FIGS. 30A-30D show a schematics of a cartridge 3000 including alignment features, according to embodiments. The cartridge 3000 includes a substrate 3005 and fluid channels 3050 defined in the substrate 3005. As described herein, the fluid channels 3050 in the cartridge 3000 can include input channels (e.g. to deliver sample fluid and sheath fluid) and output channels (e.g. to deliver sorted particles to different output ports). A slot 3040 is also defined on the substrate 3005 to receive a microfluidic chip for particle sorting.

The cartridge 3000 includes three sets of alignment features (also referred to as datum) for alignment of the fluidic channels 3050 with the light source, slits, and detectors in a receiving fixture (see, e.g. FIG. 27A-27J). A first set of alignment feature 3010 is disposed within an indent 3015 defined on the upper edge of the substrate 3005. In some embodiments, the first alignment feature 3010 can be used for alignment in the x direction (see FIG. 29A for illustration of orientations). The second alignment feature 3020 (shown in FIG. 30B) are disposed on a lower edge of the substrate 3005 for alignment in the y direction. In some embodiments, the bottom surfaces of the second alignment feature 3020 can be in complete contact with the mating components on the fixture (e.g. 2930b illustrated in FIG. 29A). Having two datum in the second alignment feature 3020 on the cartridge 3000 can prevent the cartridge 3000 from rotating or tilting. FIGS. 30C and 30D illustrate a third set of alignment features 3030 disposed on a side surface of the substrate 3005 for alignment on the z direction.

Figure 31A:
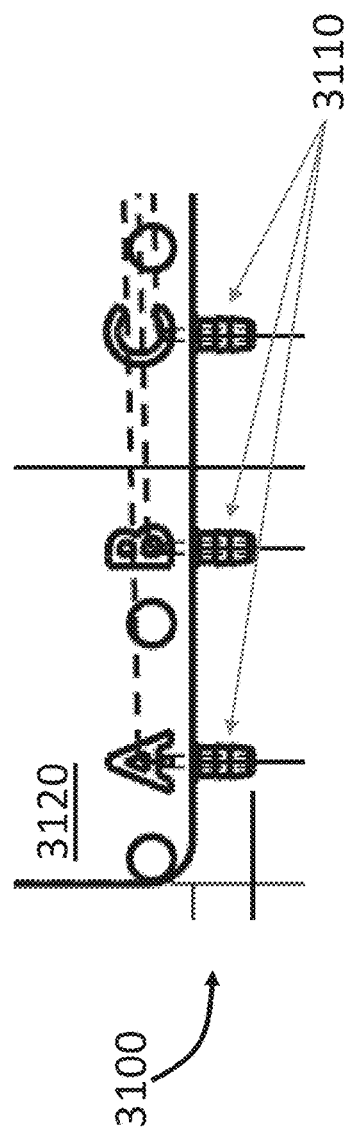
FIGS. 31A-31B illustrate output ports in a cartridge, according to embodiments.
Figure 31B:
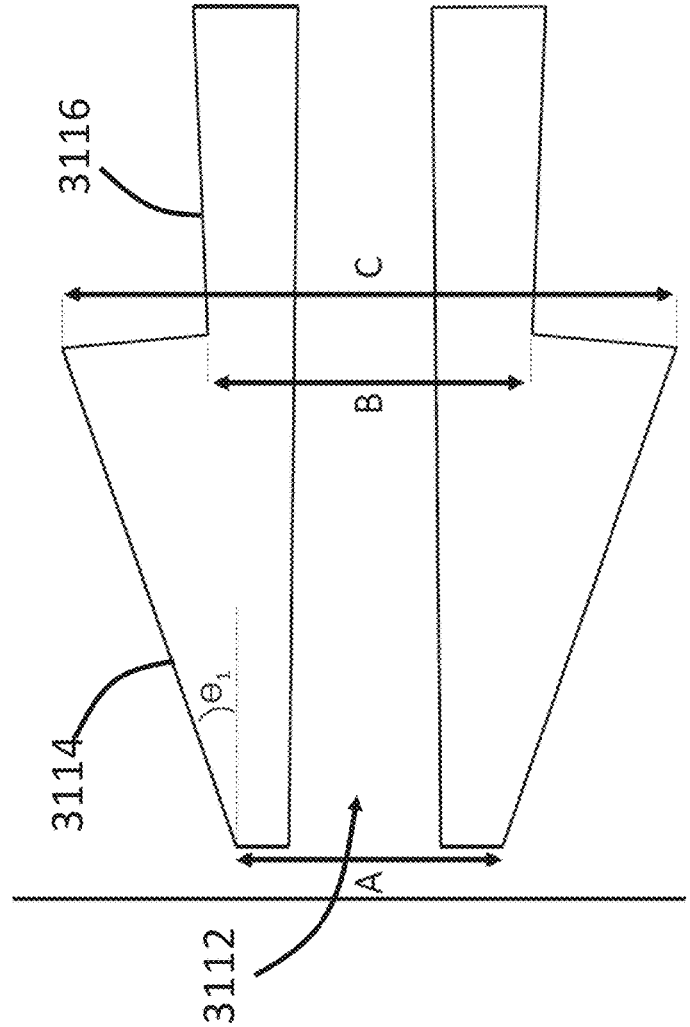

FIGS. 31A and 31B show schematics of output ports 3110 in a cartridge 3100 (e.g., similar to the cartridge shown in FIGS. 30A-30B), according to embodiments. The output ports 3110 are disposed on an edge of a substrate 3120 that can include fluidic channels. In some embodiments, the output ports 3110 can be coupled to one or more containers to receive the sorted particles. In some embodiments, the container can include a multiple-well plate and each well in the multiple-well plate is coupled to a corresponding output port to receive one type of particles.

Each output port 3110 includes a barb section 3114 and a tail section 3116, and a channel 3112 is defined in the center of the barb section 3114 and the tail section 3116. The barb section 3114 can have various shapes and dimensions to accommodate different types of containers coupled to the cartridge 3100 and/or to accommodate different types of packaging. In some embodiments, the barb section 3114 can have a linear side surface, as illustrated in FIG. 31B. In some embodiments, the side surface of the barb section 3114 can have a curved shape. This barb section 3114 can be configured to prevent leaking, thereby holding high fluidic pressure within the cartridge 3100.

In some embodiments, the outer diameter A of the distal end (with reference to the cartridge substrate 3120) of the barb section 3114 can be about 1 mm to about 5 mm (e.g. about 1 mm, about 1.5 mm, about 2 mm, about 2.5 mm, about 3 mm, about 3.5 mm, about 4 mm, about 4.5 mm, or about 5 mm, including any values and sub ranges in between). The outer diameter C of the proximate end (with reference to the cartridge substrate 3120) of the barb section 3114 is greater than the outer diameter A and can be about 1.5 mm to about 8 mm, (e.g., about 1.5 mm, about 2 mm, about 3.5 mm, about 4 mm, about 4.5 mm, about 5 mm, about 5.5 mm, about 6 mm, about 6.5 mm, about 7 mm, about 7.5 mm, or about 8 mm, including any values and sub ranges in between). The tilt angle $\theta_1$ of the barb section 3114 can be about 5° to about 75° (e.g., about 5°, about 10°, about 15°, about 20°, about 25°, about 30°, about 35°, about 40°, about 45°, about 50°, about 55°, about 60°, about 65°, about 70°, or about 75°, including any values and sub ranges in between). In some embodiments, the outer diameter B of the tail section 3116 can be substantially identical to the outer diameter A, as illustrated in FIG. 31B.

Figure 32:
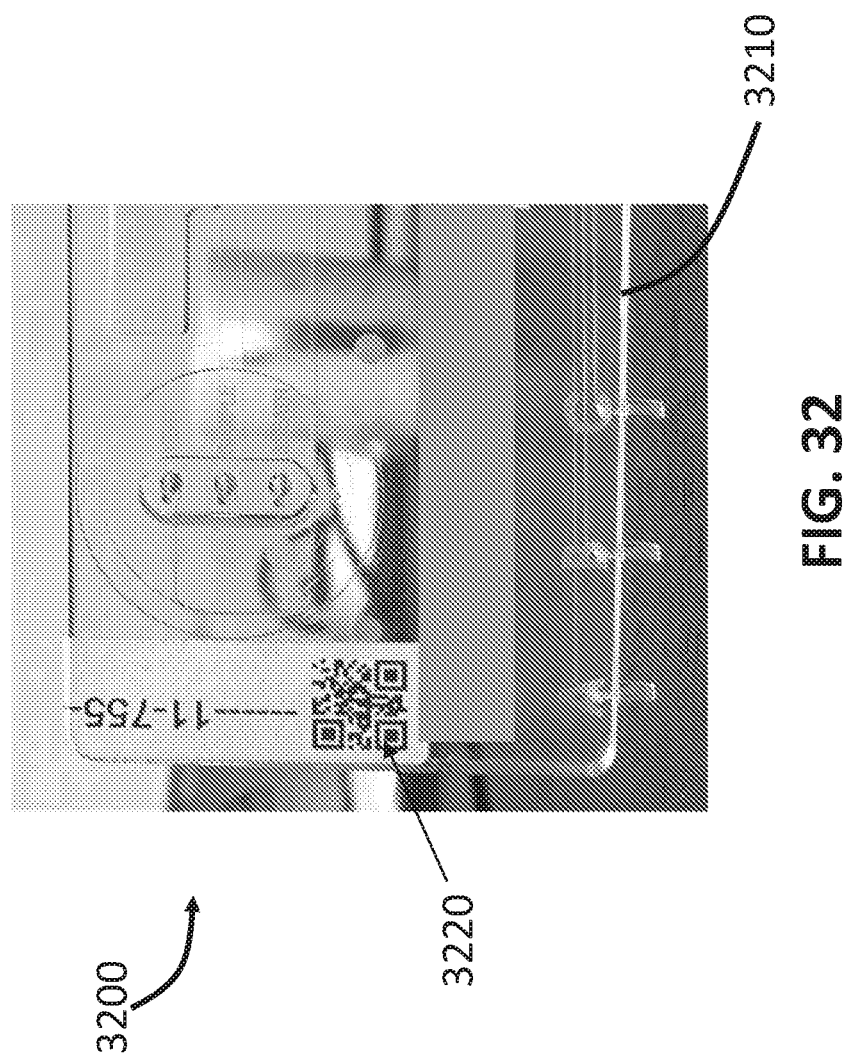
FIG. 32 illustrates a cartridge including a bar code, according to embodiments.

FIG. 32 shows a schematic of a cartridge 3200 (e.g. similar to the cartridges shown in FIGS. 6A-6B, FIG. 7, and FIGS. 30A-30D) including a bar code 3220, according to embodiments. In some embodiments, the bar code 3220 can include a one-dimensional (1D) bar code. In some embodiments, the bar code 3220 can include a two-dimensional (2D) bar code. In some embodiments, the bar code 3220 can include a QR code.

In some embodiments, the bar code 3220 can be printed on a sticker that is disposed on the substrate 3110 of the cartridge 3100. In some embodiments, the sticker can be removable from the substrate 3110. During use, a user can scan the bar code 3220 to acquire information about the cartridge 3100. In some embodiments, scanning the bar code 3220 can prompt the display of a user report form (e.g., on the bar code reader or on a separate display in communication with the bar code reader). The user report form can be pre-filled with certain information, such as the maker, model, dimensions of the cartridge 3100, and the time and date of the use. The user can also fill part of the report form to include information such as the sample type, the type of experiment, the purpose of the experiment, user's name, test results, issues. In some embodiments, the user report form can be automatically transmitted to a server (e.g. via Internet) upon the completion of the use. Information provided by the user via the user report form can be used to modify or improve the performance of the cartridge 3100.

Figure 33A:
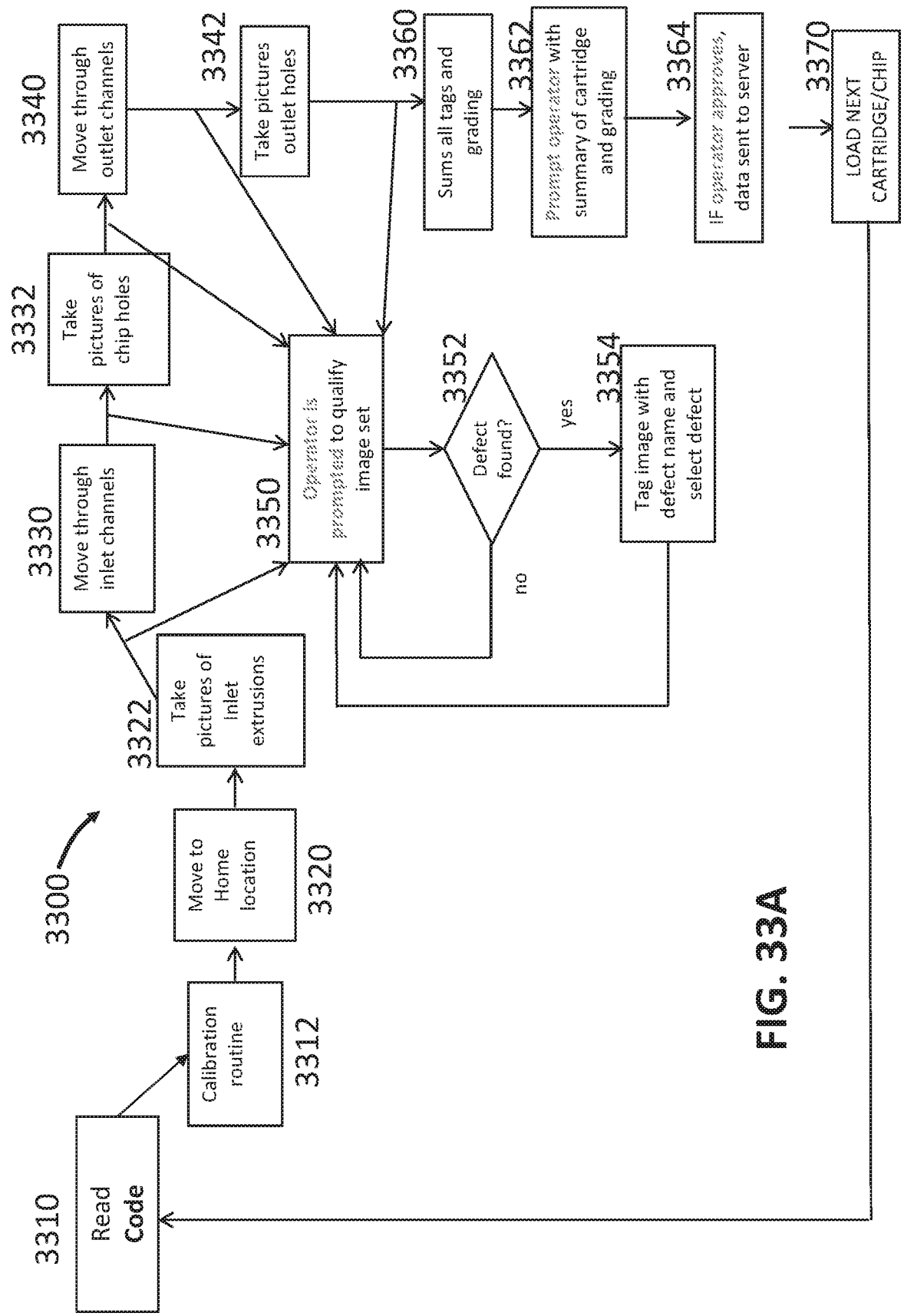
FIGS. 33A-33B illustrate a method of inspecting a cartridge using a bar code, according to embodiments.

FIG. 33A illustrates a method 3300 of inspecting a cartridge using a bar code, according to embodiments. The method 3300 includes, at 3310, reading the bar code (e.g. a QR code) attached to a cartridge (or a chip), followed by a calibration routine at 3312. In some embodiments, the calibration routine 3112 can include any suitable approach in which a motorized inspection stage calibrates its x, y, and z positions with regard to one or more fiduciary markers on the cartridge's surface when a new cartridge inserted.

Figure 33B:
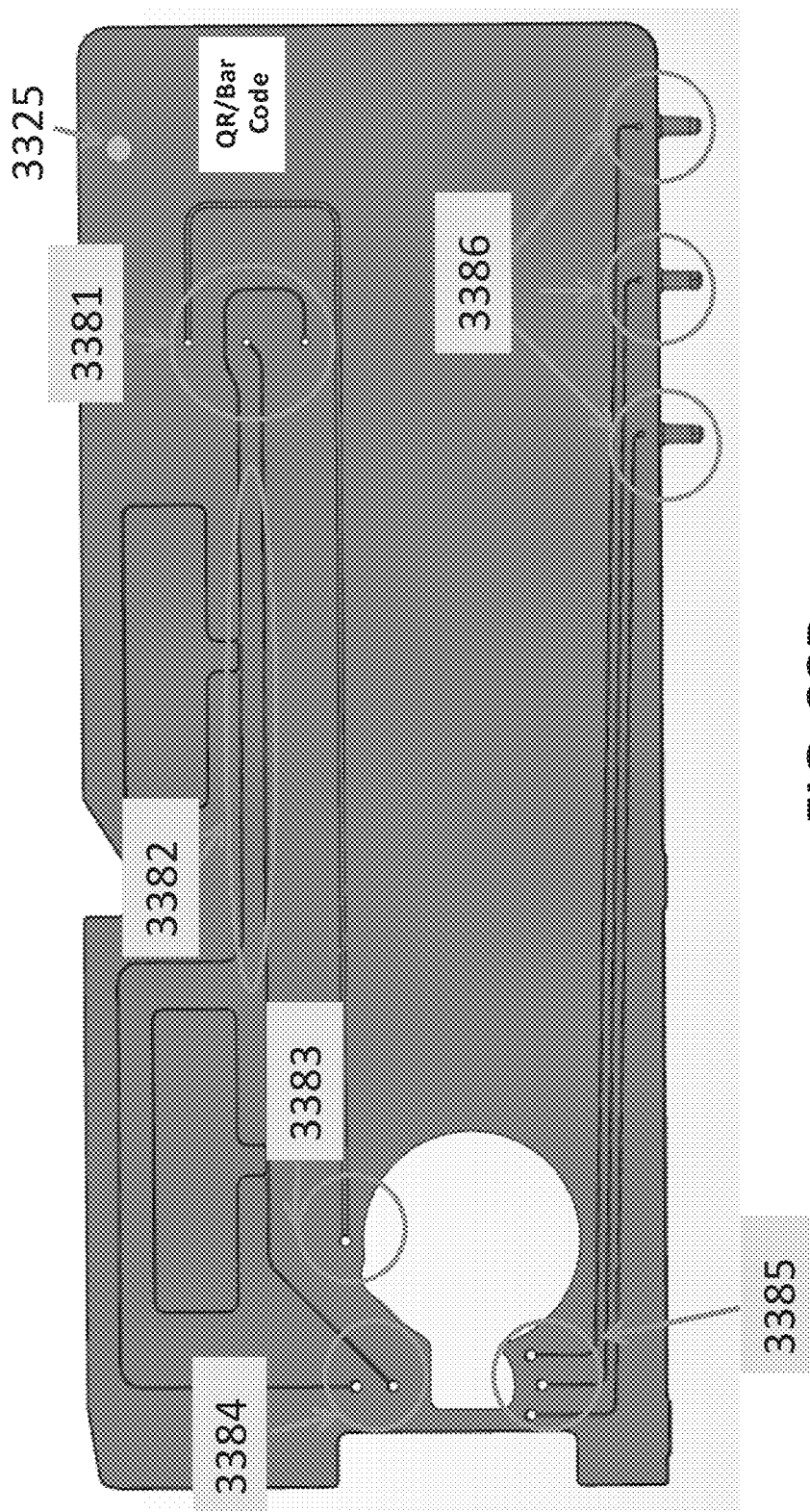

The method 3300 also includes, at 3320, moving to a home location. In some embodiments, the home location of each cartridge refers to a pre-defined fiduciary marker on the cartridge's surface and is position where scanning of the cartridge begins. FIG. 33B illustrates an example marker serving as a home location 3325 on the cartridge. FIG. 33B also illustrates one example order of inspecting different components in a cartridge. The inspection starts from the home location 3325 and then moves to inlet extrusions 3381, followed by inspection of the input channels 3382. The purge chip hole 3383 (e.g., used for purging the microfluidic chip when coupled to the cartridge), the inlet chip holes 3384 (e.g., used for delivering sample/sheath fluids to the microfluidic chip), and the output inlet chip holes 3385 (e.g., used for delivering sorted particles) are then inspected, after which the output cartridge holes 3386 can be inspected. This order of inspection is for illustrative purposes, and any suitable orders can also/alternatively be employed.

Figure 33C:
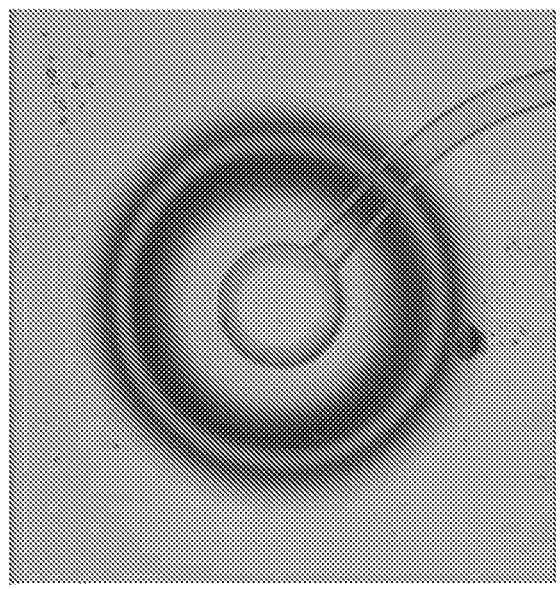
Figure 33D:
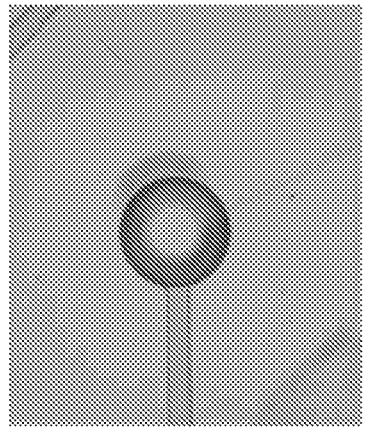
Figure 33E:
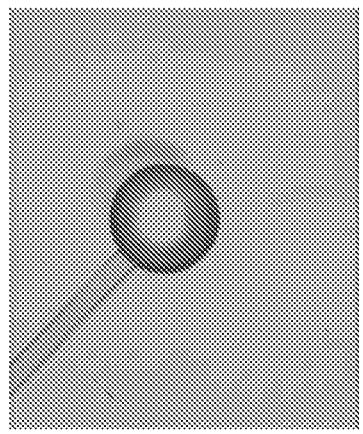
Figure 33F:
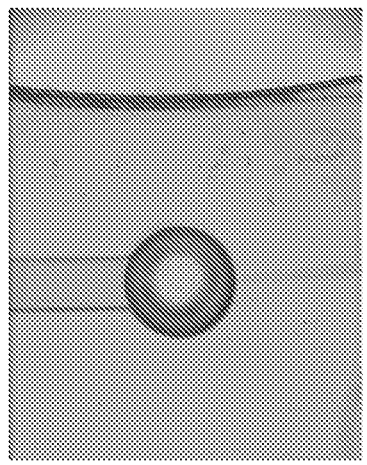
Figure 33I:
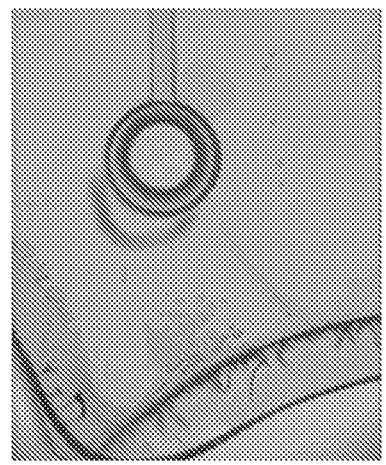
Figure 33H:
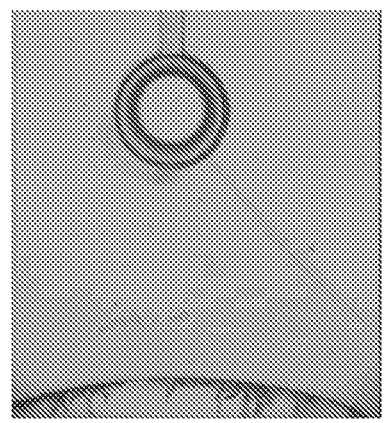
Figure 33G:
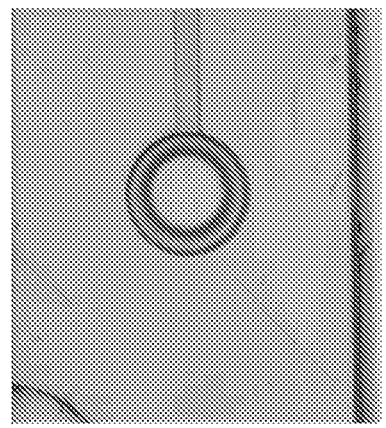
Figure 33J:
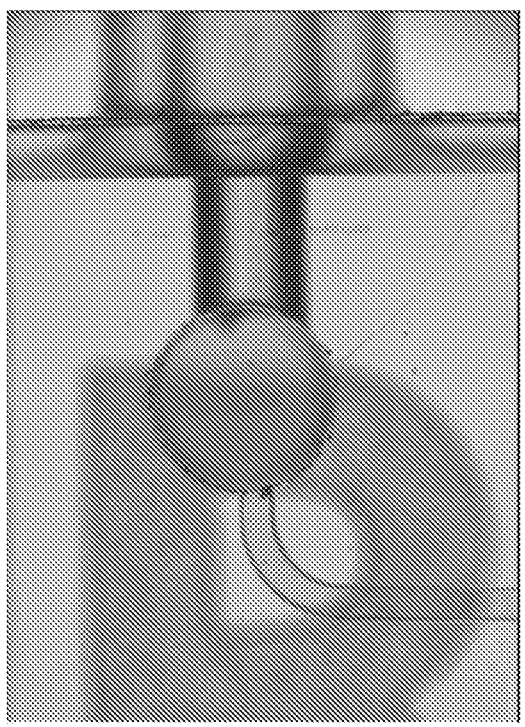

At 3322, images of inlet extrusions (or inlet ports) are acquired. FIG. 33C shows an example image of an inlet extrusion taken at 3322. At 3330, the inspection moves through inlet channels, followed by acquiring pictures of holes in the cartridge (or the chip) at 3332. Various chip and/or cartridge elements can be inspected, including (but not limited to) inlet chip holes, purge chip holes, and outlet chip holes. FIGS. 33D and 33E are two examples images of inlet chip holes taken at 3332. FIG. 33F is an example image of a purge chip hole taken at 3322. FIGS. 33G-33I are three example images of outlet chip holes taken at 3322. At 3340, the inspection moves through the outlet channels, followed by acquiring pictures of outlet holes at 3342. FIG. 33J shows an example image of an outlet cartridge holes taken at 3342.

The images taken at 3322, 3332, and 3342 are sent to an operator who review and qualify these images, at 3350. In some embodiments, the images taken at 3322, 3332, and/or 3342 can be analyzed automatically by a processor. If any defect in any of these pictures is found at 3352, the the image(s) with the defect(s) are tagged at 3354, after which the operator/algorithm reviews the next image (i.e. the method returns to 3350). The operator may also enter the type of defect and/or provide any further information about the defect. The operator can also provide tags and/or grades for each image with or without defect. These tags and grading are analyzed at 3360, and the analyzed result (e.g. a summary of each image or the collection of images) is provided to the operator 3362. At 3364, if operator approves the analyzed result, the analyzed result is then transmitted to a central server (e.g. managed by the manufacturer or supplier of the cartridge). At 3370, a new cartridge (or chip) is provided for inspection (i.e. the method starts over at 3310).

Figure 34A:
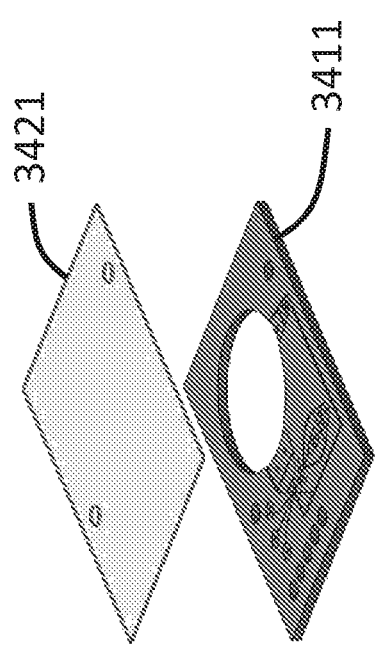
FIGS. 34A and 34B illustrate cartridges configured for particle sorting without bubble formation, according to embodiments.
Figure 34B:
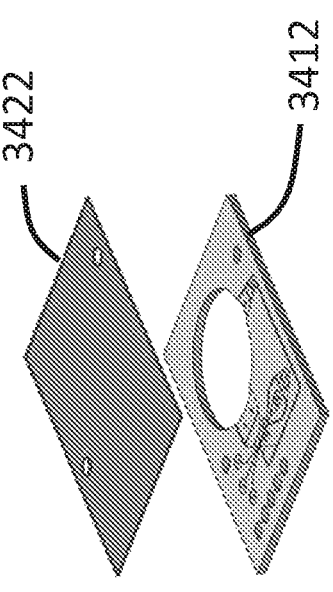

FIGS. 34A and 34B illustrate schematics of microfluidic chips 3401 and 3401 to achieve sorting without bubbles, according to embodiments. These chips 3401 and 3402 can have at least certain degree of elasticity to accommodate bubbles in the fluidic channels. The chip 3401, shown in FIG. 34A, includes a hard (or rigid) microfluidic slab 3411 and an elastic sheet 3421 disposed on the slab 3411 to achieve elasticity. The slab 3411 can include fluidic channels and the elastic sheet 3421 can be employed to seal the slab 3411. The chip 3402, shown in FIG. 34B, includes an elastic microfluidic slab 3412 and a hard (or rigid) sheet 3422 disposed on the slab 3412. The rigid material used in the rigid slab 3411 and/or the rigid sheet 3422 can include, for example, glass and plastic (e.g., cyclic olefin copolymer (COC), cyclo-olefin polymer (COP), or polycarbonate (PC)). The elastic material used in the elastic sheet 3421 and/or the elastic slab 3412 can include, for example, polydimethylsiloxane (PDMS).

FIGS. 35A and 35B show schematics of a cartridge 3500 including pulse dampers 3520 (also sometimes referred to as dampeners throughout this application) and additional ports 3530 (e.g. in addition to ports 3560), according to embodiments. The pulse dampers 3520 are in fluidic communication with fluid channels 3510. The additional ports 3530 are in fluidic communication with a fluid channel 3512 without any pulse damper. FIG. 35A illustrates the front side of the cartridge 3500 and indicate the projected locations of the ports 3530 to illustrate the channel(s) connected to the ports 3530 (e.g. 3512). The cartridge 3500 also includes a slot 3540 configured for receiving a microfluidic chip for particle sorting.

During use, many assays may include aqueous droplets formed in oil and the resulting oil droplets enclosing particles of interest are transported in the sample fluid for sorting. In general, oils can have different densities (e.g. less) than that of water, resulting in a positive buoyancy for the droplets. As a result, it may be difficult to keep droplets in desired positions within a fluidic stream. As discussed herein, it can also be desired to use peristaltic pumps due to the low cost, ease of use, and flexibility in ergonomics and interfacing with a variety of sample tubes used by life scientists. The pulse dampers 3520 can include gas pockets that, due to the compressibility of gas, can reduce the pulsations produced by peristaltic pumps. When droplets or particles are difficult to contain in a desired position, due to differences in buoyancy, the particles may enter the gas pocket. To address this issue, the additional ports 3530 can be disposed downstream of the pulse dampers 3520. These ports allow for introduction of the sample by injection or by the use of an accessory sample loop (e.g. via the channel 3512). In this manner, the particles or droplets can be kept in desired positions within the fluid stream and subjected to downstream analysis and/or sorting.

Figure 36:
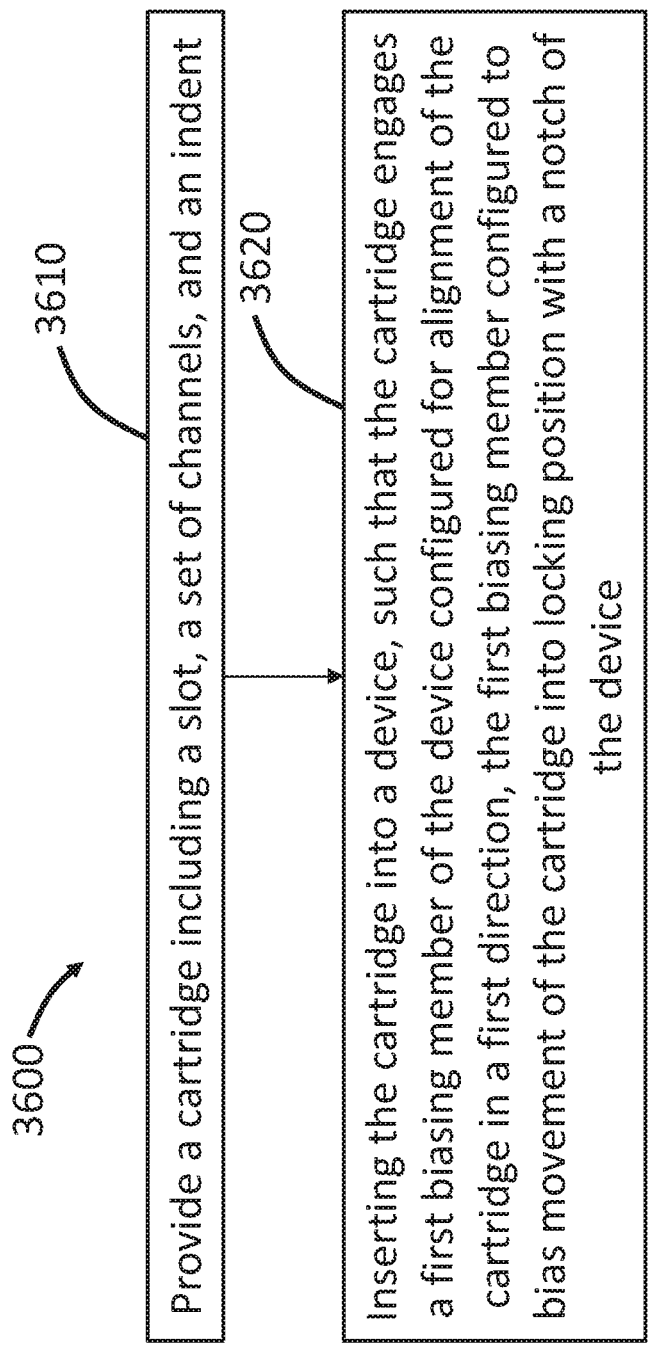
FIG. 36 illustrates a method of using a cartridge, according to embodiments.

FIG. 36 illustrates a method 3600 using a cartridge. The method 3600 includes, at 3610, providing a cartridge (e.g. the cartridges shown in FIGS. 6A-6B, FIG. 7, and FIGS. 30A-30D) that includes a slot for receiving a microfluidic chip (e.g. the microchip 910 shown in FIG. 8B) having a set of first channels (e.g., channels in the microfluidic chip 910). The cartridge also includes a set of second channels (e.g. such as channels 2970a and 2970b shown in FIG. 29A), each of which is coupleable to a different channel of the set of first channels during use with the microfluidic chip. The cartridge also includes an indent (e.g. the indent 3015 shown in FIG. 30A) configured for engagement and alignment of the cartridge during use. The method 3600 also includes, at 3620, inserting the cartridge into a device (e.g. the receiving fixture 2980 shown in FIG. 29A), such that the cartridge engages a first biasing member (e.g. 2940a in FIG. 29A) of the device configured for alignment of the cartridge in a first direction. The first biasing member is configured to bias movement of the cartridge into locking position with a notch of the device.

In sonic embodiments, the indent formed in an edge of a substrate of the cartridge (e.g. an upper edge of the cartridge). In some embodiments, during inserting, the cartridge engages a second biasing member (e.g. 2940b in FIG. 29A) of the device configured for alignment of the cartridge in a second direction. The second biasing member is configured to bias movement of the cartridge into locking position with a groove of the device. In some embodiments, the second direction is orthogonal to the first direction (e.g., the first direction is in x direction and the second direction is in y direction).

In some embodiments, the second biasing member engages with a first edge of a substrate of the cartridge, and the second biasing member is configured to bias movement of a second edge of the substrate of the cartridge into locking position with the groove of the device.

In some embodiments, during inserting, the cartridge engages a third biasing member (e.g. 2950a/2950b/2950c in FIG. 29A) of the device configured for alignment of the cartridge in a third direction. The third biasing member configured to bias movement of the cartridge into locking position with a surface member of the device. In some embodiments, the third biasing member engages with a surface of the substrate of the cartridge. In some embodiments, the third direction is orthogonal to the second direction and to the first direction, thereby allowing three-dimensional (3D) alignment of the cartridge. In some embodiments, the first biasing member, second biasing member, and third biasing member each include a spring and roller mechanism.

In some embodiments, the method 3600 further includes, after inserting the cartridge into the device, latching the cartridge into place on the device. In some embodiments, the method 3600 further includes, prior to inserting the cartridge into the device, inserting the microfluidic chip into the cartridge such that each channel of the set of second channels is fluidly coupled to a different channel of the set of first channels. In some embodiments, the method 3600 further includes sorting particles in a fluid from an input channel of the set of first channels into a selected output channel of the set of first channels.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one." The terms "about," "approximately," and "substantially" as used herein in connection with a referenced numeric indication means the referenced numeric indication plus or minus up to 10% of that referenced numeric indication. For example, the language "about 50" units or "approximately 50" units means from 45 units to 55 units. Such variance can result from manufacturing tolerances or other practical considerations (such as, for example, tolerances associated with a measuring instrument, acceptable human error, or the like).

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a slot for receiving a microfluidic chip having a set of first channels;
a set of second channels, each channel of the set of second channels coupleable to a different channel of the set of first channels during use with the microfluidic chip;
a fluid damper comprising one or more gas chambers in fluid communication with a first channel in the set of second channels, wherein the fluid damper reduces variations in the fluid flow rate by compression and expansion of a gas in the one or more gas chambers in response to fluid flow in the first channel; and
an indent configured for engagement and alignment of the apparatus during use,
such that the apparatus, upon insertion into a device, engages a first biasing member of the device configured for alignment of the apparatus in a first direction and to bias movement of the apparatus into locking position with a notch of the device.

2. The apparatus of claim 1, further configured to engage a second biasing member of the device for alignment of the apparatus in a second direction and to bias movement of the apparatus into locking position with a groove of the device.

3. The apparatus of claim 2, wherein a first edge of a substrate of the apparatus is configured to engage with the second biasing member, and wherein a second edge of the substrate of the apparatus is configured for biased movement into locking position with the groove of the device.

4. The apparatus of claim 3, further configured to engage a third biasing member of the device for alignment of the apparatus in a third direction, and to bias movement of the apparatus into locking position with a surface member of the device.

5. The apparatus of claim 1, wherein the first biasing member includes a spring and roller mechanism.

6. The apparatus of claim 1, further configured for, during use, sorting particles in a fluid from an input channel of the set of first channels of the microlluidic chip into a selected output channel of the set of first channels.

7. The apparatus of claim 1, further comprising a set of connectors, wherein each connector of the set of connectors is coupled to an outlet of a channel of the set of second channels.

8. The apparatus of claim 7, wherein each connector of the set of connectors comprises a barb fitting having a barb angle from about 5 degrees to about 20 degrees.

9. The apparatus of claim 1, further comprising a unique code associated with the apparatus.

10. The apparatus of claim 1, further comprising a sample port disposed downstream of the fluid damper and in fluid communication with a second channel in the second set of channels, the sample port configured for introducing particles in a fluid into the microfluidic chip.

* * * * *